United States Patent
Veiseh et al.

(10) Patent No.: US 11,338,294 B2
(45) Date of Patent: May 24, 2022

(54) ORTHOGONAL POLYBIOSENSING AND IMAGING SYSTEMS

(71) Applicants: Mandana Veiseh, Piedmont, CA (US); Pirooz Parvarandeh, Los Altos, CA (US); S. Bahram Bahrami, Piedmont, CA (US); Oliver Peter King-Smith, Aptos, CA (US); Todd S. Rutherford, Wyoming, OH (US); Aaron Peter Schellenberg, Santa Cruz, CA (US); Timothy Scott Edward Hiller, Ontario (CA)

(72) Inventors: Mandana Veiseh, Piedmont, CA (US); Pirooz Parvarandeh, Los Altos, CA (US); S. Bahram Bahrami, Piedmont, CA (US); Oliver Peter King-Smith, Aptos, CA (US); Todd S. Rutherford, Wyoming, OH (US); Aaron Peter Schellenberg, Santa Cruz, CA (US); Timothy Scott Edward Hiller, Ontario (CA)

(73) Assignee: Polybiomics, Inc., Piedmont, CA (US)

( * ) Notice: Subject to any disclaimer, the term of this patent is extended or adjusted under 35 U.S.C. 154(b) by 106 days.

(21) Appl. No.: 16/664,537

(22) Filed: Oct. 25, 2019

(65) Prior Publication Data
US 2020/0101455 A1    Apr. 2, 2020

Related U.S. Application Data

(63) Continuation of application No. PCT/US2018/029864, filed on Apr. 27, 2018.
(Continued)

(51) Int. Cl.
*B01L 3/00* (2006.01)

(52) U.S. Cl.
CPC ....... *B01L 3/5085* (2013.01); *B01L 2200/025* (2013.01); *B01L 2300/0645* (2013.01);
(Continued)

(58) Field of Classification Search
None
See application file for complete search history.

(56) References Cited

U.S. PATENT DOCUMENTS 5,501,959 A * 3/1996 Lancaster ............. B01L 3/5085
                                                                435/243
6,132,683 A * 10/2000 Sugihara ............ G01N 33/4836
                                                                204/403.01
(Continued)

FOREIGN PATENT DOCUMENTS

JP        09281066 A  *  10/1997

OTHER PUBLICATIONS

Notification Concerning Transmittal of International Preliminary Report on Patentability dated Nov. 7, 2019, PCT/US2018/029864, 10 pages.
(Continued)

*Primary Examiner* — Matthew D Krcha
(74) *Attorney, Agent, or Firm* — Haverstock & Owens, A Law Corporation

(57) ABSTRACT

Toward forming a single hybrid biosensing-imaging system that can operate inside an incubator, structures and methods are directed to placing modular and removable biosensors and biocompatible interfaces in 3D transparent test wells that contain biological samples. The technology enables continuous monitoring of multiple simultaneous parameters and functions of a living cell or cell clusters such as alterations of cellular ligands, physicochemical biomarkers, phenotypes, and/or extracellular compositions upon interactions with analytes or during progressions. Methods of
(Continued)

capturing and analyzing direct orthogonal information from biological samples in 2D and 3D, which are conducive to generating new insights are presented.

21 Claims, 36 Drawing Sheets

Related U.S. Application Data

(60) Provisional application No. 62/583,387, filed on Nov. 8, 2017, provisional application No. 62/554,617, filed on Sep. 6, 2017, provisional application No. 62/547,573, filed on Aug. 18, 2017, provisional application No. 62/491,090, filed on Apr. 27, 2017.

(52) U.S. Cl.
CPC ............... *B01L 2300/0663* (2013.01); *B01L 2300/0829* (2013.01); *B01L 2300/0851* (2013.01); *B01L 2300/0858* (2013.01); *B01L 2300/123* (2013.01); *B01L 2300/1883* (2013.01)

(56) References Cited

U.S. PATENT DOCUMENTS

| | | |
|---|---|---|
| 7,027,628 B1 * | 4/2006 | Gagnon ............ G01N 15/1463 382/128 |
| 7,083,939 B2 | 8/2006 | Shull et al. |
| 7,087,397 B2 | 8/2006 | Anaokar et al. |
| 7,150,995 B2 | 12/2006 | Xie et al. |
| D540,953 S | 4/2007 | Ramel et al. |
| D561,905 S | 2/2008 | Ramel et al. |
| 7,374,719 B2 | 5/2008 | Anaokar et al. |
| 7,435,577 B2 | 10/2008 | Lawrence et al. |
| 7,476,548 B2 | 1/2009 | Blatt et al. |
| 7,588,724 B2 | 9/2009 | Nguyen et al. |
| 7,625,721 B2 | 12/2009 | Lawrence et al. |
| 7,635,597 B2 | 12/2009 | Blatt et al. |
| 7,674,615 B2 | 3/2010 | Ramel et al. |
| 7,749,770 B2 | 7/2010 | Nguyen et al. |
| 7,771,655 B2 | 8/2010 | Ramel |
| 7,887,750 B2 | 2/2011 | Blatt et al. |
| 8,045,169 B2 | 10/2011 | Hebert et al. |
| 8,101,415 B2 | 1/2012 | Irvin |
| 8,460,539 B2 | 6/2013 | Huffstodt et al. |
| 8,465,696 B2 | 6/2013 | Huffstodt et al. |
| 8,574,919 B2 | 11/2013 | Ramel et al. |
| 8,642,320 B2 | 2/2014 | Lawrence et al. |
| 8,865,089 B2 | 10/2014 | Blatt et al. |
| 9,180,455 B2 | 11/2015 | Phan et al. |
| 9,182,418 B2 | 11/2015 | Lawrence et al. |
| 9,395,373 B2 | 7/2016 | Huffstodt et al. |
| 9,671,401 B2 | 6/2017 | Irvin |
| 10,144,949 B2 | 12/2018 | Hughes et al. |
| 10,145,840 B2 | 12/2018 | Patwardhan et al. |
| 10,145,854 B2 | 12/2018 | Patwardhan et al. |
| 2008/0207465 A1 | 8/2008 | Ravkin et al. |
| 2013/0341734 A1 | 12/2013 | Merz |
| 2014/0017803 A1 * | 1/2014 | Deans .................... G01N 33/94 436/172 |
| 2014/0186876 A1 | 7/2014 | Teich |
| 2014/0273191 A1 * | 9/2014 | Tipgunlakant ......... C12Q 1/025 435/288.4 |
| 2016/0077045 A1 | 3/2016 | Fife et al. |
| 2017/0038282 A1 | 2/2017 | Veisch et al. |
| 2017/0056876 A1 | 3/2017 | Moskowitz et al. |

OTHER PUBLICATIONS

European supplementary search report dated Mar. 21, 2021, PCT/US2018029864, 14 pages.

* cited by examiner

ORTHOGONAL POLYBIOSENSING AND IMAGING SYSTEMS

RELATED APPLICATIONS

This patent application claims priority to International Patent Application Serial No. PCT/US18/29864, filed on Apr. 27, 2018, and entitled "Orthogonal Polybiosensing and Imaging Systems", which is hereby incorporated in its entirety by reference. International Patent Application Serial No. PCT/US18/29864 claims priority under 35 U.S.C. 119 (e) of the U.S. provisional patent applications, Application Ser. No. 62/491,090, filed on Apr. 27, 2017, and entitled "Integrated Polybiosensors and Systems", Application Ser. No. 62/547,573, filed on Aug. 18, 2017, and entitled "Methods of Monitoring Biological Samples Properties", Application Ser. No. 62/554,617, filed on Aug. 18, 2017, and entitled "Optical System for Monitoring Biological Samples", and Application Ser. No. 62/583,387, filed on Nov. 8, 2017, and entitled "Methods for Delivery and Extraction of Fluids from Wells", which are all hereby incorporated in their entireties by reference.

FIELD

The present invention is generally directed to the field of biosensors, biocompatible interfaces and bioinstruments. More specifically, the present invention is directed to systems and method of hosting, analyzing, manipulating and integrating orthogonal information from biological samples using a hybrid interface and biosensing-imaging system. Coupling multiple transduction methods provides additional and/or complementary orthogonal (i.e. independent, causing no interference) data from the samples and may increase confidence in the outcomes.

BACKGROUND

Technology is capable of sensing and tracking multiple physicochemical parameters and functions associated with the same cell(s) and other biological sample(s). Existing technologies require sensing of the various physicochemical parameters and functions of the related but different samples in separate environments and serially over time. Such restrictions may not be conducive for measuring changing characteristics over time or for deconvoluting the function of subpopulations that behave differently than the rest of the samples during processes such as cell progression from normal to disease state, or cell reaction over time to drugs, probes or toxins.

SUMMARY

Embodiments are directed to structures and methods of placing modular and removable sensors in 2D and 3D transparent test wells that contain biological samples. The sensors enable continuous monitoring of living cells and alterations of cellular ligands, physicochemical biomarkers, phenotypes, functions and/or extracellular compositions during cellular progressions, transition from normal to disease stage, or upon interactions with analytes such as drugs.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE EMBODIMENTS

Figure 1:
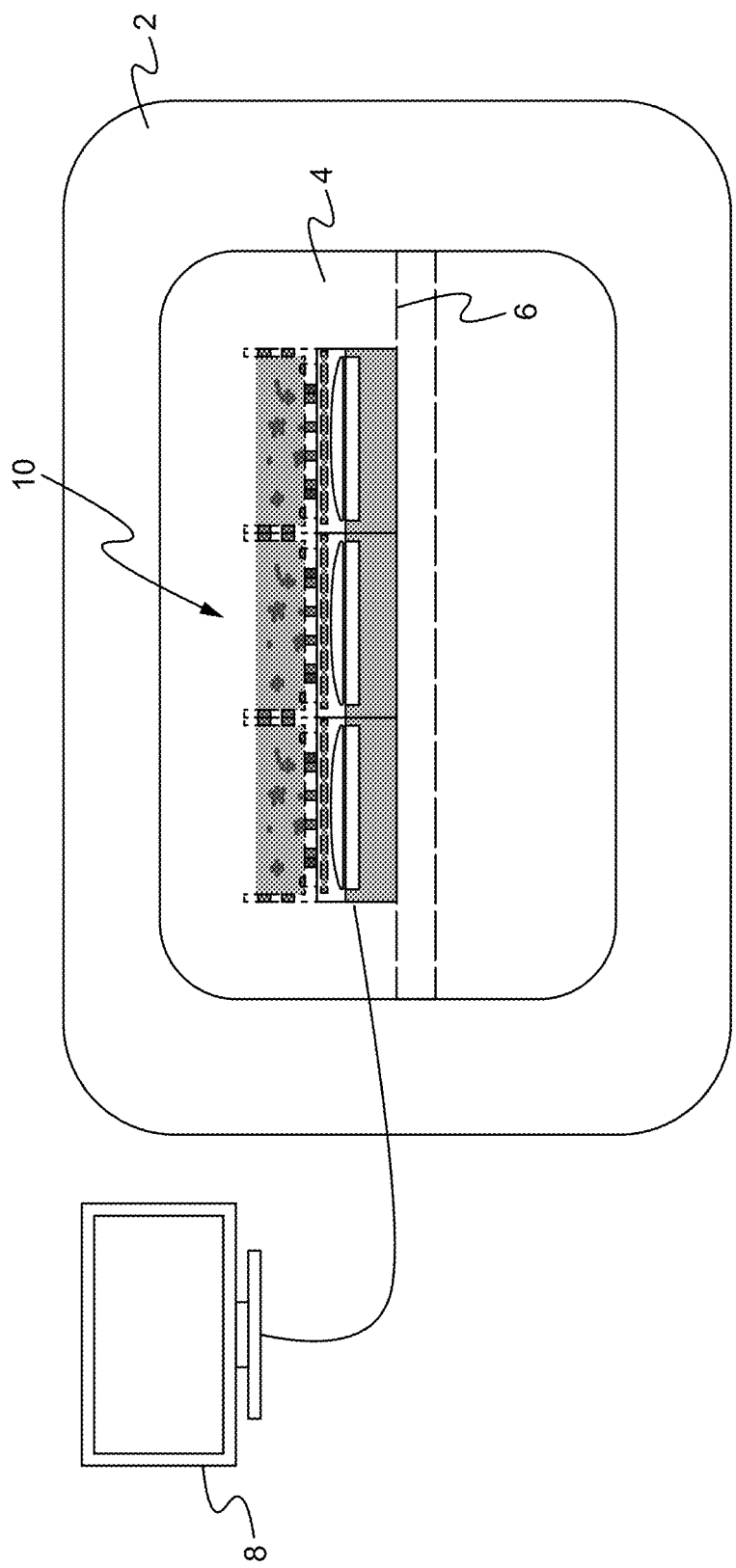
FIG. 1 illustrates a conceptual diagram of a biosensing-imaging system in an exemplary implementation according to some embodiments.

Embodiments of the present application are directed to a biosensing-imaging system. Those of ordinary skill in the art will realize that the following detailed description of the biosensing-imaging system is illustrative only and is not intended to be in any way limiting. Other embodiments of the biosensing-imaging system will readily suggest themselves to such skilled persons having the benefit of this disclosure.

Reference will now be made in detail to implementations of the biosensing-imaging system as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

The terms biosensing-imaging system or multi-sensing imaging, multi-modal sensing and imaging, and polysensing and imaging, are used interchangeably in this document.

A biosensing-imaging system is capable of tracking multiple physicochemical parameters of biological samples non-invasively and continuously. The biosensing-imaging system and methods of using the biosensing-imaging system enable new ways of detecting, monitoring, and interrogating multiplexed biomarkers. For example, new polymodal signatures and temporal/spatial correlations can be measured that would otherwise be missed by static and single endpoint measurements or summing of single mode signatures sensed by separate equipment or at different times. Intrinsic and/or extrinsic sample heterogeneity can be detected and predicted. Rates of heterogeneity and regulatory elements can be compared to explore pattern of variations in depth. In some embodiments, the biosensing-imaging system includes wells, each well having multiple different sensor types, and an incubator-friendly reader for continuous and simultaneous capture of physicochemical and phenotypic characteristics from biological samples. The biosensing-imaging system enables hosting, analyzing, and manipulating biological samples within each well. In other embodiments, every well does different sensing but at the same time. Some examples for modalities of measurements include, but are not limited to, electrical, optical, acoustic and chemical. Some examples of chemical sensors are sensor dots and foils that measure chemical analytes and create signals such as optical or electrical when exposed to different analytes. Examples of sensors include, but are not limited to, ion-sensitive FETs, chemical-sensitive FETs or sensors whose color changes. Other type of sensors are immersion sensors that are connected to a chemical reader through wired or wireless connections and measure chemical analyte changes inside the well. Other example is a system that collects samples from each well and send the samples to a chemical reader to sense and analyze chemical changes. These sensors also can be implemented either as inserts into the well or they can be implemented as packets that are dropped in the well, or they can be printed on the bottom of the well surface. When extending this concept to a multi-well implementation, the different wells can either have identical sensor capabilities, or different wells can be equipped with different sensor types. In other words, mix and match of different sensor types for different wells can be applied. Optics or electronics are used to measure the sensor outputs of the different wells.

A biological sample may be obtained from a subject. A subject can be a biological entity containing expressed genetic materials. The biological entity can be a plant, animal, or microbe, including, e.g., bacteria, bacterial plasmids, viruses, fungi, and protozoa. The subject can be tissues, single cells, cell clusters and their progeny of a biological entity obtained in vivo or cultured in vitro. The subject can be a mammal. The mammal can be a human. A biological sample may be an environmental sample. Examples of environmental samples can include air, water, soil, agricultural, or geologic.

A biological sample can comprise a plurality of cells. A plurality of cells may be present in a variety of three dimensional structures. A plurality of cells can be adherent, suspended, or a combination thereof. A plurality of cells can be adherent to one another or to a surface. Cells can be adherent to a surface and present in a monolayer, bi-layer, and the like.

A plurality of cells can be heterogeneous or homogenous. A plurality of cells may be initially homogenous and change over time to become heterogeneous. A plurality of cells may be heterogeneous and the heterogeneity may change over time, along with the properties of the cells. An example of a heterogeneous cell population that may change over time are cancer cells, which may exhibit abnormal proliferation or differentiation (e.g., as exhibited in tumor growth or tumor metastasis).

A biological sample may be solid matter, such as biological tissue. A biological tissue may comprise a plurality of cells, such as primary cells, cell lines, suspension cells, endothelial cells, fibroblasts, stellate cells, and the like.

A biological sample may be a fluid, such as biological fluid. A biological fluid can include any fluid associated with living organisms. A biological fluid may include components within the fluid. For example, a biological sample can include blood with components of the blood, such as white blood cells, red blood cells, platelets, and the like, and components thereof. A biological sample may comprise cellular components, including, for example, biomolecules and intracellular structures. Non-limiting examples of biomolecules include proteins, nucleic acids, lipids, carbohydrates, hormones, extracellular matrix, and the like. Non-limiting examples of intracellular structures include organelles such as vesicles, mitochondria, lysosomes, centrosomes, exosomes, etc. A biological sample may comprise in vitro models, such as induced pluripotent stem cells (iPS), spheroids, organoids, in vitro fertilization samples (e.g., eggs, sperms, embryo), or tumor models. A biological sample, such as tissue, may be cultured in a three-dimensional environment. A biological sample may comprise non-host components, such as bacteria, viruses, fungi, yeast, nematodes, or other microbes.

A biological sample may be obtained from any anatomical location of a subject, such as skin, heart, lung, kidney, breath, bone marrow, stool, semen, vaginal fluid, interstitial fluids derived from tumorous tissue, breast, pancreas, cerebral spinal fluid, tissue, throat swab, biopsy, placental fluid, amniotic fluid, liver, muscle, smooth muscle, bladder, gall bladder, colon, intestine, brain, cavity fluids, sputum, pus, microbiota, meconium, breast milk, prostate, esophagus, thyroid, serum, saliva, urine, gastric and digestive fluid, tears, ocular fluids, sweat, mucus, earwax, oil, glandular secretions, spinal fluid, hair, fingernails, skin cells, plasma, nasal swab or nasopharyngeal wash, spinal fluid, cord blood, emphatic fluids, and/or other excretions or body tissues.

A biological sample may be obtained from a subject using various techniques. Non-limiting examples of means to obtain a biological sample directly from a subject include accessing the circulatory system (e.g., intravenously or intra-arterially via a syringe or other needle), collecting a secreted biological sample (e.g., feces, urine, sputum, saliva, etc.), surgically (e.g., biopsy), swabbing (e.g., buccal swab, oropharyngeal swab), pipetting, and breathing. A biological sample may be obtained from any anatomical part of a subject where a desired biological sample is located.

A biological sample may be analyzed to detect a single analyte (e.g., protein or nucleic acid) or multiple analytes (e.g., protein and nucleic acid). The multiple analytes may be detected concurrently or subsequently. Analytes may be cellular and/or acellular analytes. Non-limiting examples of cellular analytes may include ions, proton, oxygen, peptide, protein, enzymes, exosomes, or nucleic acid molecules.

Analytes of a biological sample may be detected by labeling the analytes. Analytes may be coupled to a label for detection by a sensor. A label may be a composition that yields a detectable signal, indicative of the presence or absence of the analyte. A label may be directly detectable label (e.g., a fluorescent label). A fluorescent label may be any fluorescent label such as a fluorescent label (e.g., fluorescein, Texas red, rhodamine, ALEXAFLUOR® labels, and the like), a fluorescent protein (e.g., GFP, EGFP, YFP, RFP, CFP, cherry, tomato tangerine, and any fluorescent derivate thereof). A label may be indirectly detectable label (e.g., a binding pair member). An, indirect label may include biotin (a binding pair member), which may be bound by streptavidin (which may itself be directly or indirectly labeled). Non-limiting examples of labels include: a radio-label (a direct label) (e.g., 3H, 125I, 35S, 14C, or 32P); an enzyme (an indirect label) (e.g., peroxidase, alkaline phosphatase, galactosidase, luciferase, glucose oxidase, and the like); a fluorescent protein (a direct label) (e.g., GFP, RFP, YFP, and any derivatives thereof); a metal label (direct label); a colorimetric label; a binding pair member; and the like. Binding pair member may refer to one of a first and a second moiety, wherein the first and the second moiety have a specific binding affinity for each other. Non-limiting examples of binding pairs include: antigen/antibody (e.g., digoxigenin/anti-digoxigenin, dinitrophenyl (DNP)/anti-DNP, dansyl-X-anti-dansyl, fluorescein/anti-fluorescein, Lucifer yellow/anti-lucifer yellow, and rhodamine anti-rhodamine), biotin/avidin (or biotin/streptavidin) and calmodulin binding protein (CBP)/calmodulin. Any binding pair member may be suitable for use as an indirectly detectable label.

A label may be detected using suitable detection methods. For example, cellular components such as mitochondria may be labelled with a directly detectable label, such as a fluorescent label (e.g., MitoSox Red dye). The fluorescent label may be detected using an optical measuring modality. In another example, cellular components such as proteins may be detected using a binding member pair, such as antigen/antibody. The protein may be contacted with a labeled primary or labeled secondary antibody and binding of the protein with the labeled antibody may be detected using suitable modality, such as chemical modality. The chemical modality may detect activity of an enzyme (e.g., peroxidase) coupled to the antibody, indicative of binding of the antibody to the protein.

Analytes may be detected using label-free techniques. Label-free detection may be accomplished, for example, using label-free imaging, sensor dots, electrical, impedance, spectrometric methods, microscopy, biomolecular interactions, chemical, electrochemical or acoustic measurements.

Analytes may be cellular components, such as nucleic acid molecules, DNA or RNA, for example. Nucleic acid molecules may be coupled to a label for detecting the nucleic acid molecules. Nucleic acid molecules may be processed prior to detection. For example, nucleic acid molecules may be amplified, prior to detection. In such cases, the label may be detectable as nucleic acid molecules undergo amplification. In another example, nucleic acid molecules, such as RNA, may be reverse transcribed in order to detect the nucleic acid molecules. Labels may be covalently or non-covalently (e.g., ionic interactions) coupled with the nucleic acid molecules. In some cases, a label coupled to nucleic acid molecule may be an optically-active dye (e.g., a fluorescent dye). In some cases, a label may be a sequence-specific oligonucleotide probe that is optically active when hybridized with a complementary nucleic acid molecule. In some other cases, a label may be a radioactive species. Methods for detecting nucleic acid molecules may include optical detection methods (e.g., fluorimetry and UV-vis light absorbance), spectroscopic detection methods (e.g., mass spectrometry, nuclear magnetic resonance (NMR) spectroscopy, and infrared spectroscopy), electrostatic detection methods (e.g., gel based techniques, such as, gel electrophoresis) or electrochemical detection methods (e.g., electrochemical detection of amplified product after high-performance liquid chromatography separation of the amplified products).

Modalities may be selected based on the detection methods. For example, optical measuring modality may use a confocal microscopy module for detecting a fluorescent label. In another example, an impedance measuring modality may use a module for measuring conductivity in order to determine the changes in impedance. Chemical measuring modality may use detect products of a chemical reaction, such as substrate conversion by an enzyme. Acoustic measuring modality may detect absorbance and/or transmission of sound waves through a biological sample.

Signals obtained from the detection method using one or more modalities may be measured by one or more sensors. The measured signal may be combined or separately analyzed to generate a profile for a biological sample, such as a cell population. For example, the signals from an optical measuring modality may be measured by sensors to determine physical, and/or chemical profile of the cell population. The signals may be used to determine physical profile, such as morphological profile including size, shape, cellular components, and the like. The signals may be used determine chemical profile, such as concentration of analytes.

The wells can contain a gel, e.g. a 3D laminin rich gel, to facilitate 3D growth of cells, or other biological samples, cultured within the wells. Each well can also contain a culture media that is specific for each biological sample to be analyzed and provides, for example, nutrient materials, serum, and/or antibiotic for culturing each sample type.

FIG. 1 illustrates a conceptual diagram of a biosensing-imaging system in an exemplary implementation according to some embodiments. A biosensing-imaging system 10 is configured to be removably installable within an interior chamber 4 of an incubator 2. In some embodiments, the biosensing-imaging system 10 is configured to be positioned on a rack 6 within the interior chamber 4. The biosensing-imaging system 10 is coupled to an external electronic device 8. In some embodiments, the incubator 2 includes an interface (not shown) that enables electrical and network interconnects to be made between devices within the incubator 2, such as the biosensing-imaging system 10, and devices external to the incubator 2, such as the external electronic device 8. In some embodiments, the external electronic device 8 is a host processing device, such as a computer or server. In some embodiments, the incubator in which the biosensing-imaging system is placed in replaced by a smaller incubator in which the slide, or slide and slider holder, is placed. In this case, the incubator can include a $CO_2$ port and modules for controlling temperature and humidity. The smaller sized incubator is made from a transparent material such as glass or plastic.

Figure 2:
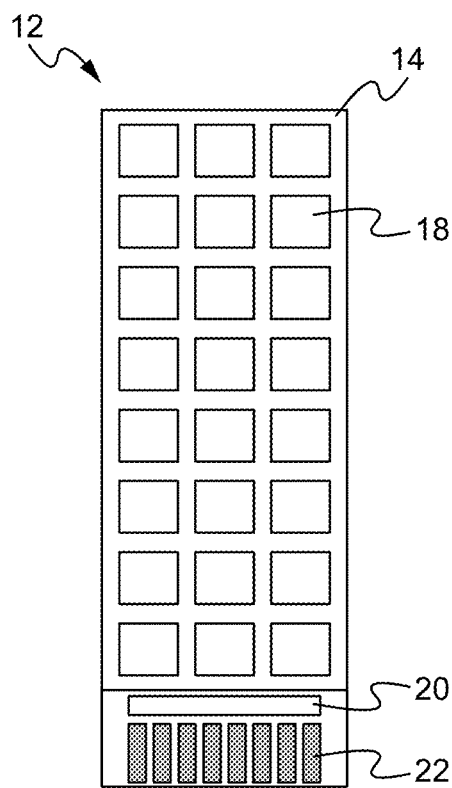
FIG. 2 illustrates a top down view of a slide according to some embodiments.
Figure 3:
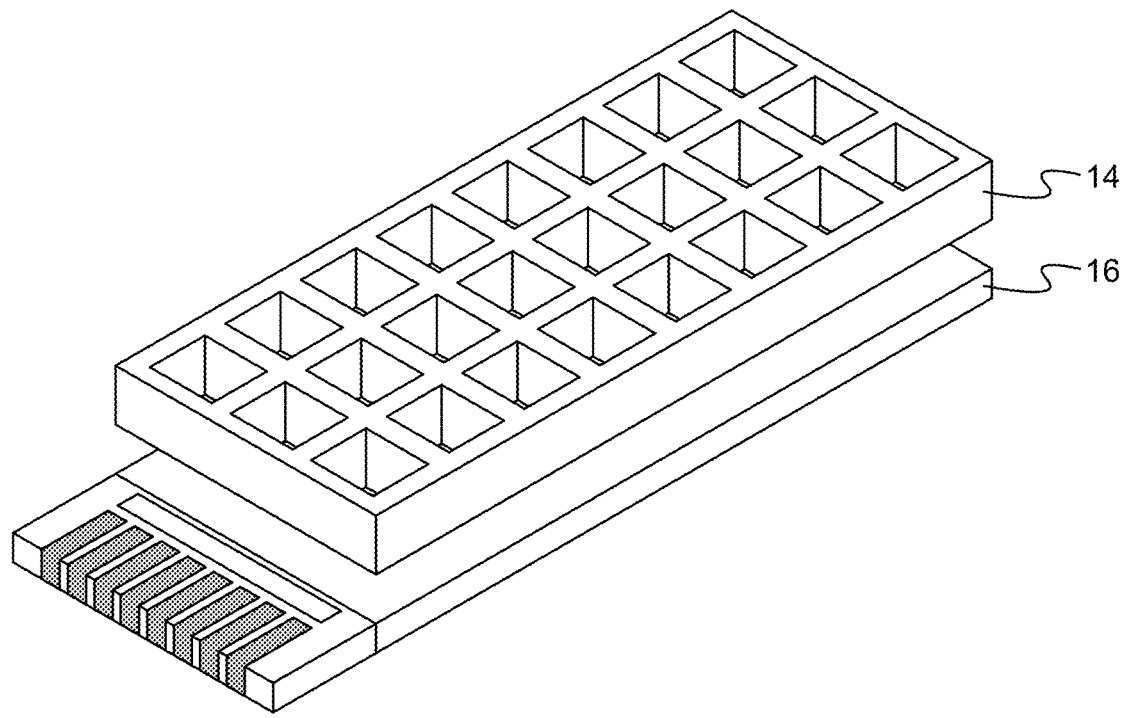
FIG. 3 illustrates an exploded view of the slide in FIG. 2.

The biosensing-imaging system 10 combines stand-alone disposable slides with disposable or non-disposable electronics each configured for placement and continuous use within the incubator. FIG. 2 illustrates a top down view of a slide 12 according to some embodiments. FIG. 3 illustrates an exploded view of the slide 12 in FIG. 2. The slide 12 includes a well wall structure 14 mounted to a bottom substrate 16. The well wall structure 14 provides side wall structure for a plurality of wells 18. The wells can be arranged in a variety of patterns and/or sizes, for example diameters and depths. It is understood that the well configuration shown in FIG. 2 is for exemplary purposes only, and that many alternative configurations are also contemplated. It is also understood that although the configuration shown in FIG. 2 shows wells having the same size and spacing, it is understood that slides can be configured with wells having different sizes and patterns.

The bottom of each well 18 is formed by a corresponding portion of the bottom substrate 16. The bottom substrate 16 includes multiple sensors per each well 18 and multiplexer circuitry 20 such as switches that provide access to the sensors. The multiplexer circuitry 20 enables selective access to each of the individual sensors and corresponding sensor signals. In some embodiments, the multiplexer circuitry 20 includes individual addressable select lines for selectively accessing the sensor signals from each individual sensor. In some embodiments, the sensor signals are transmitted off-slide by external connectors 22. The slide 12 functions to carry the source of optic, electrical such as impedance, and acoustic stimulus in addition to data capture and transfer.

The slide 12 includes optically transparent regions that enables each well 18 to be optically interrogated. In some embodiments, the entire bottom substrate 16 is optically transparent. In some embodiments, portions of the bottom substrate 16 are optically transparent, for example regions directly underneath each well, and other portions of the bottom substrate 16 are optically opaque, for example regions between the wells. As described in greater detail below, the slide 12 can be optically interrogated from either or both of the top and the bottom of the wells.

Figure 4:
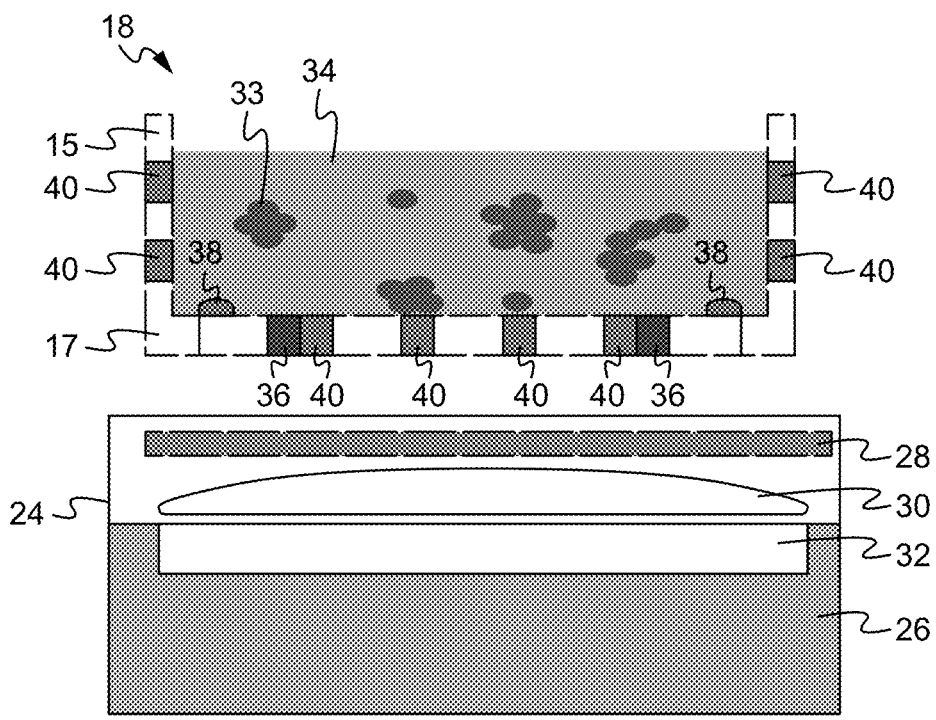
FIG. 4 illustrates a cut-out side view of the biosensing-imaging system as applied to a single well according to some embodiments.

The biosensing-imaging system 10 also includes non-disposable electronics, such as the non-disposable electronics 24 in FIG. 4. In some embodiments, the non-disposable electronics are coupled to a single slide. In other embodiments, the non-disposable electronics are coupled to a plurality of slides. The biosensing-imaging system 10 shown in FIG. 1 is configured with non-disposable electronics 24 coupled to a plurality of slides. FIG. 4 illustrates a cut-out side view of the biosensing-imaging system as applied to a single well according to some embodiments.

The concepts and functions of the biosensing-imaging system are described below in the context of a single well. It is understood that the concepts and functions can be extended to apply simultaneously to all wells within a single slide and to all wells in a plurality of slides. The non-disposable electronics 24 are configured to perform optical interrogation of the well 18 and related data capture, as well as provide electronic circuitry for implementation of impedance measuring using electrodes and acoustic measuring using acoustic sensors coupled to each well. The non-disposable electronics 24 includes components such as a reader 26, a filter 28, an optical lens 30, and a camera 32. As shown and described in greater detail below, the reader can also include additional control and processing circuitry, such as actuators and actuator control circuitry, system control, and data and image processors. Although the optical lens 30 and the camera 32 are each shown as single optical components, it is understood that the optical lens 30 and the camera 32 are intended to represent any number of optical components configured to receive light from the well 18 and to optically transmit the received light to an imaging sensor within the camera. The filter 28, the optical lens 30, and the camera 32 are collectively referred to as an imaging unit. The reader 26 is electrically coupled to the connectors 22 (FIG. 2) of the bottom substrate 16. In some embodiments, the reader 24 includes pogo pins arranged to mate with the connectors 22 on the bottom substrate 16. In this case, the connectors can be flat contact pads. In other embodiments, the connectors 22 are configured as a plug or other type of adapter, and a connecting wire with appropriate configured adapter can be used to connect the connectors 22 to the reader 24.

A light source is used to illuminate the interior of the well 18 and enable optical interrogation of the fluid sample stored therein. In some embodiments, a light source is positioned below the well, included as part of the camera 32. In other embodiments, the light source is positioned above the well 18, such as the light source 42 positioned over the well 18 in FIG. 5.

Each individual well 18 is formed by side walls 15 and a bottom wall 17 for storing a fluid sample 34. A fluid sample is a gel, liquid, or other medium that includes the biological sample 33 to be analyzed. Although subsequently described below in terms of analyzing a cell, it is understood that application is not limited to a cell, or a cell colony, and generally applies to a biological sample. The side walls 15 are part of the well wall structure 14 (FIG. 3), and the bottom wall 17 is a portion of the bottom substrate 16 (FIG. 3). Liquid and biological samples can also form in a drop shape hanging from lid (not shown).

Figure 6:
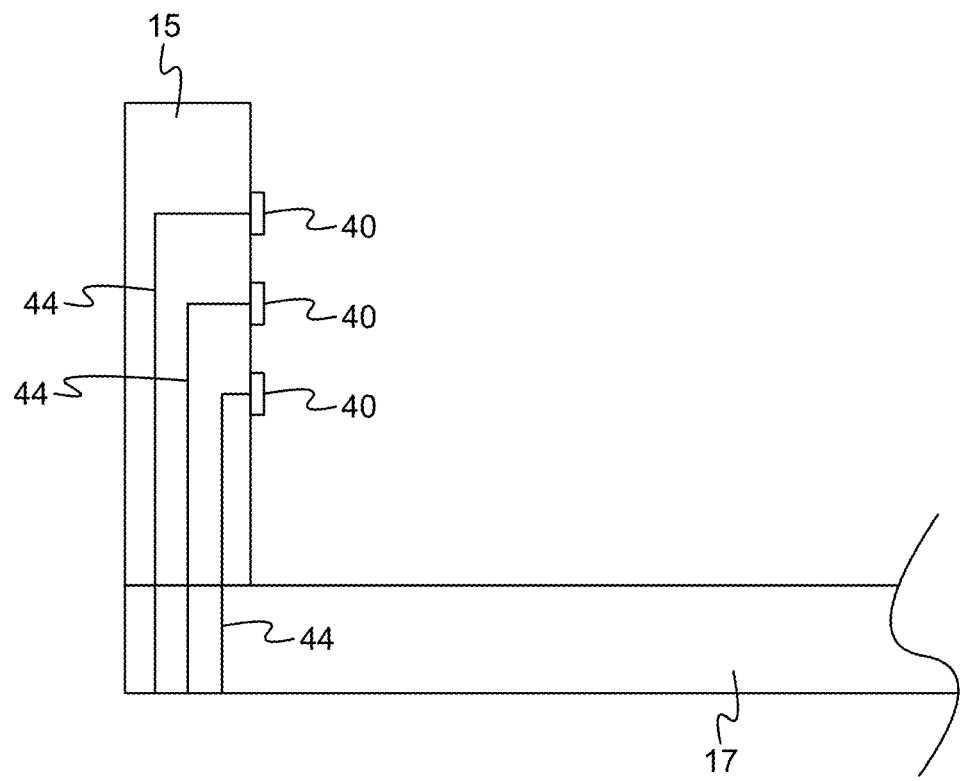
FIG. 6 illustrates a cut-out side view of a well side wall with electrodes attached to the interior surface according to some embodiments.
Figure 7:
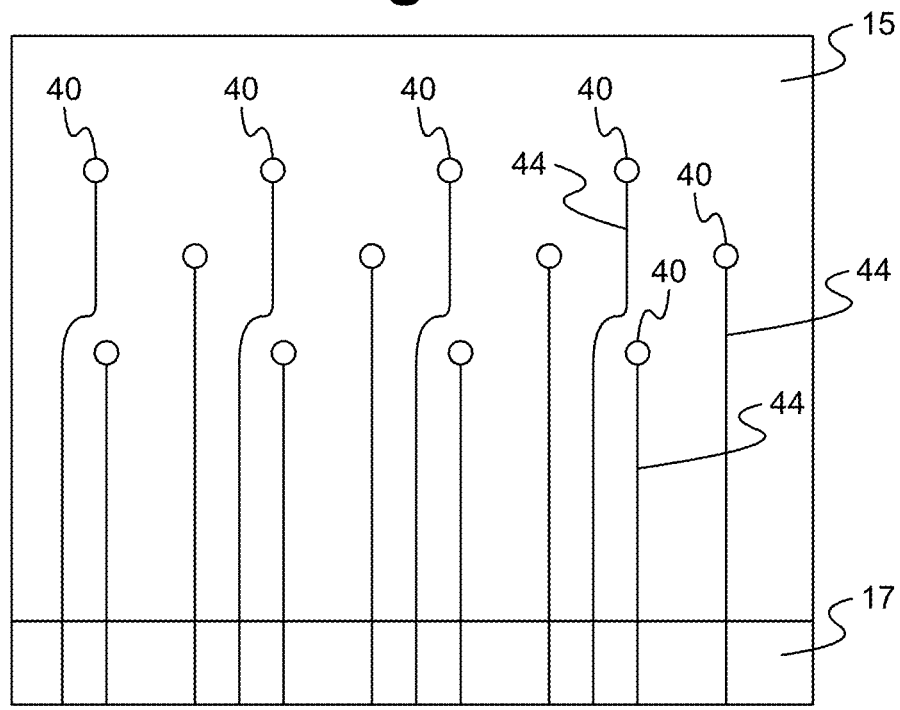
FIG. 7 illustrates a back side view of the well side wall with electrodes of FIG. 6.

A plurality of electrodes 40 are coupled to the side walls 15 and the bottom wall 17, which enable two-dimensional and three-dimensional impedance measuring. Two-dimensional impedance measuring refers to cells adhering to an electrode as a single layer and measuring the impedance at that electrode. The bioimaging-sensing system also has the capability to measure the impedance if the cell structure is not attached to the electrode or if it is attached and has a thickness that is greater than a single layer of cells on the electrode. In some embodiments, the electrodes 40 are embedded within the side walls 15 and the bottom wall 17, as shown in FIG. 4. Conductive interconnects (not shown), such as wires or patterned traces, connect each electrode 40 to the multiplexer circuitry 20 (FIG. 2) of the bottom substrate 16. The conductive interconnects are embedded within the well wall structure 14 and the bottom substrate 16. In other embodiments, the electrodes are attached to an interior surface of the well side walls and to an interior surface of the well bottom wall, where the interior surfaces are those surfaces exposed to the interior of the well 18. FIG. 6 illustrates a cut-out side view of a well side wall 15 with electrodes 40 attached to the interior surface according to some embodiments. A conductive interconnect 44 is connected to each of the electrodes 40. In the exemplary configuration shown in FIG. 6, the conductive interconnects 44 are positioned within the side wall 15 and are routed downward to the bottom substrate 16 (not shown). FIG. 7 illustrates a back side view of the well side wall 15 with electrodes 40 of FIG. 6. It is understood that the conductive interconnects can be alternatively routed, such as along an interior surface of the well. In some embodiments, the conductive interconnects are electrically conductive wires. It is understood that alternative forms and materials can be used for the conductive interconnects. As used herein, the terms "wires" and "conductive interconnects" are used interchangeably and are intended to convey the general concept of an electrically conductive pathway.

The well wall structure 14, including all well side walls 15, and the bottom substrate 16, including the well bottom wall 17 for each well 18, are mechanically and electrically connected to each other. In some embodiments, the conductive interconnects terminate as a contact pad at an interface surface of each of the well wall structure 14 and the bottom substrate. When properly aligned to each other, contact pads on an interface surface of the well wall structure 14 are aligned with corresponding contact pads on an interface surface of the bottom substrate. In some embodiments, a conductive epoxy or pressure sensitive solder material is used to connect the corresponding contact pads. It is understood that alternative connection techniques can be utilized including, but no limited to, spring loaded connectors. In some embodiments, a biocompatible adhesive material provides the necessary sealing between the two. The adhesive material has two functions. One is to provide mechanical rigidity to the well wall structure/backplane construction. The second is to provide a sealing function to avoid leakage of the liquids that are inside the well. It is understood that the well wall structure 14 and the bottom substrate 16 can be attached using other conventional attachment techniques including, but not limited to, heat bonding the contacting surfaces of each to one another. In other embodiments, the well wall structure 14 and the bottom substrate 16 are a single integrated unit with the conductive interconnects embedded within.

The electrodes are configured to have the proper electrical interface to the contents of the well. This proper interface is capacitive and non-ohmic. The electrodes are composed of material that is biocompatible and does not have any chemical reactions with the fluid sample in the well. This non-ohmic characteristic is usually denoted as a double-layer capacitor (C-dbl).

The purpose of the electrodes is to measure the impedance that is present between any selected electrode pair, as selected through the multiplexer circuitry. The field lines between a pair of electrodes traverses through the cell in the well. The impedance of the cell affects the overall impedance that is measured. By adding electrodes to the side walls as well as the bottom wall of the well, the number of field lines that can be measured is increased. Increasing the number of measurable field lines enables better characterization of the cell impedance, where multiple different measured magnetic field lines are used to measure the cell impedance. In some embodiments, the electrodes are made of gold (Au) or Indium-Tin-Oxide (ITO). It is understood that the electrodes can be made of alternative electrically conductive material that are biocompatible. Similar materials can be used for the conductive interconnects from each electrode to the edge of the well. Different material can be used for the electrodes and for the conductive interconnects. For example, the electrodes can be made of Au and the conductive interconnects made of ITO, which is transparent and therefore does not interfere with optical interrogation of the well interior. In some embodiments, the conductive interconnects have an outer insulating layer to reduce the interference from this routing layer on impedance measurements. If the insulating layer is omitted, an impedance measurement is still obtained, but its value is different than a measurement obtained using insulated conductive interconnects. Both approaches yield valid measurements.

The relative positions and geometries of the electrodes can be varied. In some embodiments, the electrodes are arranged in the form of stripes that traverse in one of the X or Y directions, relative to the planar interior surface of either the side wall or the bottom wall. A benefit of this approach is that the amount of multiplexing of the routing is minimized. The amount of signal coupling for impedance measurement is maximized, but spatial resolution is relatively poor. In other embodiments, the electrodes are arranged in the form of square, octagonal, or hexagonal pads on the well side walls and/or bottom wall. A benefit of this approach is that the various pads can be selected in order to gain a better measurement of impedance in the x-y domain. A down-side is that the number of electrical connections is higher and the routing of these signals is more difficult. The number of pads is another design consideration. The more pads, the better the spatial resolution. At the same time, the more pads there are, the more challenging is the routing. The spatial distribution of the pads is another design consideration. In some embodiments, a higher density of pads is positioned at or near the center of the well than at the periphery of the well. Such a configuration is beneficial for an anticipated condition where the cell is most likely placed close to the center of the well. It is understood that alternative spatial distributions and density considerations are also contemplated.

The conductive interconnects, or wiring, function to electrically connect the electrodes to the reader. As previously described, the wiring can connect the electrodes to the multiplexer circuitry of the bottom substrate 16, and the multiplexer circuitry is in turn electrically connected to the reader. In such embodiments, the wires can extend outside the well structure and eventually connect to the multiplexer circuitry. This routing can be provided in any of a variety of ways. The wiring can extend beyond the well wall interior surfaces and can then connect to the bottom of the slide through vias. Alternatively, the wiring can terminate underneath the well walls, and can connect to the bottom of the slide through vias. Still alternatively, the wiring can extend beyond the well walls and have pads on an exterior surface such that a clamped device can connect to these pads. The clamped device can include conductive interconnects for connecting to the bottom substrate or directly to the reader. It is understood that there are alternative routing paths for configuring conductive interconnects through the wall structures of the slide.

The multiplexer circuitry 20 functions to select between the different conductive interconnects and reduce the number of connections to the reader. Without multiplexing, the wires can be connected directly to the reader.

Figure 8:
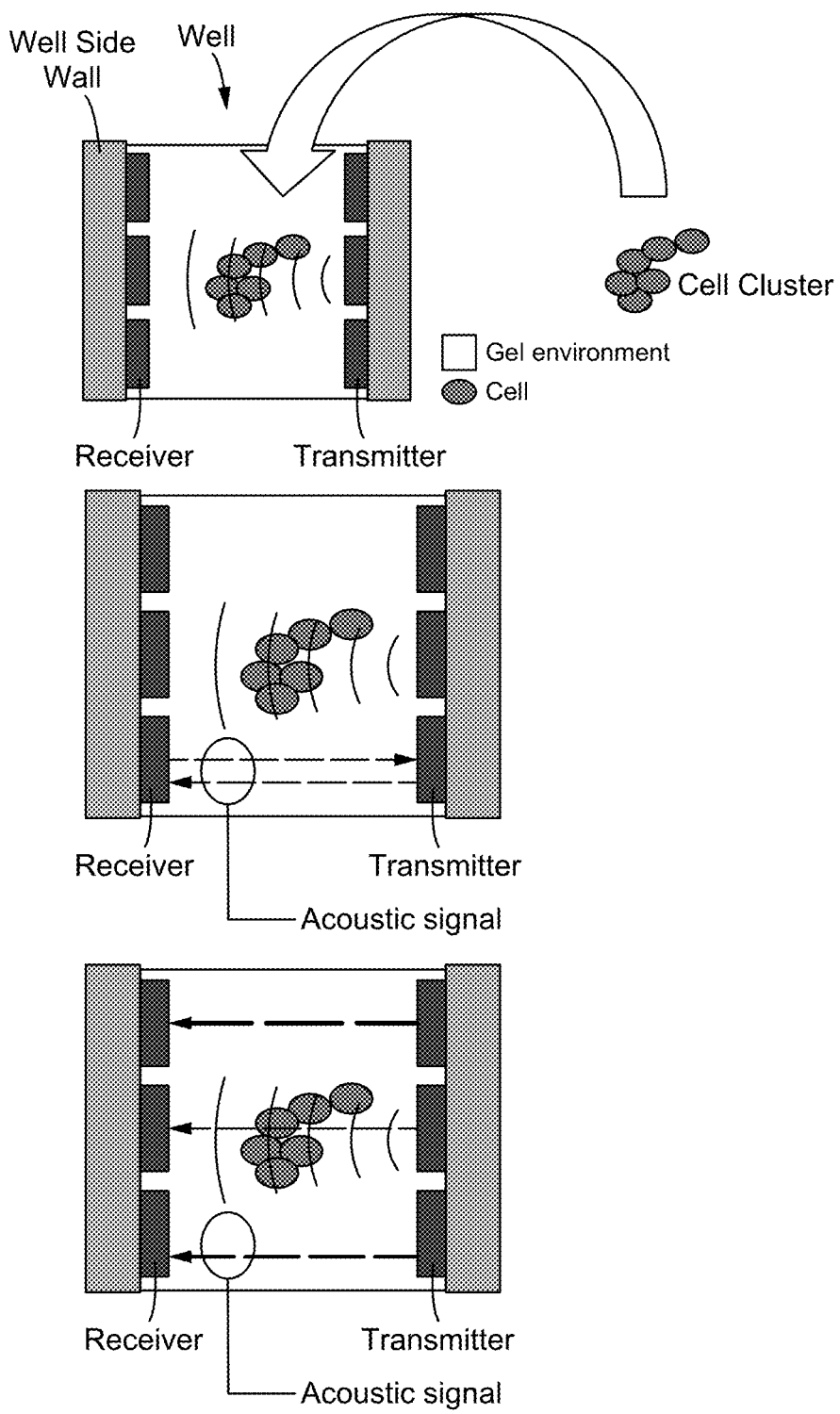
FIG. 8 illustrates an exemplary application of acoustic sensors to the well side walls.

Referring again to FIG. 4, the bottom wall 17 can also include one or more acoustic sensors, such as a piezoelectric receiver, used in conjunction with a piezoelectric ultrasound transmitter and piezoelectric film. One or more acoustic transducers (transmitters) and receivers, collectively referred to as acoustic sensors, can be installed on side wall of each well, as shown in the top diagram of FIG. 8, or insert wall, as described in detail below. Also, acoustic sensors can be installed on the bottom surface of the well, but in a sparse manner, to prevent occluding optics. Mechanical properties, such as material stiffness, can also be measured using the acoustic sensors based on travel time of sound waves and known stiffness of the environment. The middle diagram in FIG. 8 shows measuring of travel time for acoustic waves to travel back and forth between acoustic sensors on the same side of the well, and the bottom diagram of FIG. 8 shows measuring of travel time for acoustic waves to travel from one side of the well to the other opposing side.

The bottom wall 17 includes thermal elements 36, such as a Peltier element, used to control a temperature of a fluid sample placed within the well 18. Each thermal element 36 is electrically connected to the reader 26. The thermal element 36 can be controlled by control circuitry in the control circuitry in the reader 26 or control circuitry in an external control and processing system electrically connected to the biosensing-imaging system 10.

The bottom wall 17 can also include one or more temperature sensors (not shown) for measuring a temperature within the well 18. The temperature sensor can be of the type that is used commonly in the industry (semiconductor based, thermistor, etc.). The temperature sensors can be interrogated via electrical signals. The associated wiring for the temperature sensors can be similar as the wiring used for the electrodes. Alternatively, the temperature sensors can be of the type that are interrogated optically. There are materials that can be used whose color changes with temperature. These temperature sensor dots can be printed on a bottom surface of a well and their color can be measured by the imaging unit. In the case of using optically based temperature sensor dots, calibration dots can also be printed whose color corresponds to different temperatures, but whose color is fixed (i.e. temperature independent). This enables calibration of the temperature sensor relative to known color responses.

Referring again to FIG. 4, indicators 38 are positioned on the interior surface of the bottom wall 17. The indicators 38 are used for chemical sensing. The indicators 38 are chemical detectors used to measure the chemical composition inside the well 18. There are multiple use cases for which this is important. The cells are living organisms and modify their environment from a chemical perspective. It is important to be able to measure the change in chemistry that is caused by these cells. The chemistry to be measured can include, but is not limited to, pH, $O_2$, $CO_2$, cellular metabolites, reactive oxygen species (ROS), sugars and glucose, fat and other relevant chemistries such as secreted glycosaminoglycans and exosomes. For example, there are chemical detectors whose composition is tuned for detecting pH, other chemical detectors are tuned to detecting $O_2$, and still other chemical detectors are tuned to detecting $CO_2$. It is understood that chemical sensors can be used with different chemistries and compositions that are sensitive to other chemical parameters of interest to be measured. Each type of chemical detector, pH for example, can be further customized such that its color response is optimal for a given range of pH. For example, one chemical detector can have the highest sensitivity or response for a range of pH from 7 to 8, while another chemical detector can have its highest sensitivity or response for a range of pH from 6 to 7. In this manner, a set of chemical detectors can be used that are tuned for a given chemistry $C(i,j)$ with i=1 to n and for a particular range of concentrations with j=1 to m. In addition to the types of chemical detectors noted above, specific chemical detectors can be deposited to detect other secretomes. Monitoring multiple metabolites and/or secretomes is not a matter of simply extending single analyte detection, they are interdependent and in some cases, colony dependent.

In some embodiments, the indicators 38 are ISFETs (ion-sensing field-effect-transistor) for measuring ion-concentrations in the fluid sample. The electrical signals output from the ISFETs can be translated to pH measurements. In other embodiments, the indicators 38 are chemical sensor dots whose color changes based on the chemistry they are exposed to. The chemical sensor dots can be interrogated optically. Similar to above, each chemical sensor dot can be tuned for sensitivity to one type of chemistry and for a specific range of concentrations. These chemical sensor dots can be printed on the bottom surface of a well and their color can be measured by the imaging unit. Calibration chemical sensor dots can be used whose color corresponds to different chemistries and concentrations, but whose color is fixed. This enables the calibration of each chemical sensor dot relative to known color responses.

The thickness of the chemical sensor dots is to be reasonably well controlled, as the thickness of the chemical sensor dots impacts the level of optical signal that is received by the imaging unit coupled to the slide. The background color of the fluid sample or other media within the wells can also have an impact on the sensed color of the chemical sensor dots by the imaging unit. There are mitigation strategies for this effect. The chemical sensor dots can be covered with a porous cover that allows chemicals to move through but blocks out the color from the surrounding fluid sample. This cover can be reflective or it can be of some other fixed color. The porosity of the chemical sensor dots can also have an impact on the sensed signal by the imaging unit.

The size of the chemical sensor dots is also a design consideration. Small chemical sensor dots result in less optical signal and are more difficult to identify. Ideally, these chemical sensor dots are measured by multiple pixels on an image sensor so that pixels of least importance can be discarded, for example the pixels at the edges of the chemical sensor dots. This capability can be achieved in software, where the boundaries of a chemical sensor dot are determined, edge pixel information is discarded, and the main measured signal comes from the center of the chemical sensor dot. Larger chemical sensor dots are preferred for better signal acquisition, since more averaging across the chemical sensor dot can be accomplished. At the same time, the larger chemical sensor dot can also occlude the imaging of the cell colony within the well.

The placement of these chemical sensor dots is another design consideration. If the chemical sensor dots are placed near the edge of a well, proximate the well side wall, or on the side wall, then there is less occlusion of the cell colony for the imaging unit. It is possible that the chemical concentrations are non-uniform in the well, in which case multiple placements of chemical sensor dots may be necessary. The placement of multiple chemical sensor dots can allow for quantifying chemical gradients inside the well. This can be done in a number of ways with the x-y positioning as a variable. A chemical gradient can be computed as a delta in reading between two chemical sensor dots divided by the distance between the chemical sensor dots. This constitutes a first order gradient. In the limit, when there are a very large number of chemical sensor dots (such as a line of chemical sensor dots), then the chemistry can be effectively plotted as a function of position. This may not be linear, but a first derivative can be determined, a second derivate, etc. using this information. Considerations are taken into account for minimizing the optical coupling between adjacent chemical sensor dots. One consideration is to increase the spacing between adjacent chemical sensor dots.

All of the above properties of the chemical sensor dots can be measured on QA (quality assurance) samples and documented for each batch using a unique identifier for each slide.

The unique identifier (ID) can be printed as an array of black or multi-color identification dots on the slide to encode a serial number. This can be accomplished by dedicating a section of the slide for placing identification dots. These identification dots can be printed on the slide such that their placement and color creates a unique signature for each slide. These identification dots can be printed on the top surface of the slide (either within a well or adjacent the well), or they can be printed on the bottom surface of the slide. This mechanism is analogous to bar-coding, but instead, it is a dot-coding. In the case of monochromatic identification dots, the number of identification dots is larger in order to convey the unique ID. In the case of color identification dots, the alphabet for the ID can be increased and a unique ID can be achieved in a much smaller area. In the embodiments described above, placement of the chemical sensor dots is de-coupled placement of the unique ID function. In other words, there is some pattern of chemical sensor dots whose function is solely to measure chemistry and there is another pattern of identification dots whose function is to solely denote a unique ID. Alternatively, both functions can be combined such that an array of sensor dots performs both functions.

The unique ID for a slide can correspond to a calibration table for the slide. In this case, knowing the ID of a slide, there is a table of characteristics that can be stored on the cloud or other mass storage devices that describe various properties of the slide. For example, the batch from which the chemical sensing dots came from, the thickness of the chemical sensing dots, the porosity of the chemical sensing dots, and the like. This information allows for compensation due to the variations of these batch of chemical sensing dots when making optical measurements. Similar identifying information can be included in the calibration table for the temperature sensor, for example whether the temperature sensor is an electrical sensor or an optically based sensor.

The unique ID can be placed inside of each well to show the specific characteristics of each well. This allows the imaging unit to read the ID during its normal course of operation, for example the imaging unit reads the identification dots as it also reads the chemical sensor dots, the temperature sensor dots, and takes the image of the cell colony within the well. Alternatively, the unique ID can be placed outside of the well structure. The calibration table associated with this ID can contain information that is specific to each well. By placing the unique ID in an area outside of the well, the imaging unit has to focus on this region. The unique ID can also be implemented electrically. This can be done by having a series of shorts and opens on a set of pads that can be read by the imaging unit. These shorts and opens can be created in a number of ways. One of the ways is to print conductive inks where shorts are to be created.

Figure 5:
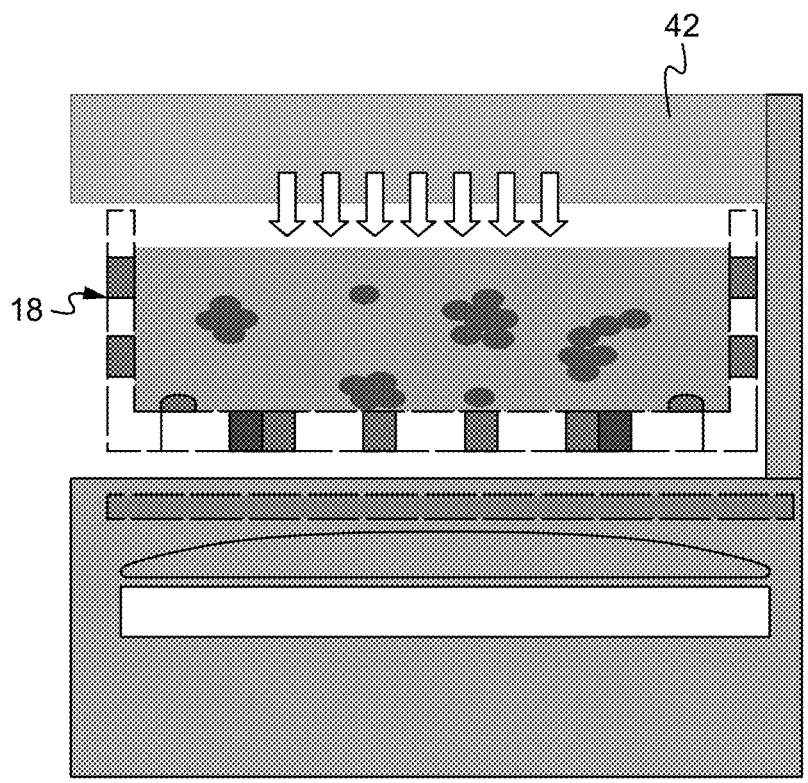
FIG. 5 illustrates a cut-out side view of the biosensing-imaging system as applied to a single well according to other embodiments.

In order to determine the color of any of the aforementioned sensor dots, such as the chemical sensor dots, the temperature sensor dots, or the calibration dots, the sensor dots need to be illuminated In some embodiments, the sensor dots are illuminated by the light applied generally to the rest of the interior of the well, such as by the light source positioned below the well (FIG. 4) or above the well (FIG. 5). In this case, reflectance characteristics of the sensor dots are measured. If it is intended to measure the optical transmission characteristics of the sensor dots, then a light source that illuminates the sensor dots from above is used, such as the light source 42 positioned above the wells (FIG. 5), and the resulting transmitted light is sensed at the bottom side of the well. With the light source positioned above the well, the gel within the well is positioned between the light source and the sensor dots. An issue here is that over time the color of the gel may change (turbidity). If so, then the light illuminating the sensor dots has color components that affects the color reading of the sensor dots. One way to overcome this issue is to place the light source as close to the sensor dots as possible. In some embodiments, light is piped from the light source to a nominal distance above the sensor dots. For example, a transparent cylinder, or alternatively shaped volume, extends from the top of the well to a small distance above the sensor dots on the well bottom surface. This transparent cylinder can route light directly to above the sensor dots without the use of reflective surfaces. In this case the light comes from above, moves through the transparent cylinder without being altered by the turbidity of the gel, and impinge on the surface of the sensor dots, with minimal interference from the turbidity of the gel above the sensor dots.

Figure 9:
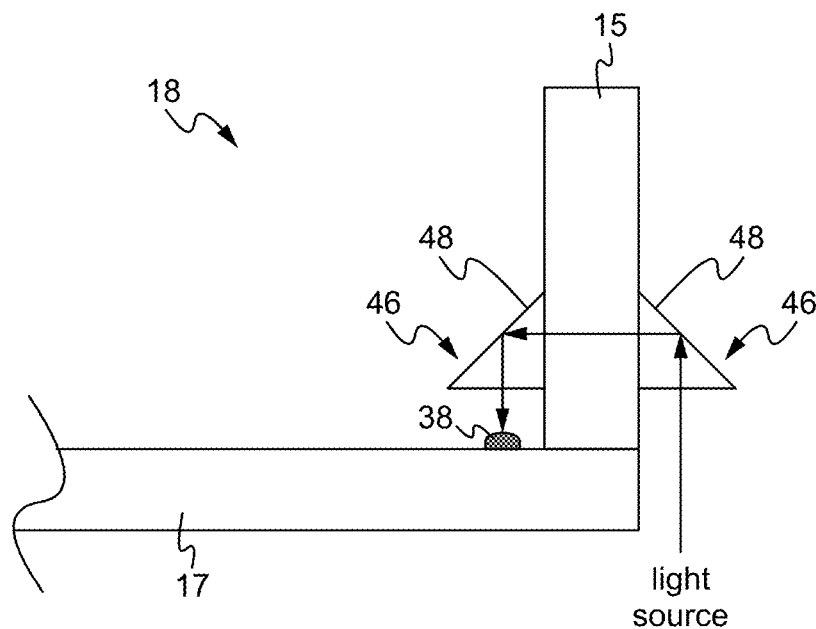
FIG. 9 illustrates a cut-out side view of a perimeter portion of a well with routing optics for illuminating a sensor dot according to an embodiment.

This distance is small enough to minimize the color distortion from the gel and is large enough to allow chemical diffusion to the sensor dots, in the case where the sensor dot is a chemical sensor dot. In other embodiments, light is directed through the well side walls onto the sensor dots using incident light routing optics. FIG. 9 illustrates a cut-out side view of a perimeter portion of a well 18 with routing optics for illuminating a sensor dot according to an embodiment. The exemplary configuration shows an indicator 38 (a sensor dot) positioned on the interior surface of the bottom wall 17 and proximate to the side wall 15. A reflective surface, such as s glass prism 46 with reflective surface 48, is positioned on either side of the side wall 15 such that light from a light source below the well 18 is directed onto the indicator 38, since the well side wall and bottom wall are made of transparent material, such as glass. Similar routing optics can be used to direct light from a light source positioned above the well. As shown in the exemplary configuration of FIG. 9, one of the reflective surfaces 48 (left side) is positioned within the well 18, and the other reflective surface 48 (right side) is positioned exterior to the well, and exterior to the well wall structure 14 (FIG. 3). Such a configuration is implemented for a well positioned at a perimeter of the slide, where at least one of the side walls forms a perimeter edge of the well wall structure. This implementation is particularly useful for a single well slide, where a reflective surface can be positioned at an exterior side surface of the well wall structure.

Figure 10:
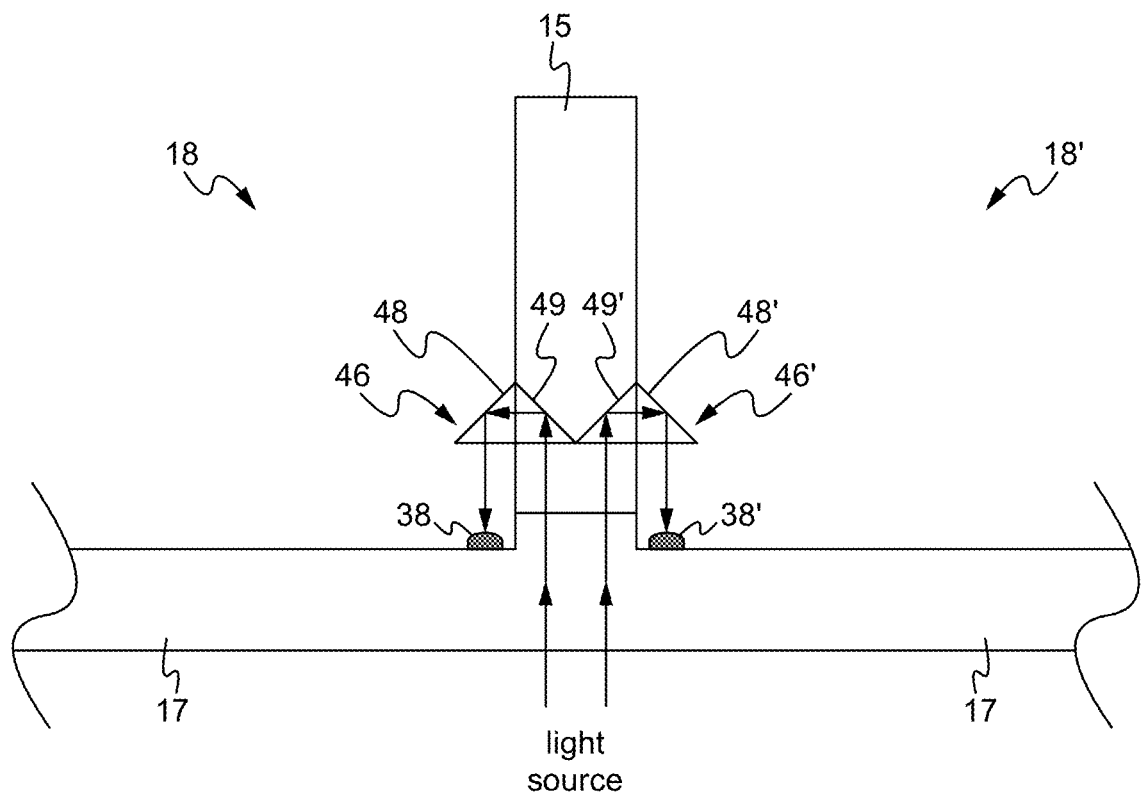
FIG. 10 illustrates a cut-out side view of a portion of adjacent wells with routing optics for illuminating a sensor dot according to an embodiment.

The implementation shown in FIG. 9 is not as useful for those interior positioned wells that do not have a side wall at the perimeter of the well wall structure. For these interior wells, one reflective surface would be positioned in the well, but the other reflective surface would be positioned in an adjacent well. Alternatively, the separation between wells can be increased to accommodate reflective and optical routing structures between the wells. As another alternative, reflective surfaces can be configured within the actually well side walls. FIG. 10 illustrates a cut-out side view of a portion of adjacent wells with routing optics for illuminating a sensor dot according to an embodiment. The exemplary configuration shows an indicator 38 (a sensor dot) positioned on the interior surface of the bottom wall 17 and proximate to the side wall 15 of well 18, and an indicator 38' positioned on the interior surface of the bottom wall 17 and proximate to the side wall 15 of well 18'. A reflective surface, such as a glass prism 46 with reflective surface 48, is positioned on the side wall 15 in well 18, and a reflective surface 49 is configured within the side wall 15 such that light from a light source below the bottom wall 17 is directed onto the indicator 38 via the reflective surface 49 and the reflective surface 48, since the well side wall and bottom wall are made of transparent material, such as glass. Similar routing optics can be used to direct light from a light source positioned above the well. As shown in the exemplary configuration of FIG. 10, one of the reflective surfaces 48 (left side) is positioned within the well 18, and the other reflective surface 49 is positioned within the well side wall 15. Similarly, a reflective surface, such as a glass prism 46' with reflective surface 48', is positioned on the side wall 15 in well 18', and a reflective surface 49' is configured within the side wall 15 such that light from a light source below the bottom wall 17 is directed onto the indicator 38' via the reflective surface 49' and the reflective surface 48'.

Another technique for overcoming potential color sensing error of the sensor dots due to the turbidity of the gel over time is to cover the sensor dots with a porous but optically reflective layer, so that light shining from below reflects off of the reflective layer and is unaffected by the gel color above it. Alternatively, the sensor dots can be covered with a highly optically absorptive material, again to shield the color of the gel from the sensed color.

The sensor dots are described above as being color sensor dots whose color is read by optical interrogation. In other embodiments, the sensor dots can be alternatively configured. For example, sensor dots can be electrical in nature, meaning by changing the concentration of chemicals of interest the resistance or conductivity of sensor dots change. In this case, each sensor dot can be connected to a conductive interconnect in a similar manner as the electrodes described above.

Chemical sensors dots can either measure the chemical signal in real-time through measuring and monitoring color or electrical change such as conductivity change after exposing to chemical of interest. In general, sensor dots can take various shapes and forms such as solid, semi-solid, or membrane, that can sense and detect specific chemical analytes qualitatively and quantitively through different mechanism including, but not limited to, changing optical properties such as color (color, fluorescent, luminance) and changing electrical properties (such as impedance and polarity). The chemical sensor dots can be printed or attached using adhesives inside the wells, on the side-walls or on inserts (as described in greater detail below).

Chemical sensing is described above as being accomplished using chemical sensor dots. Alternative methods are also contemplated. In some embodiments, the biological sample from each well is passed through a microfluidic system that can include a pipe, a pump, valves, and the like to collect and transfer the biological sample to a chemical measurement unit and back into the well.

Figure 11:
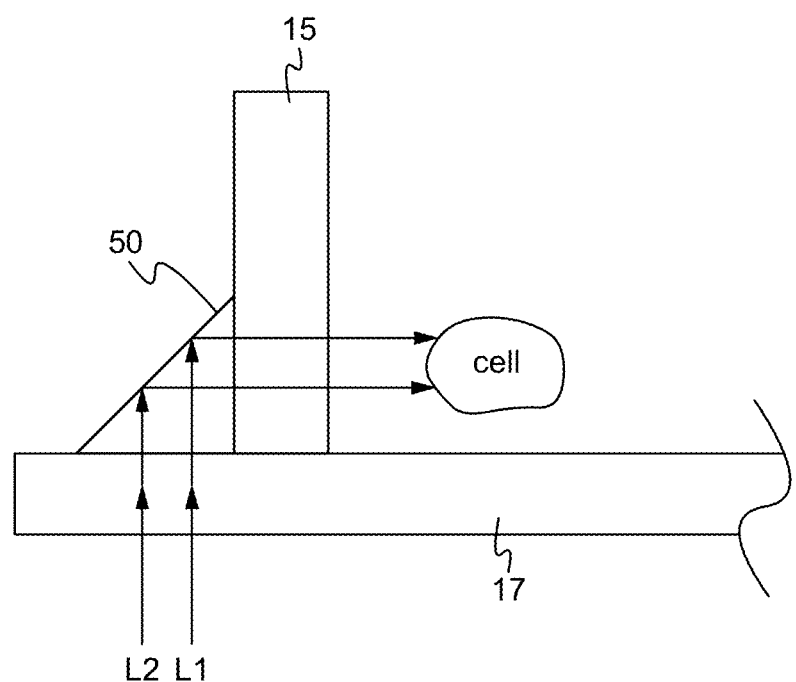
FIG. 11 illustrates a cut-out side view of a perimeter portion of a well with routing optics for illuminating the well through the well side wall according to an embodiment.

One method of illuminating the cells within a well is to shine light from above the well, as in FIG. 5. Another method is to shine light from below the well, as in FIG. 4. An alternative, or supplemental, method is to shine light on the cells in a well-defined trajectory through the side-walls in a similar manner as that used to illuminate sensor dots. FIG. 11 illustrates a cut-out side view of a perimeter portion of a well 18 with routing optics for illuminating the well through the well side wall according to an embodiment. The exemplary configuration shows a reflective surface 50 positioned to reflect light from a light source below the bottom wall 17 into the well 18 through the side wall 15, since the well side walls are made of transparent material, such as glass. Similar routing optics can be used to direct light from a light source positioned laterally above the well. As shown in the exemplary configuration of FIG. 11, the reflective surface 50 is positioned on the opposite side of the well side wall 15 as the well 18. Light from a light source below the bottom wall 17 is directed onto the well 18 via the reflective surface 50. Such a configuration is implemented for a well positioned at a perimeter of the slide, where at least one of the side walls forms a perimeter edge of the well wall structure. This implementation is particularly useful for a single well slide, where a reflective surface can be positioned at an exterior side surface of the well wall structure. Such a configuration can also be implemented for those interior positioned wells, where the reflective surface is positioned in a well adjacent to the well 18. In this case, the wells having reflective surfaces positioned therein may be left empty of fluid sample to be analyzed. Alternatively, the well side wall can be used as an optical piping medium in a manner similar to that shown in FIG. 10.

An advantage of using this side wall illumination method is that a very specific position on the cell wall can be illuminated. Once a specific position on the cell wall is illuminated, the optical reflection can be measured by an image sensor within the imaging unit. The optical reflection of a focused light beam is different from the reflection that is obtained when the light source is a broad-beam light source. For example, referring again to FIG. 11, light can be focused as light beam L1 onto a first position of the cell wall, the optical reflection of which is measured by the image sensor. The focused light beam can then be moved (scanned), light beam L2, to illuminate a second position on the cell wall. The fact that the optical reflection can be measured from a specific point on the cell wall provides much more information about the shape of the cell. The focused light beam can scan the entire side-view of the cell. Additional reflectors (not shown) can be positioned around the well 18 to scan the entire surface of the cell to map the side-walls of the cell with great accuracy. This information augments the information obtained by imaging the cell from below, or above, using other forms of impinging light.

In general, the light source is positioned in a manner such that the incident light impinging the image sensor is from either light reflected off of or light transmitted through any objects (biological sample) present in the well and the sensor dots. It is a design consideration to avoid saturating the optical system with direct reflections or transmissions from the light source where possible. A variety of polychromatic or monochromatic light sources can be used in this system including, but not limited to, LED-based or laser-based at a range of wavelengths, for example from visible to near infrared, or at a fixed wavelength. Some applications can use hyper spectral imaging systems. Other applications can use light sheets. A light sheet generates a large and thin plane of light that illuminates a sample orthogonally to the detection objective such that the axial resolution of the imaging unit is determined wholly or partly by the thickness of the light sheet. Use of a light sheet enables fast 3D volumetric imaging with reduced sample irradiation compared to other illumination methods. The light source, or optical elements coupled to the light source, provide a light cone that is cylindrical in form, whose footprint on the image sensor is approximately circular. In this case, a collimated light is directed toward the image sensor, where the angle of incidence of light is confined to +/−X degrees perpendicular to the image sensor. If X=0, then the light source is considered a highly directional, but then the full optical sensitivity of the image sensor is not used. If X is too large, then the light rays that are coming from a wide angle relative to the surface of the image sensor are not as effective in generating a signal from the image sensor. So, the value of X is tuned to maximize the output signal from the image sensor while minimizing the total light dose that the cells in the well are exposed to. The color temperature of the light source is to be measured and controlled. The reference point for this color temperature measurement can come from some combination of measuring the color of the calibration dots.

Although the biosensing-imaging system is described primarily in regard to implementations that rely on transmitted or reflected light from an external light source, the biosensing-imaging system can also be configured to detect fluorescence. The fluorescence can consist of, but is not limited to, label-free native fluorescence, label-specific fluorescence, voltage sensitive fluorescence, activatable fluorescence, and multiplexed fluorescence for a variety of optical interrogations. Information can be obtained from an intact system via label-free approaches, manipulated cell, environment or cell/environment interfaces via label-specific approaches, or combinations as listed above.

Figure 12:
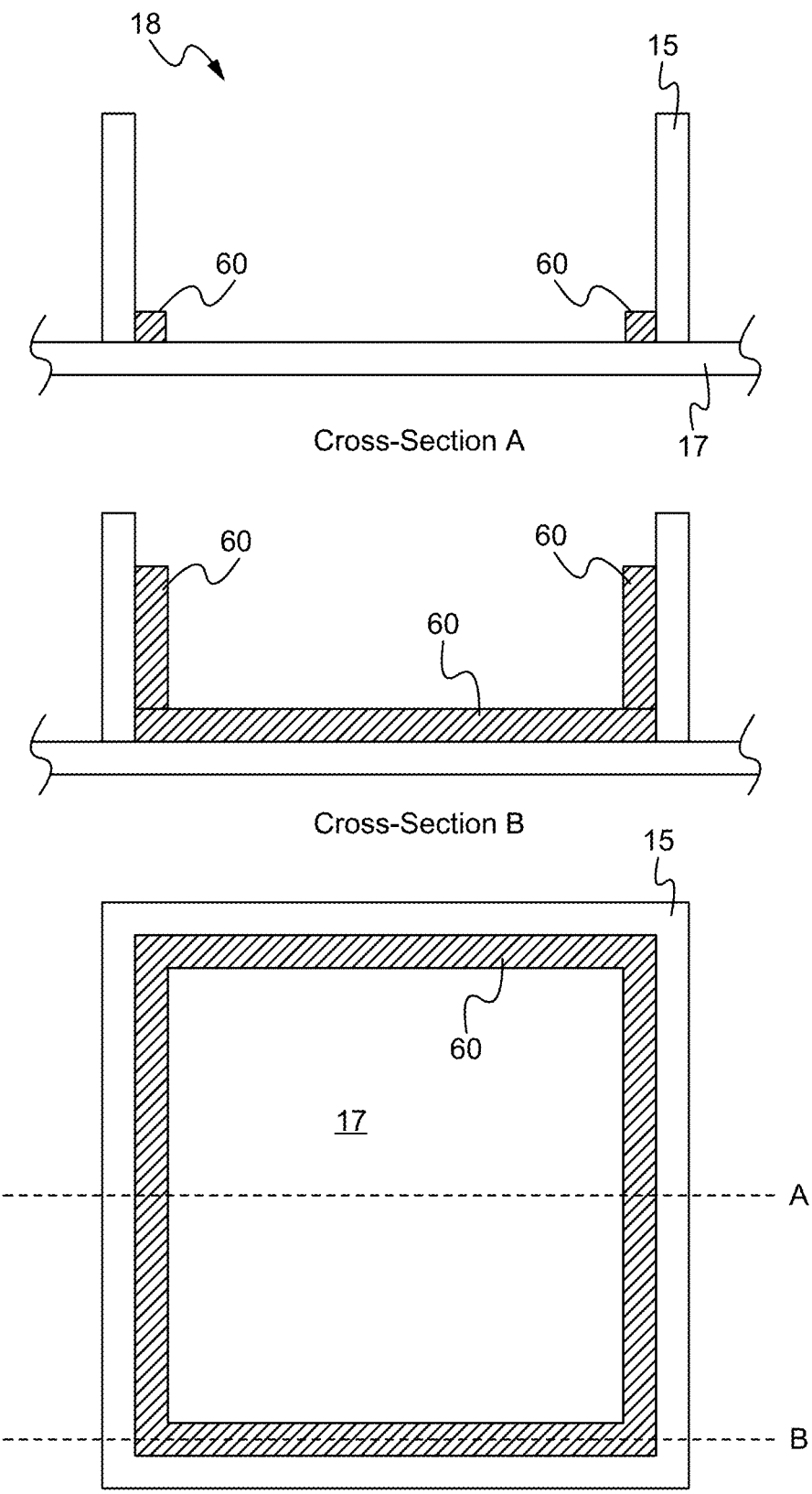
FIG. 12 illustrates exemplary placement of highly thermally conductive materials in specific spots within the well according to some embodiments.

As described above, each well can include a thermal element, such as a Peltier element, used to control a temperature of a fluid sample placed within the well. In some embodiments, a thermal element is coupled with the slide and the reader in a fashion that enables proper temperature control of the wells and the contents therein. The tradeoffs related to such an implementation are that at one extreme, great thermal coupling can be achieved by placing the thermal element over a large area of the bottom of each well, but such a configuration occludes the imaging window for the imaging unit. At the other extreme, a large optical window can be provided, but with poor thermal coupling. A solution is to place highly thermally conductive materials in specific spots in the well that are away from the optical window. In some embodiments, these areas consist of the corners of the well (horizontal and vertical). FIG. 12 illustrates exemplary placement of highly thermally conductive materials in specific spots within the well according to some embodiments. In the exemplary configuration shown in FIG. 12, highly thermally conductive material 60 is placed at the corners and adjoining interfaces of the side walls 15 and the bottom wall 17. In general, the highly thermally conductive material is thermally conductive, electrically insulating material, such as thermal grease or a thermally conductive silicone. Strategic placement of the thermally conductive materials enables the thermal element to be in good thermal contact with these thermally conductive materials and can impose effective thermal control. In some embodiments, the thermal element is attached to an underside of the bottom wall of the well directly underneath the thermally conductive material positioned within the well. The thermal element is configured to have a matching footprint of the thermally conductive material so as to minimize optical occlusion. In some embodiments, a gap can be formed in the well side walls, and a thermally conductive medium is placed in the gap. The gap can extend out the top or bottom of the well side wall so as to expose the thermally conductive medium within the gap. The thermal element can then be coupled to the exposed thermally conductive medium. Alternatively, the thermal element is coupled to the sides of the well side walls. A benefit of this arrangement is that thermal elements are not included in the disposable slide, the slide simply has heat sinks, made of the highly thermally conductive material, that are placed in a limited number of places in the well. In an exemplary application, a gel is first introduced into the well, followed by introduction of a cell colony to be analyzed. Initially, the gel is to be kept in liquid form, approximately 4 degrees Celsius. Once the cell colony is introduced into the liquid gel, the temperature of the gel is increased to approximately 37 degrees Celsius. This can be done through the thermal element. Additionally, the reader and the slide are positioned in an incubator. The incubator is temperature controlled to 37 degrees Celsius. The thermal element is still active in this environment but the amount of thermal regulation it needs to do is substantially reduced because the environment is temperature controlled. The other function of the thermal element is to prevent the heat that is generated from the non-disposable electronics 24 (FIG. 4) from creating a temperature rise in the well. The thermal element in effect becomes a thermal shield between the non-disposable electronics and the well. In general, the system should provide rapid thermal equilibration followed by thermal isolation, temperature stability, and parallel detection of the temperature of the wells. Temperature sensing of the wells can be used in order to provide feedback to the thermal element or to simply note the temperature of the biological sample in case it is not being properly thermally regulated.

As previously described, chemical sensor dots can be used that change color when exposed to different analytes. This change in color is detected by the optical system. Some chemical sensor dots are peak detectors that peak detect the exposure to an analyte because the reaction of the chemical sensor dot is not reversible. Using chemical sensor dots is effective for determining a one-time detected value of the analyte. However, use of some chemical sensor dots can be less effective, or in some cases ineffective, for making continuous, or a series of discrete, measurements over time. A method and structure are developed that enable the use of an array of chemical sensor to be serially exposed to analyte over time that provide continuous or over time sensing of certain analyte(s) to create and measure specific sensed signal(s). The method enables time-controlled exposure of chemical sensor dots to one or more acellular or cellular analyte(s) to create one or more signals continuously or at certain time points. Time-controlled exposure of chemical sensor dots to analyte(s) are achieved by providing a protective layer and coating around the chemical sensor dots that can be removed at certain time points using various means including laser pulses, electrical pulses, ultrasound pulses, or physicochemical swelling and dissolution. A container is formed that stores an array of chemical sensor dots and blocks the analyte from reaching the chemical sensor dots. The container can be as simple as a protective coating that is deposited above the sensor. Each container can be activated, for example opened up to the analyte, by some sort of stimulus.

Figure 26:
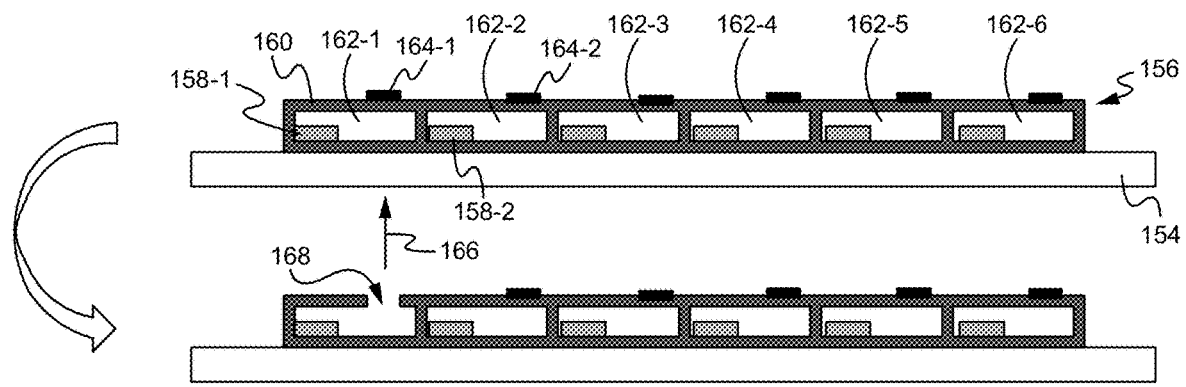
FIG. 26 illustrates a cut out side view of a chemical sensor array according to some embodiments.
Figure 27:
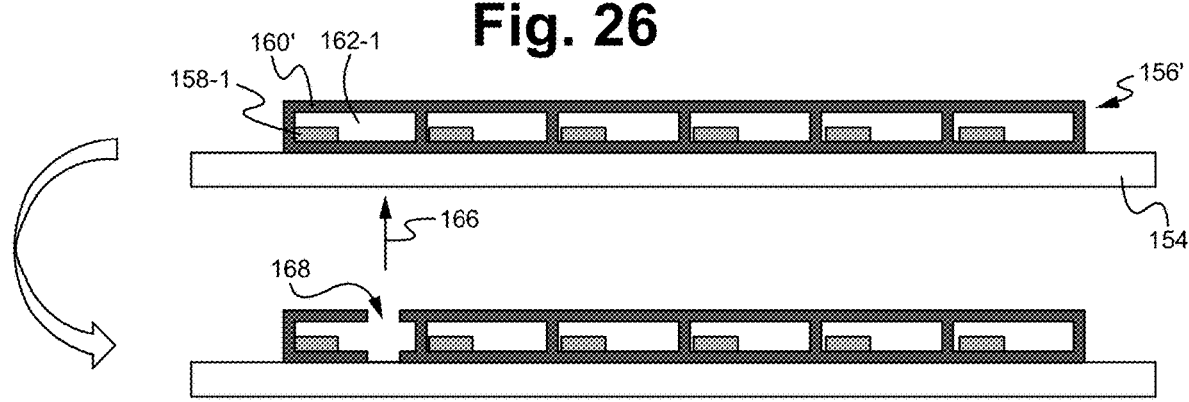
FIG. 27 illustrates a cut out side view of a chemical sensor array according to other embodiments.

FIG. 26 illustrates a cut out side view of a chemical sensor array according to some embodiments. The chemical sensor array 156 is positioned on a bottom wall 154 of a well. The chemical sensor array 156 includes a protective layer or container 160 having a plurality of isolated compartments 162. A chemical sensor dot 158 is positioned within each compartment 162. When intact, the protective container 160 prevents material outside the protective container 160, such as biological sample, from entering the compartments 162. The protective container 160 is made of optically transparent material so as to enable optical interrogation of the chemical sensor dots 158. An absorptive layer 164 is attached to each compartment 162. To activate the chemical sensor dot 158-1 in the compartment 162-1, laser light 166 is directed at the absorptive layer 164-1 corresponding to the compartment 162-1. The absorptive layer 164-1 absorbs energy from the laser light 166, and upon reaching an energy threshold level punctures the protective container material of the compartment 162-1 forming an opening 168. Opening 168 causes chemical sensor dot 158-1 to be exposed to the biological sample in the well. In some embodiments, the gel is mixed with liquid media so it can flow over time and enter the compartment through the opening to reach the sensor. The chemical sensor dot 158-1 is then optically interrogated to obtain a sensed signal. A period of time later, the compartment 162-2 can be activated by directing laser light to the absorptive layer 164-2 and optically interrogating chemical sensor dot 158-2. Over a period of time, successive compartments 162-3, 162-4, 162-5, and 162-6 can be similarly activated (opened) to acquire a series of sensed signals over time. In some embodiments, the laser light itself is sufficient to puncture the material of the protective container 160. In this case, there is no need for an absorptive layer. FIG. 27 illustrates a cut out side view of a chemical sensor array according to other embodiments. The chemical sensor array 156' of FIG. 27 is the same as the chemical sensor array 156 of FIG. 26 except there is no absorptive layer and the protective container 160' is punctured directly by the laser light to form openings 168.

There are multiple techniques that can be used for making sure the laser light hits the right target, for example the absorptive layer. In one technique, the optical system uses fiducials to properly line up position of the laser. In another technique, target zone are used to determine where the laser light has actually hit. This is analogous to taking a shot on a practice area to determine where the laser light hits, and then adjusting the position of the laser accordingly.

As an alternative to laser light, ultrasonic pulses can also be used. This is an extension of the above techniques to deliver a burst of energy by laser that ruptures the protective container. In a fashion that is analogous to the laser based technique, an acoustic absorptive layer (similar to the laser absorptive layer) can be attached to each compartment of the chemical sensor array. Acoustic energy is directed at the acoustic absorptive layer for a targeted compartment, and when the acoustic absorptive layer absorbs enough energy, the material corresponding to the targeted compartment is punctured, thereby exposed the enclosed chemical sensor dot to analyte surrounding the chemical sensor array.

Figure 28:
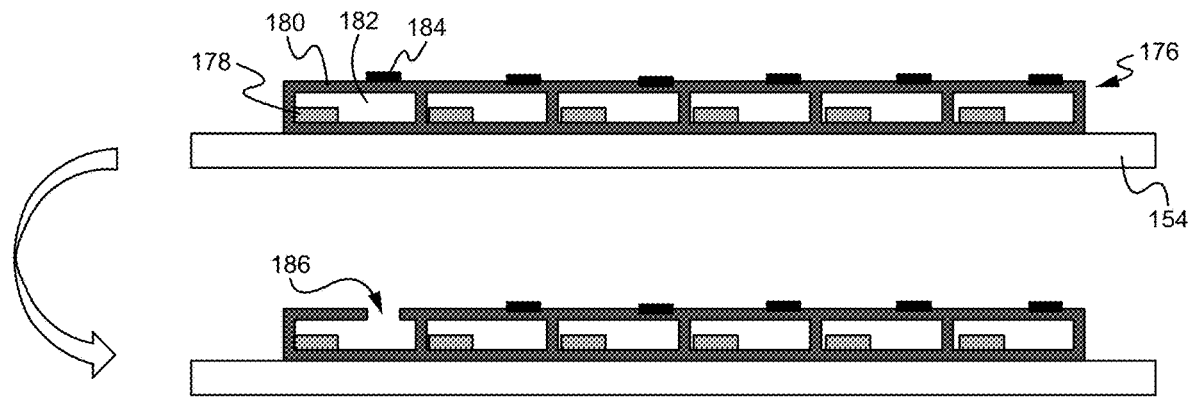
FIG. 28 illustrates a chemical sensor array according to still other embodiments.
Figure 28:
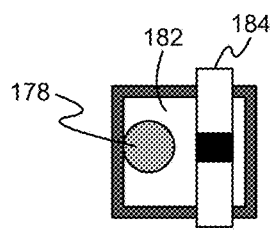

In some embodiments, an electrical pulse can be used instead of laser light to selectively puncture the protective container of the chemical sensor array. FIG. 28 illustrates a chemical sensor array according to still other embodiments. The top two drawings show a cut out side view of the chemical sensor array, and the bottom drawing shows a top down view of a single compartment of the chemical sensor array. The chemical sensor array 176 of FIG. 28 is similar to the chemical sensor array 156 of FIG. 26 except that a conductor 184 is used instead of absorptive layer 164. When sufficient current is applied to the conductor 184, the material of a protective container 160 is punctured, forming an opening 186 into a compartment 182 and exposing a chemical sensor dot 178. The conductor 184 includes a pair of electrical conductors routed to an intervening resistive layer. The resistive layer is designed to heat and puncture the material of the protective container 180 once an electrical pulse of current is applied to it.

Figure 29:
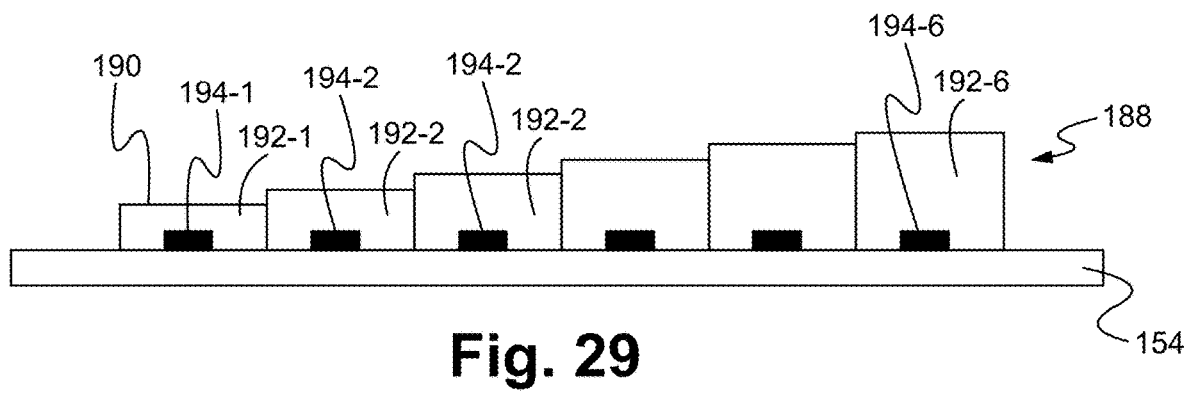
FIG. 29 illustrates a cut out side view of a chemical sensor array having a protective container formed with stepped thicknesses according to some embodiments.

In some embodiments, the protective container is made of material that dissolves over time and exposes the underlying sensor to the analyte. The protective container can have different thicknesses. FIG. 29 illustrates a cut out side view of a chemical sensor array having a protective container formed with stepped thicknesses according to some embodiments. The chemical sensor array 188 includes a protective container 190 formed from material that dissolves over time when exposed to the gel or other specific liquid media present. The thickness of the protective container material is stepped in thickness such that the chemical sensor dot 194-1 is exposed faster than the chemical sensor dot 194-2 because the thickness of the protective container section 192-1 is less than the thickness of the protective container section 192-2. Instead of using a stepped thickness pattern, the thickness of the protective container material can be tapered, such as tapered protective container 198 shown in FIG. 30. The protective container material can be made from different materials that can be dissolved at different time point. Alternatively, the protective container material can be the same material with different cross link density that provides different solubility, swelling, and permeation characteristics.

The side views of FIGS. 25-29 show the chemical sensor array in a single dimension. It is understood that the chemical sensor array can extend in two dimensions, for example into the page. Furthermore, a variety of sensor types can be placed in each compartment. Alternatively, different sensor types can be placed in different compartments.

Although described above as a chemical sensor array having a plurality of chemical sensor dots, it is understood that the structure can be generally applied to other types of sensors for delayed exposure to the well analytes. The sensor types include, but are not limited to, biological, chemical, physical, electrical, optical or combinatorial sensors. Analyte(s) include acellular and cellular analytes. Cellular analyte are totality of secreted organic molecules and inorganic elements by biological cells, tissues, organs, and organisms in to media. Some examples are ions, proton, oxygen, peptide, protein, enzyme, exosome, biological molecule such as DNA, RNA, mRNA, and aptamer. A sensed signal is the output of exposure of a sensor to an analyte which is a specific change compared to a baseline including, but not limited to, chemical, physical, electrical, optical, color (including visible, fluorescence, luminescence, phosphorescence), thermal, and magnetic changes.

In order to obtain an impedance measurement, sinusoidal waveforms of known amplitude and frequency are imposed across selected electrodes according to some embodiments. These sinusoidal waveforms can be generated by using DACs (digital-to-analog converters). The reader includes circuitry for applying appropriate electrical signaling to the electrodes, such as between select electrode pairs, and processing the resulting signals. There are many circuit configurations that can impose an electrical signal/waveform on two electrodes and provide an amplified version of the current that is flowing through the electrodes.

Primary functions of such circuits include imposing a sinusoidal waveform on the two electrodes, measuring the current that flows through the electrodes, and amplifying this measurement and converting it to a voltage. In some embodiments, the DACs generate high fidelity sinusoidal waveforms over different frequencies to create a frequency sweep. Application of the sinusoidal waveform to a select electrode, and measurement of the current at the opposing electrode of the select electrode pair provides a relationship between the stimulus waveform (voltage) and the current through the electrode (converted to voltage). These two voltages can then be digitized through an ADC (analog-to-digital converter). The bit stream that comes from the ADC can then be analyzed in the digital domain. The impedance measurement can be obtained from this digital bit stream through standard techniques that are well known in the industry. Any combination of electrodes can be used to form an electrode pair, with impedance measurements made for any number of different electrode pair combinations. The sinusoidal waveforms imposed on the two electrodes can be a sinusoidal voltage waveform or a sinusoidal current waveform.

If there is measurable signal coupling that comes from adjacent wires connected to the electrodes, then there are ways in which the measured signal coupling can be "nulled" out, commonly referred to as de-embedding. De-embedding is used in high frequency circuits where parasitic coupling at high frequencies can be significant. The same principles can be used here, where a fluid sample is measured that does not have a cell colony in it. The impedance characteristic is stored in a calibration table and is used for compensating the obtained result when a cell colony is present. This can be done through a calibration cycle.

In addition to imposing sinusoidal waveforms on the electrodes, there may be a need to impose an arbitrary waveform across the selected electrodes and to measure the resultant current in order to determine a transfer function. This arbitrary waveform can be generated by using a DAC and a microprocessor based system that generates the necessary codes for the DAC to create the desired waveform, such as, but not limited to, pulses. The current sensing circuitry and ADC then digitize the effective current measurement and store the stimulus and response in memory. Further analysis can be performed on the arbitrary waveform and the resultant current to determine an appropriate transfer function. A series of different arbitrary waveforms allows further characterization of this transfer function. This section essentially describes a more generalized form of impedance measurement. It is understood wherever reference to impedance is made herein (measured with a sinusoidal input waveform), the generalized transfer function described above can also be used. In other words, impedance is a subset of the generalized transfer function described above. Therefore, reference to impedance also applies to the generalized transfer function.

The preceding data capture and analysis results in impedance versus frequency information. This data is stored and can be used for further analysis. For example, a curve of impedance versus frequency can be converted into a finite set of parameters that describe the curve. In some embodiments, this curve is fit to match a set of elements (resistors, capacitors etc.). Another type of fitting that can be done is that this curve is not matched to any physical elements, instead the polynomial coefficients that describe the curve are extracted. The benefit of doing this is that a curve can be described that has a lot of data points defined as a finite set of parameters. Assume that a fit has been made for the data. The next step is to see how the fitted data changes over time as the cell colony changes characteristics. Software implemented by the reader or external control and processing system is configured to "label" how a change in the fitted parameters corresponds to information that the researchers are looking for. Keep in mind that the parameters can change because the size of the cell colony has changed, or because the nature of the cell colony has changed due to some chemical or biological process. The benefit of having an optical system is that the change in size of the cell colony can be determined through optical means. This then allows for normalizing the impedance measurements for a fixed cell colony size so that it can be determined if the nature of the cell colony has changed. In some cases, the translation of data into insights is performed using predefined algorithms. In other cases, the approach is to use machine learning techniques to do this translation.

The above paragraphs have described how various parameters such as temperature, pH, and other chemical properties can be measured by measuring the change in color of various sensor dots. In addition to measuring temperature, chemical, and impedance parameters, it is intended to measure other physical characteristics of the cells, such as their shape, size, movement, and any new physical features they grow. In some embodiments, the imaging unit is further relied on to measure such physical characteristics. In some embodiments, the imaging unit includes image sensors having three optical filters, a red filter, a green filter, and a blue filter (RGB). These optical filters can be printed above a sensing pixel. The sensing pixel produces electrical current when photons hit its surface. In other embodiments, an image sensor is used without such optical filters. Instead, the image sensor is positioned under an optically transparent film whose characteristics are that it is transparent in the majority of its area, but has narrow band optical filters placed in an array on one corner or side of this optically transparent film. The rationale is that a series of narrow band optical filters can be positioned whose passband is well defined. The array of these optical filters can be spatially distributed on the optically transparent film in a sequential manner. The region between each optical filter can be blacked out to avoid optical cross-talk. In some embodiments, the imaging unit is movable with respect to the well and can therefore also interrogate the sensor dots by this arrangement. This is a means of creating a spectrometer that leverages the fact that the optical image sensor is movable with respect to the well. Enabling relative movement of the image sensor overcomes the tradeoff between covering a wide field of view and having very high spatial resolution.

Figure 13:
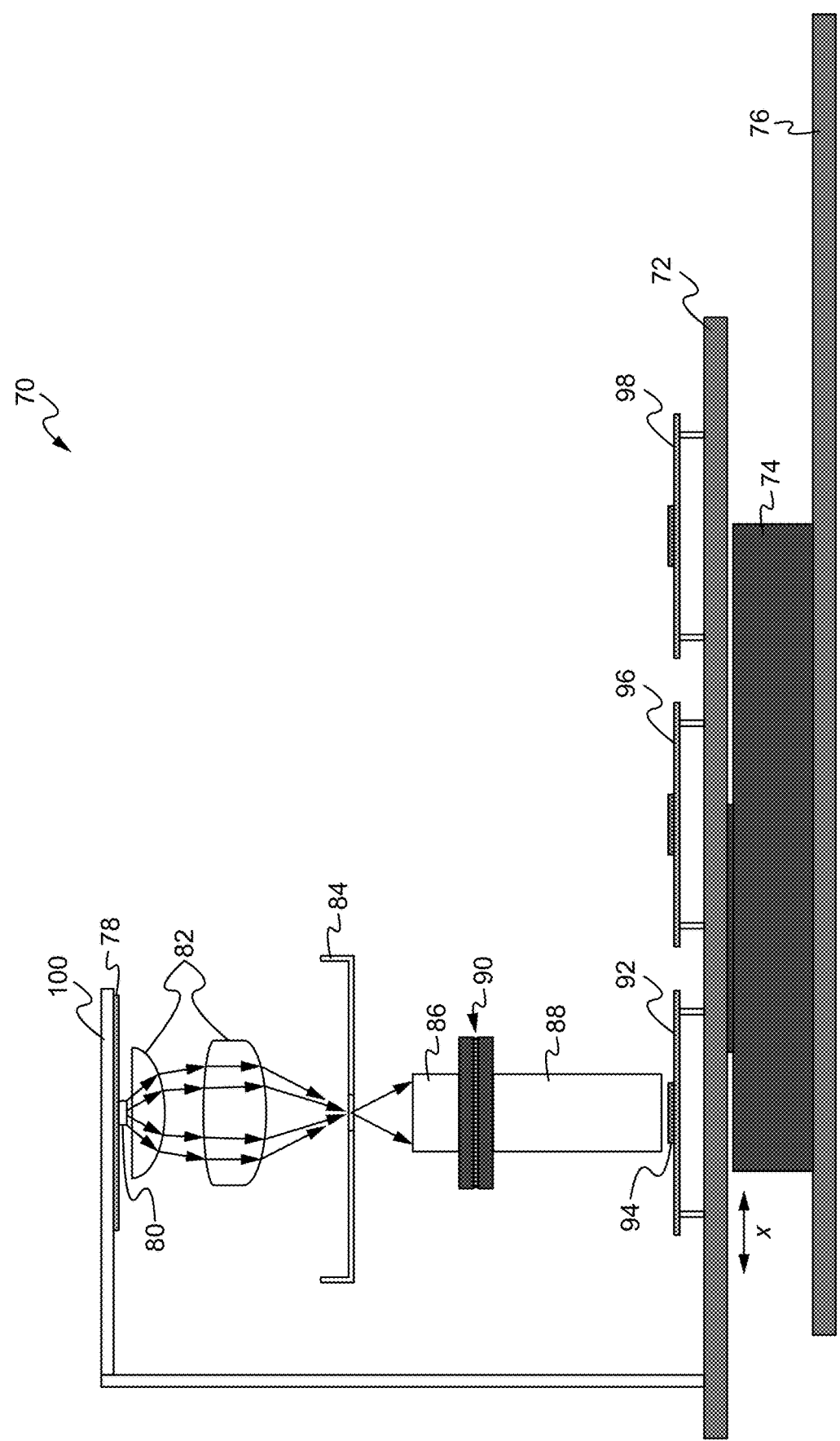
FIG. 13 illustrates a conceptual diagram of an optical system according to some embodiments.

In the exemplary embodiment described above, the imaging unit includes the filter 28, the optical lens 30, and the camera 32, as shown in FIG. 4. In general, the imaging unit includes light sources, optical components, light sensors, and electronic circuitry used to generate and direct light into the well, and to receive and image resulting light, reflected and/or transmitted. An optical system includes the imaging unit, electronic circuitry used to process image signals resulting from the sensed received light, mounting and movement mechanisms, and electronic circuitry used to control the imaging unit and the mounting and movement mechanisms. FIG. 13 illustrates a conceptual diagram of an optical system according to some embodiments. A base plate 76 forms a mounting foundation for the optical system 70. An X-Y actuator stack 74 is mounted to the base plate 76. The X-Y actuator stack includes a X-direction actuator and a Y-direction actuator capable of moving a mounting plane 72 incrementally, and independently, in the X and Y directions. A sensor board 92 and a mounting arm 100 are mounted to the mounting plate 72. A well tray 84 is configured to hold one or more slides 12 (FIG. 1). Clamps, or other securing mechanisms, can be used to secure the slides to the well. The well tray 84 is mounted to be fixed in position relative to the base plate 76. In some embodiments, the well tray 84 is mounted to the base plate 76. A light source is coupled to the mounting arm 100. In some embodiments, the light source is an LED board 78 with one or more LEDs 80. Illumination optics 82 are optically aligned with the light source, in this case the LED 80. The illumination optics 82 are mounted to be fixed in position relative to the light source. In some embodiments, the illumination optics 82 are mounted to the mounting arm 100. In other embodiments, the illumination optics 82 are mounted to the mounting plate 72. The illumination optics 82 are configured to selectively direct light from the light source to the slides 12 held in the well tray 84. Receiving optics are optically aligned with the illumination optics 82 to receive light having passed through the slides 12 in the well tray 84. In some embodiments, the receiving optics include an objective 86 and a tube lens 88. It is understood that other optical components can be used to receive light having passed through the slides 12 and to direct the received light to an image sensor 94 on a sensor board 92. The receiving optics are mounted to be fixed in X-Y position relative to the light source. In some embodiments, the receiving optics are mounted to the mounting arm 100. In other embodiments, the receiving optics are mounted to the mounting plate 72. The sensor board 92 including the image sensor 94, the LED board 78 including the LED 80, the illumination optics 82, the mounting plate 72, and the mounting arm 100 are all fixed in position relative to each other such that incremental movement of the mounting plate 72 by the X-Y actuator stack 74 results in corresponding movement of the LED 80, illumination optics 82, receiving optics, and the image sensor 94. The receiving optics, such as the objective 86 and the tube lens 88, are fixed in X and Y directions relative to sensor board 92, the LED board 78, the illumination optics 82, the mounting plate 72, and the mounting arm 100. The mounting plate 72 moves relative to the base plate 76 and the well tray 84. Movement of the light source, illumination optics 82, receiving optics, and the image sensor 94 relative to the slides 12 within the well tray 84 enables image capture translation in the X-Y plane such that the entire well can be imaged at a designed feature resolution. In some embodiments, a single captured image covers an entire area (X-Y plane) of the well being imaged. In other embodiments, the area of a single captured image is less than an area of the well. In this case, multiple offset captured images can be taken within a set X-Y plane of the well, and the multiple captured images are "stitched" together to form a single image representative of the entire area of the well.

A Z-direction actuator 90 is coupled to the receiving optics. The Z-direction actuator 90 enables movement in the Z-direction of one or more optical components of the receiving optics, such as the objective 86, so as to change a focal length between the image sensor 94 and a Z position within a well of the slide 12. Changing the focal point in this manner enables Z-direction scanning through the gel at a designed plane resolution.

Figure 14:
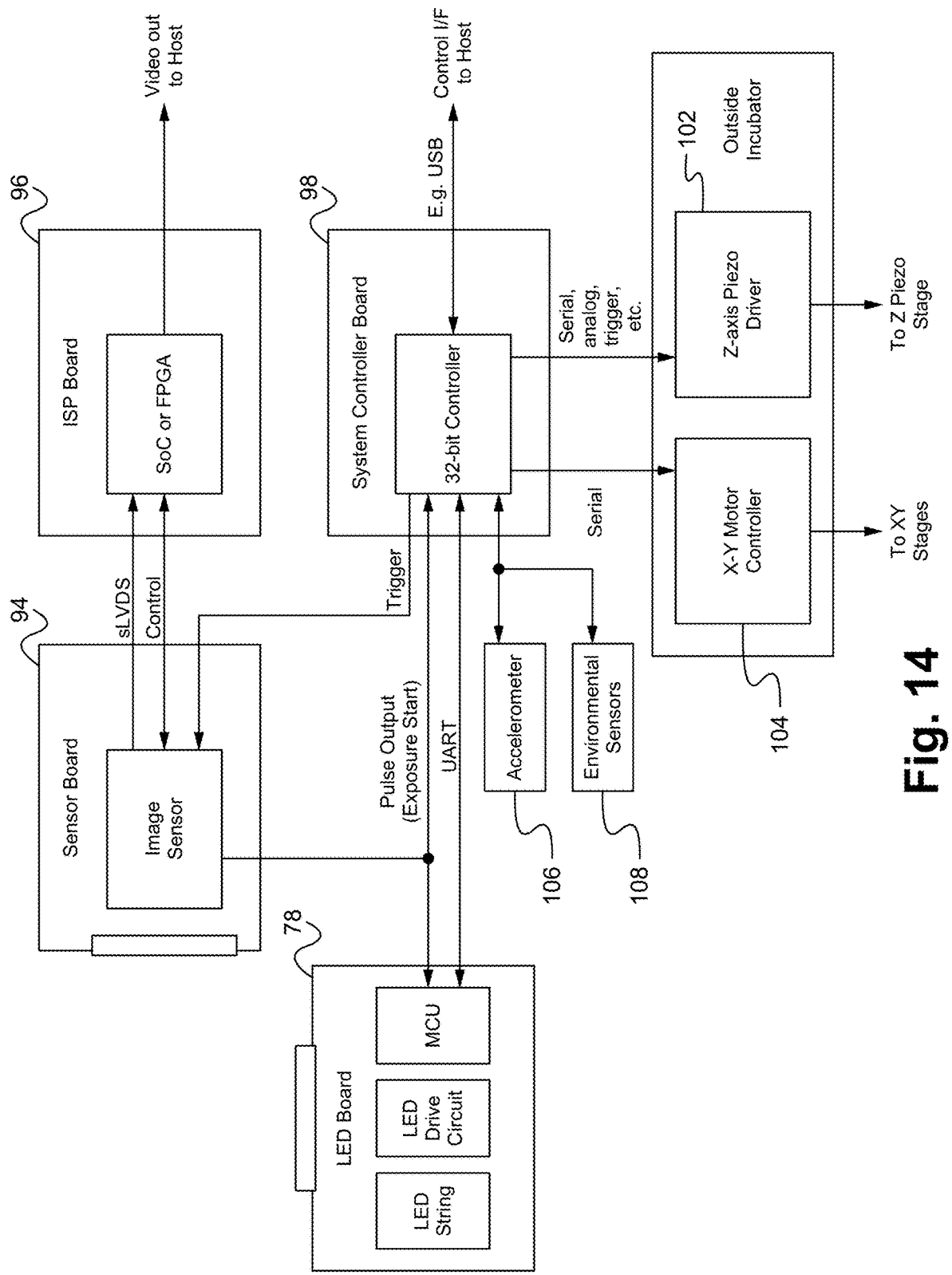
FIG. 14 illustrates a schematic block diagram of the electronic circuitry included within the optical system according to some embodiments.

The optical system 70 also includes additional electronic circuitry, such as an ISP (Image Signal Processor) board 96, and a system control board 98, which are electrically connected to the sensor board 92 (see FIG. 14). In the exemplary configuration shown in FIG. 13, the ISP board 96 and the system control board 98 are mounted to the mounting plate 72. In other embodiments, the ISP board 96 and the system control board 98 are not mounted to the mounting plate, but instead are alternatively housed and mounted within the non-disposable electronics 24 (FIG. 4) while also being electrically connected to the sensor board 92.

FIG. 14 illustrates a schematic block diagram of the electronic circuitry included within the optical system according to some embodiments. The electronic circuitry includes the LED board 74, the sensor board 94, the ISP board 96, and the system control board 98. The LED board includes one or more LEDs, LED driver circuitry, and a controller circuit, such as a microcontroller unit (MCU). The sensor board 94 includes the image sensor 94. The ISP board 96 includes an image signal processor, such as a SoC (system on a chip) or a FPGA (filed-programmable gate array). The system control board 98 includes a system controller, such as a microprocessor, MCU, or other control circuitry. The electronic circuitry also includes an X-Y motor controller 100 and a Z-axis driver circuit 102. The X-Y motor controller 100 is configured to generate and send control signals to the X-Y actuator stack 74 (FIG. 13). The Z-axis driver circuit 102 is configured to generate and send control signals to the Z-direction actuator 90 (FIG. 13). The electronic circuitry can also include an accelerometer 104 and one or more environmental sensors 106. The accelerometer 104 can be used to measure vibration of the optical system 70, or in general can be used to measure vibration of the biosensing-imaging system 10. Vibration measurements can be used to mitigate the effects of relative motion between the slides and the imaging unit, as described in greater detail below. The environmental sensors 106 can be used to measure environmental conditions within the incubator, such as temperature and humidity levels.

In the exemplary configuration shown in FIG. 14, the sensing, processing, and controlling circuitry are each independent circuit boards electrically interconnected to each other. It is understood that such a configuration is exemplary and that individual components of each board can be configured as discrete components, or combined in alternative configurations than as an LED board, a sensor board, a image signal processing board, and a system control board. It is also understood, that one or more of the circuit boards can be integrated as a single circuit board.

The image sensor detects light resulting from illumination by the light source. In some embodiments, the light source is a white light source. The spectral content of this white light source also needs to be measured. The combination of the narrow-band optical filters and the mechanical movement of the optical image sensors relative to the sensor dots enables measurement of the spectral content of the light. There is always a physical gap between the sensor dots. When the narrow band optical filter is physically positioned under a sensor dot, a specific response is measured that corresponds to the narrow band color component of the sensor dot. When the narrow band filter is physically positioned under the gap between sensor dots, then a different response is measured, which is the narrow band spectral content of the incident light. Given an ability to measure the content of the light source and the content of the light through the sensor dot, this enables a much more accurate measurement of the optical properties of the sensor dot. This compensates for non-uniformity in the spectral content of the light source. This is a beneficial calibration step to calibrate for the spectral content of the light source. This methodology is especially pertinent when the light source is positioned to shine through the sensing dots, which corresponds to a transmission mode. There is some form of color compensation that each RGB image sensor needs. It is assumed that this color compensation is already taken care of when the image sensor is manufactured, and that each image sensor has a calibration table that quantifies and standardizes its output to match a reference.

There are particular challenges with imaging cells within the well. The cells are 3D objects of different sizes that are suspended in a semi rigid structure, such as the gel. The X,Y,Z coordinates for these objects is random, for example there is variability across multiple samples. There also may be more than one object in the field of view. These objects are to be imaged and at least the following parameters are to be derived: 1) The size of the object; 2) The location of each object; and 3) This information needs to be recorded as a function of time. In some embodiments, the time resolution with which this recording is done is as fast as 1 time per second. The time duration for the recording can be up to 8 days. The data can be stored locally or remotely, such as on the cloud or an external hard drive. The imaging unit includes a lens system that can be moved vertically to allow the optical system to focus at different depths of the well. The optical elements for the image sensor enables changing the depth of focus in the Z-dimension. The images captured by the imaging unit are to be processed to see the edges of the objects. Image processing software is employed that provided the appropriate contrast for the edges of the object relative to its surrounding medium. As the focal depth is changed, this image processing software defines different edges for these 3D objects, which can be used to construct a size and shape estimate for these objects. A sequential map of different regions that are in focus for a given focal depth can be constructed. This enables a contour of the bottom of the cell colony, the side that is visible to the camera, to be reconstructed. The top of the cell colony can not be imaged with the camera that is positioned below the well. However, image analysis software can be used to identify the outer edges of the cell colony. The area of this outer boundary is a proxy for the size of the cell colony. This provides a mathematically-driven focal point identification from bottom to top of the cell colony. In some embodiments, a series of images is taken at different focal lengths which provides information to estimate the cross-section of the objects as a function of z. The depth of focus is in a range from about 0.5 mm to 2.5 mm, has a resolution of about 1 um, and the accuracy of reconstruction is about 50 nm to 1000 um. In some embodiments, a calibration sample is used that has objects placed in specific locations with specific sizes that can be used for the purpose of calibrating the overall system. In some embodiments, the image data obtained using the focal depth methodology and the image data obtained using the side-wall illumination methodology previously described can supplement each other to obtain more comprehensive image data.

The imaging unit can also be adapted to measure a fluorescence of the biological sample in the X-Y dimension. Changing the focal depth can also provide a signal that provides information in the Z-dimension. The use of a laser system coupled with molecules that fluoresce when excited by the laser enables generation of a spatial map of the fluorescence in the X-Y-Z dimensions as well.

The system has the ability to take multiple snapshots in time and store this data for future analysis. Image sensors have a certain number of pixels, pixel dimensions, and other characteristics. An objective is to have high resolution images of a large area, for example an area that is 2-3 cm on a side. In some embodiments, the feature sizes to be imaged are on the order of 100 nm to 1000 um. In order to cover an optical window with a large area while also being able to resolve small features, a mechanical system is used that can move the imaging unit with respect to the wells over a large distance and with fine resolution. The coupling of this mechanical system with the imaging unit enables a large number of high resolution pictures to be taken and stitched together in software. The stitching process can be simplified using calibration marks on the slide, which enables the stitching to be done by aligning the calibration marks from different images. An alternate technique is to use the optical calibration marks on the slide to servo mechanical actuators, and therefore the image sensor, to a known position. Movement of the imaging unit causes detrimental vibration in the system, and as such a settling time is to be implemented between movement of the imaging unit and taking an image. Furthermore, this mechanical implementation enables an increase in the resolution of the optical image sensor. For example, a pixel is 1 um on a side. If the imaging unit is moved in 100 nm increments in the X-Y dimension, close to 100 separate images can be captured. This additional information can be used to obtain finer effective spatial resolution in the optical imaging unit. There are physical limits to the resolution that the optics can provide. These physical limits are dictated by the wavelength of the light that is being used.

In an exemplary application, the imaging unit is configured to capture along in the Z-direction 200 X-Y planes, 5 um apart in the Z-direction, down to 1 um resolution at 8 bits per pixel. Each X-Y plane is a cross-section area spanning the entirety of the well. This would result in 520 GB of raw data being stored in memory, either in the non-disposable electronics 24 or the external control and processing system 8. This corresponds to the data acquisition phase of the survey scan. The end product of the survey is to generate a series of 100 RGB images, each 2000×2000 pixels in size representing the location and density of cells to identify suitable ROIs (region of interest) to detail scan. Each X-Y plane is a compilation of separately imaged sub-planes, each sub-plane image having a smaller cross-sectional area than the X-Y plane. To accomplish this, the system reads in complete planes (of 312 sub-plane images, each 4112×2176 pixels in size) into memory (requiring 2.6 GB of working memory). Each sub-plane image may need to be pre-processed to adjust for light level and image distortion due to the optics. This results in corrected rectilinear sub-plane images in memory. At this point, the sub-plane images are registered against each other by locating fiducials or common reference features (if available) in the image overlap region around each sub-plane image. The model assumes sub-plane images overlap by 50 μm to enable this registration. Once corrected and registered, the 312 tiled sub-plane images comprising the X-Y plane are stitched together to form a single 20 k×20 k pixel image. This resulting image can be scaled down to its final size of 2 k×2 k pixel (consuming only 12 MB of memory). At this point the 2.6 GB of working memory for the plane can be reused for processing subsequent planes. The above process is completed for each of the 200 X-Y planes, after which 200 2 k×2 k images are in working memory (consuming 2.4 GB of storage). An additional step can be performed to reduce these 200 images down to 100 images by interpolating along the Z-axis for each pixel across adjacent X-Y planes. The end result is 100 2 k×2 k images in memory (requiring 1.2 GB of storage) which can be compressed (with an average compression ratio of 25%) to 286 MB and written to memory as the final product of the survey scan. Metadata is included in the resulting scan image.

The image sensor and focusing optics are moved using fine and coarse mechanical movement in order to achieve both the range and the resolution. This dual mechanical tuning of the fine and coarse movement can create vibration. The optics in the imaging unit are anchored to the mechanical section that is closest to the slide so as to minimize vibration related artifacts. Cameras with very fast aperture times, or image acquisition times, further reduce vibration related artifacts because the optical calibration marks can be used to superimpose consecutive images on top of one another, thereby nulling out some of the vibration effects. External disturbances are things that are largely beyond system control, such as sudden movements in the lab area that couple to the incubator and optical system. Such external disturbances can be mitigated by using isolation mounts, or shock absorbers, between the biosensing-imaging system and the incubator base or shelf. Another techniques it to connect the imaging unit to the body of the incubator to create similar type of vibration between the incubator and the imaging unit. Yet another technique is to use magnets to connect to the imaging unit to the rack in the incubator.

The fine resolution requirements of the optical system, together with the translating behavior of the mechanical assembly, create a situation in which movements or vibrations due to mechanical resonance can cause pixel blurring and loss of resolution. In some embodiments, a strobed illumination scheme, similar to high-speed flash photography, is implemented to minimize, if not avoid, blurring of a captured image. By knowing the maximum expected translation velocities and resulting resonance frequencies, the illumination strobe period of the light source can be adjusted such that it is short enough to capture the image without blurring the result. To avoid blurring of the captured image, the period of the vibration must be much longer than the strobe period of the light source. To determine an approximate maximum strobe period that can be used before the resolution begins to degrade, the maximum velocity expected during a Z-axis depth scan is determined. Normally, the Z-axis scan rate is limited by the image sensor frame rate, but if the system is configured for a low number of plane sections, then at some point the Z-axis translation velocity becomes the bottleneck in the system timing. Maximum travel velocity data can be approximated at 3 mm/sec, and the resonance of the optical assembly can be approximated to be <300 Hz (2nd harmonic). Therefore, for a maximum specimen feature distortion of 0.5 um, the flash strobe is to be 166 us or less to limit the distortion below 0.5 um. The actual impact on resolution also depends on the amplitude of the vibrations. It is understood that these figures may vary based on equipment used and resolutions to be attained. In general, the strobe period, or pulses of light, are synchronized with the acquisition signal for the imaging unit. The acquisition signal is a control signal that tells the image sensor when to acquire the image. It is equivalent to opening a gate that allows the photo-induced electrons to gather in a capacitive reservoir. The acquisition signal signals the image sensor when to open the gate to allow the electrons to flow and when to stop accumulating the electrons. The time duration for integration determines the magnitude of the signal. Controlling when the acquisition signal is sent enables synchronization of when the image sensor captures an image with when the light strobe is being turned on. Controlled timing of the acquisition signal can also be used to synchronize to vibration effects. The shorter in duration these light pulses are, the less the effects of vibrations on the quality of the acquired image. The blurring of the image is inversely related to the duration of the light pulse. A further objective of the light source is to provide enough illumination to be able to drive the image sensor to saturation within the pulse time. This enables maximum dynamic range of the image sensor to be utilized.

An alternative, or complimentary, method for dealing with problematic vibrations calls for an accelerometer to be placed on the mechanical assembly so that the movement of the system can be monitored. If large unexpected external disturbances occur that could distort the captured image, the system controller is able to capture this state and re-image the region of interest. The accelerometers can be implemented in any of a variety of manners. The following scenarios are presented as examples. In scenario one, an accelerometer is placed on the wells that contain the cells. This accelerometer is referred to as A1. The output of accelerometer A1 is fed to the microprocessor on the system control board 98 for further analysis. If the output of A1 is higher than a certain threshold, then the process of imaging is halted. When the output of A1 subsequently crosses zero, this indicates that there is no acceleration. This crossing triggers the light pulse and operation of the imaging unit. In scenario two, an accelerometer is placed on the imaging unit, such as on the mounting plate 72. This accelerometer is referred to as A2. The output of accelerometer A2 is fed to the microprocessor on the system control board 98 for further analysis. If the output of A2 is higher than a certain threshold, then the process of imaging is halted. When the output of A2 subsequently crosses zero, this indicates that there is no acceleration. This crossing triggers the light pulse and operation of the imaging unit. In scenario 3, one accelerometer is placed on the wells that contain the cells and another accelerometer is place on the imaging unit. These two accelerometers are referred to as A1 and A2, respectively. The outputs of the two accelerometers A1, A2 are fed to the microprocessor on the system control board 98 for further analysis. If the output of A1 and A2 are higher than a certain threshold, then the process of imaging is halted. When the output of A1 and A2 subsequently cross zero at approximately the same time, then the light pulse and imaging unit are triggered. Alternatively, the difference between A1 and A2 is integrated over time. If the outputs of A1 and A2 are well calibrated with respect to one another, then the integral of A1−A2 corresponds to the relative velocity of the well and the imaging unit. When this integral cross zero, the light pulse and the imaging unit are triggered. As another alternative, the output of A1, A2, A1−A2 (the difference between A1 and A2), and the integral of A1−A2 are analyzed by a machine learning algorithm which learns the types and modes of vibration. The machine learning algorithm is taught the best times to trigger the light pulse and the image capture.

As previously described, the growth of cells is facilitated by culturing the cells in some form of suspension media, such as a 3D lamina gel. Although reference herein is directed to a gel, it is understood that any such reference is applicable to other appropriate suspension media. Such gel is formed in a bottom portion of the well, resting on the well bottom surface and having a thickness, typically about 1 mm in height. Each well can also contain a culture media, or simply media, applied over the gel, the media is specific for each biological sample to be analyzed and provides, for example, nutrient materials, serum, and/or antibiotic for culturing each sample type. The media is a liquid that is slowly absorbed into the gel over time. This is one example for 2D or 3D culture. Other method for making 3D structure can include the use of a hanging drop.

The media is to be periodically replaced or replenished by extracting the old culture media and delivering new culture media into the well. Although tubes can be extended into the well from the open top side for delivery and extraction of media into and out of the well, such tubes can block access to certain portions of the well, and in particular can occlude portions of the well from optical interrogation. To overcome such deficiencies, one or more well side walls of each well can be configured with fluid channels that provide access into and out of the well. Such fluid channels can be used to deliver and extract media. The entry and exit points of the fluid channels into and out of the well can also be coated with material that discourages cells from growing near them. This then prevents these holes from being plugged up by growing cells.

Figure 15:
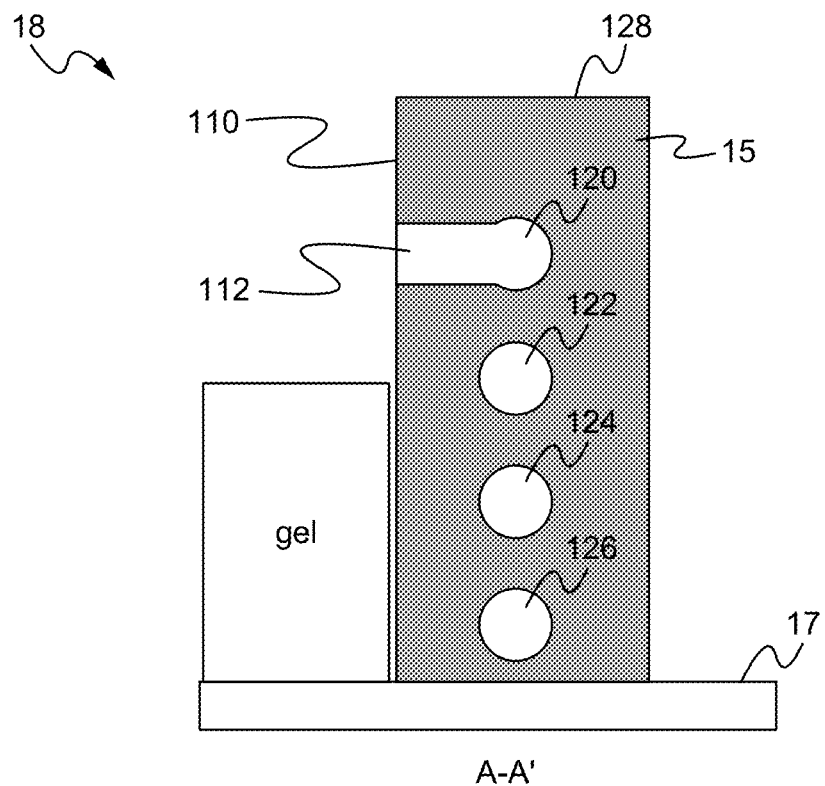
FIG. 15 illustrates a cut out side view of a well side wall have fluid channels according to some embodiments.
Figure 16:
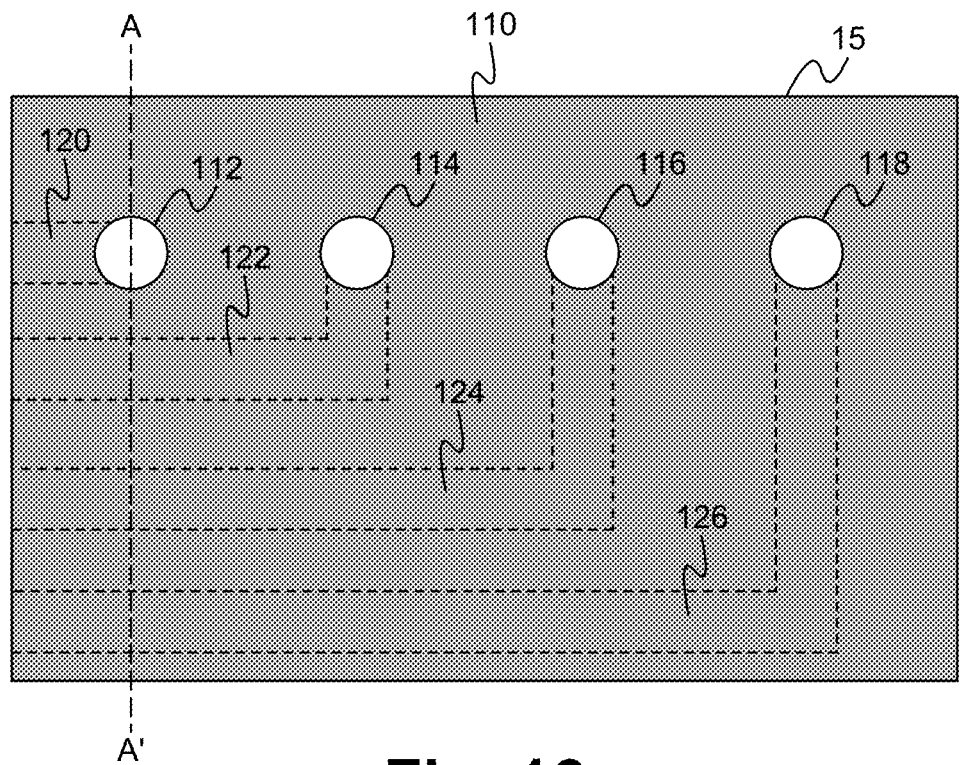
FIG. 16 illustrates a front view of the well side wall of FIG. 15, where the front view is from the perspective of the interior of the well.
Figure 17:
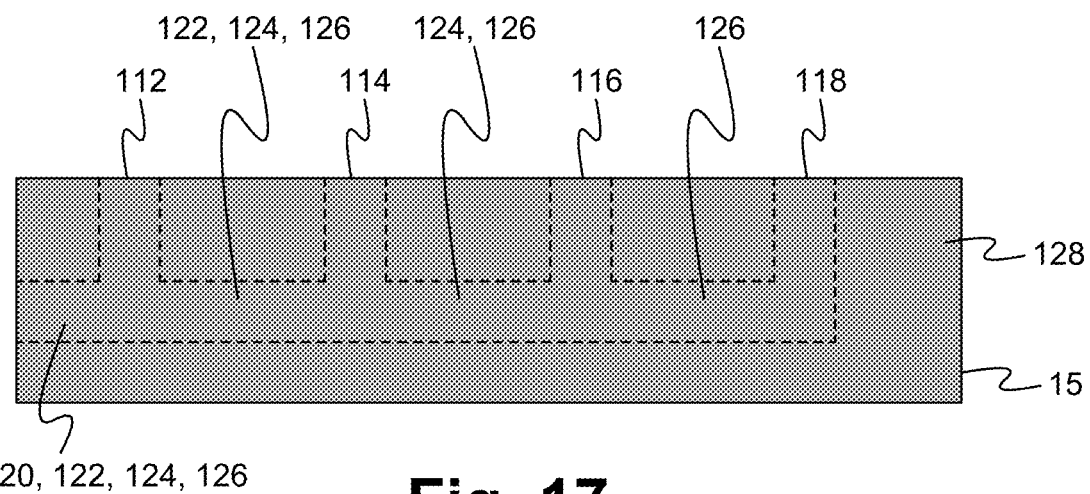
FIG. 17 illustrates a top down view of the well side wall of FIG. 15.
Figure 18:
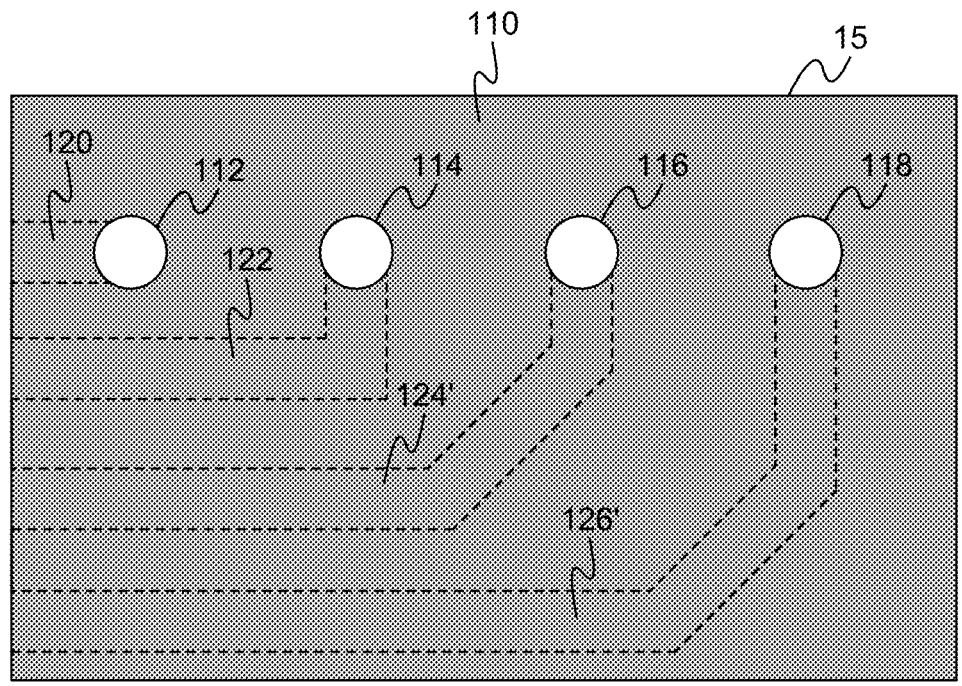
FIG. 18 illustrates a front view of a well side wall of FIG. 15 having alternatively shaped fluid channel pathways.

FIG. 15 illustrates a cut out side view of a well side wall have fluid channels according to some embodiments. FIG. 16 illustrates a front view of the well side wall of FIG. 15, where the front view is from the perspective of the interior of the well. FIG. 17 illustrates a top down view of the well side wall of FIG. 15. Each well side wall 15 has a top surface 128 and an interior surface 110. The interior surface 110 faces into the well 18. Each well side wall 15 includes one or more fluid channels. In some embodiments, a given fluid channel can be used for both media delivery into the well 18 and media extraction from the well 18. In this case, a minimum of one fluid channel is required. In other embodiments, it is desired to have delivery and extraction fluid channels isolated from each other. In this case, a minimum of two fluid channels is required, one fluid channel for media delivery, one fluid channel for fluid extraction. In the exemplary configuration shown in FIG. 15, there are four fluid channels 120, 122, 124, and 126 within the side wall 15. Each of the fluid channels 120, 122, 124, 126 is shown in transparency to indicate the position of the fluid channels within the interior of the side wall 15. It is understood that the side wall 15 can be configured with more, or less, than four fluid charnels. Each fluid channel has a well access port that provides access to the well 18. As applied to FIG. 15, the fluid channel 120 includes well access port 112, the fluid channel 122 includes well access port 114, the fluid channel 124 includes well access port 116, and the fluid channel 126 includes the well access port 118. Each of the well access ports is positioned over an anticipated height of the gel. In some embodiments, each well access port is aligned at a same height on the well side wall 15. In other embodiments, the well access ports are not all aligned at a same height. The fluid channels shown in FIG. 16 are configured having a 90-degree bend. It is understood that the pathway of each fluid channel can be alternatively shaped. FIG. 18 illustrates a front view of a well side wall of FIG. 15 having alternatively shaped fluid channel pathways. The exemplary fluid channels 124' and 126' have pathways with 45-degree bends. Quarter circles can alternatively be used instead of straight angles. It is understood that alternatively configured fluid channel pathways are also contemplated.

In an exemplary application, fluid channel 120 is used for media delivery, and fluid channels 122, 124, and 126 are used for fluid extraction. It is understood that the fluid channels can have different use configurations, such as the fluid channels 120, 122, and 124 used for media delivery, and fluid channel 126 used for fluid extraction. In those configurations having multiple fluid channels used for media delivery, different fluid channels can be used for delivery different media. For example, one fluid channel can supply nutrients, and another fluid channel can supply a drug or other media of interest. In some embodiments, each fluid channel is configured as an independent channel, with no cross-talk between fluid channels, as shown in FIGS. 15-18. Although FIG. 17 may appear to show merging of the fluid channels, this is merely an artifact of the transparent nature of the side wall 15 and the stacked arrangement of the individual fluid channels. In other embodiments, one or more of the fluid channels are merged such that at least a portion of the fluid channel pathways of the merged fluid channels are common to each other. Such a configuration may be implemented for combining multiple fluid channels used for media extraction.

Figure 19:
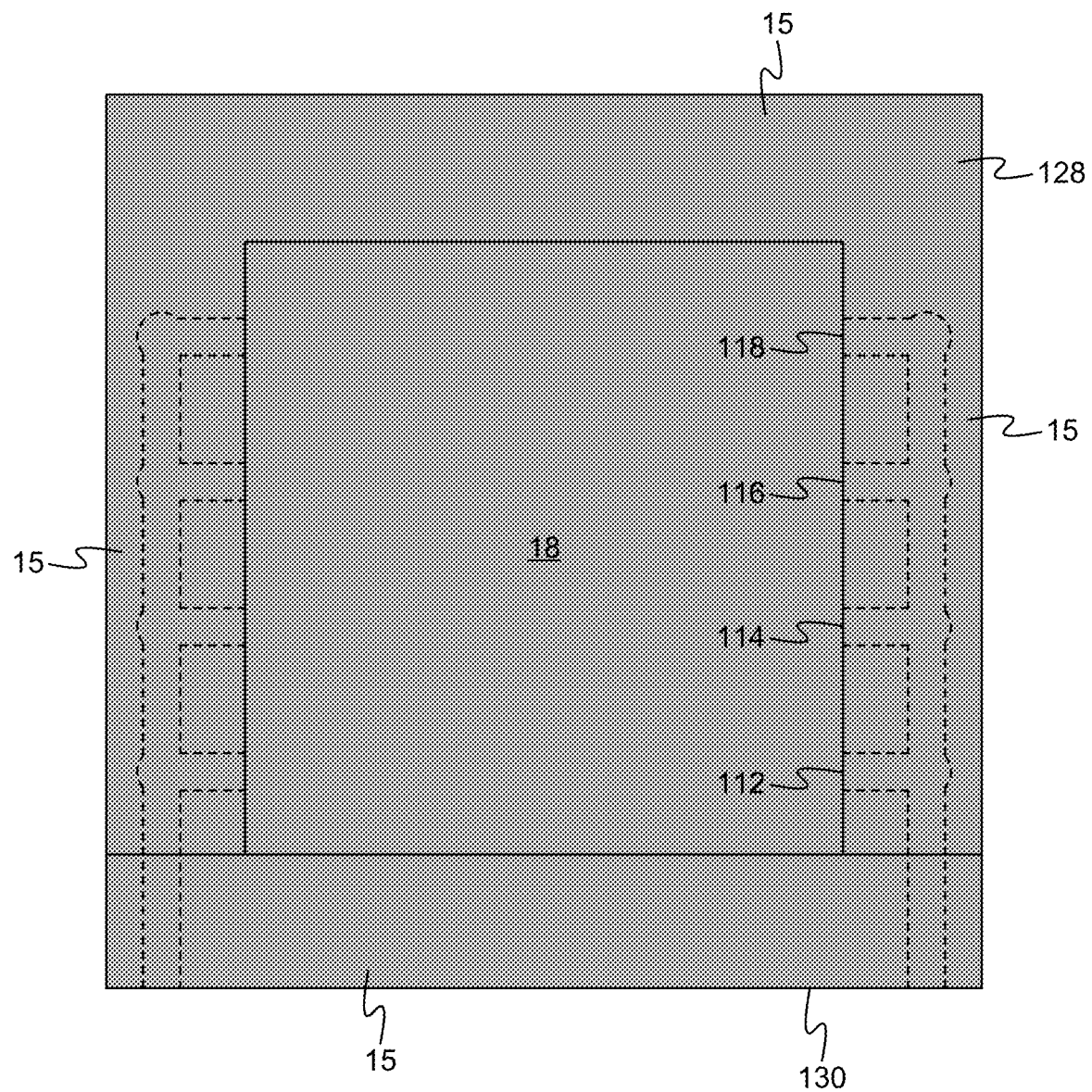
FIG. 19 illustrates a top down view of a well having two of four well side walls configured with fluid channels.
Figure 20:
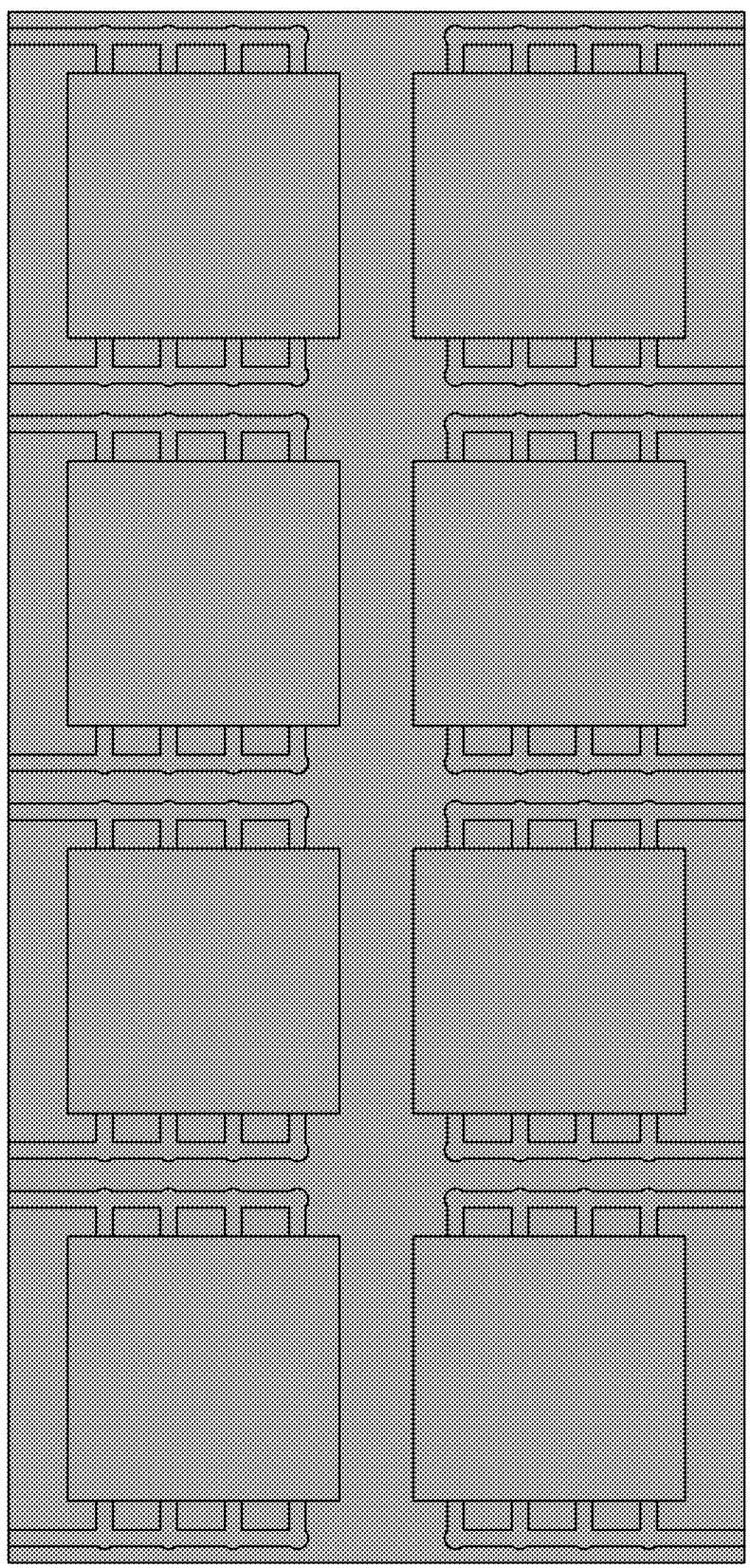
FIG. 20 illustrates a top down view of an exemplary slide having eight wells and fluid channels similar to that of FIG. 19.

One or more of the well side walls can be configured with fluid channels. FIG. 19 illustrates a top down view of a well having two of four well side walls configured with fluid channels. The right hand and left hand side walls 15 of well 18 are each configured with fluid channels similar to those shown in FIGS. 15-17. It is understood that one well side wall can have differently configured fluid channels than that of another well side wall. FIG. 20 illustrates a top down view of an exemplary slide having eight wells and fluid channels similar to that of FIG. 19. The fluid channels of each side wall 15 are directed to an outer edge 130 of the side wall structure where the fluid channels can be connected to external tubes or other microfluidic circuitry, such as valves and pumps, for media delivery and extraction. In this manner, the fluid channels are interconnected to fluid reservoirs that house the various media to be delivered, and fluid reservoirs for storing the extracted media. Media delivery into each well can be performed by pumping the appropriate media through the fluid channels and into the well. Media extraction can be performed by placing some fluid channels at a lower level than others, such as the fluid channel configuration shown in FIGS. 14-16. The lower level fluid channels can be used for media extraction by gravity, capillary action, or pumping. Media extraction can also be performed by tilting the slide using a motorized means. For example, the left hand edge of the slide in FIG. 20 can be rotated upwards relative to the right hand edge of the slide, resulting in pooling of the media along the right hand side of each well. One or more of the fluid channels positioned on the right hand side of each well can then be used to extract the pooled media. Similarly, the bottom (relative to the view shown in FIG. 20), left hand corner of the slide in FIG. 20 can be rotated upwards relative to the top, right hand corner of the slide, resulting in pooling of the media along the top, right hand corner of each well. One or more of the fluid channels positioned most proximate the top, right hand side of each well can then be used to extract the pooled media.

Figure 21:
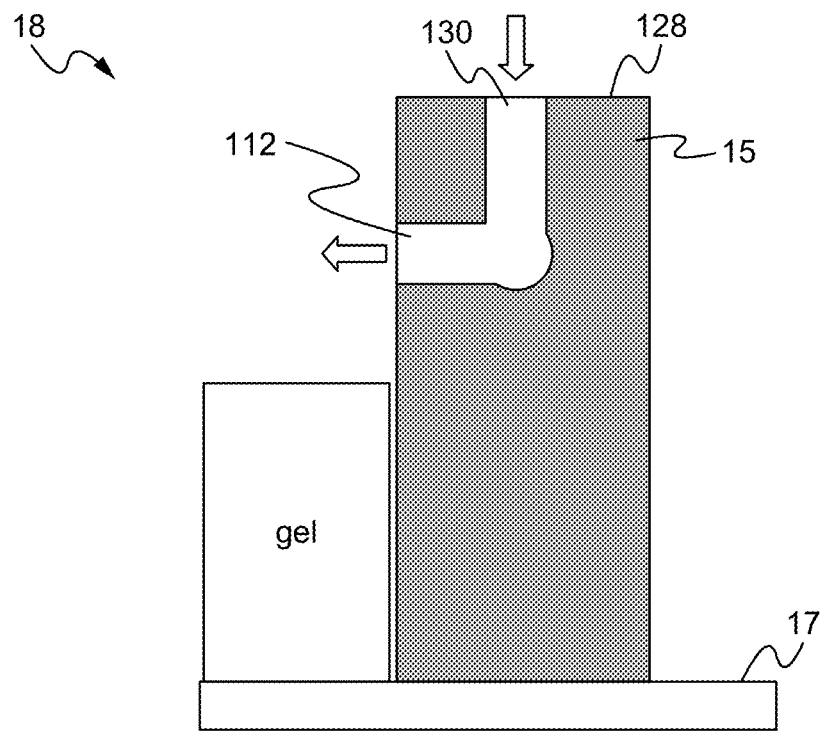
FIG. 21 illustrates a cut out side view of a well side wall have fluid channels routed to the well side wall top surface according to some embodiments.
Figure 22:
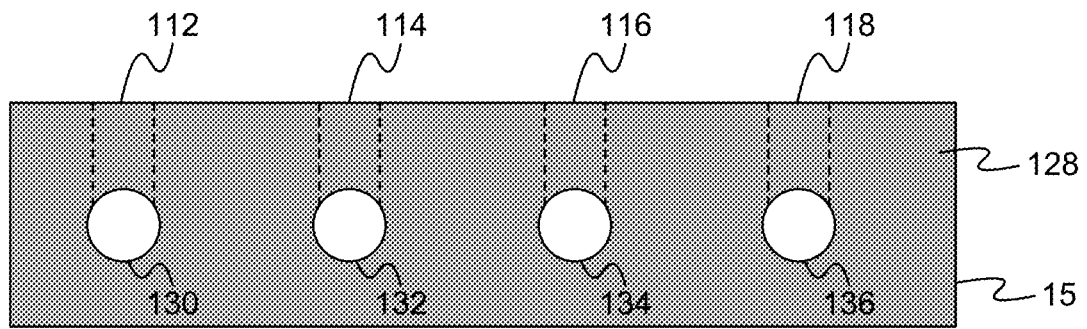
FIG. 22 illustrates a top down view of the well side wall of FIG. 21.

The fluid channels shown in FIGS. 15-20 are directed to the outer edge of the side wall structure. Alternatively, the fluid channels can be directed to the top surface of the side wall structure. FIG. 21 illustrates a cut out side view of a well side wall have fluid channels routed to the well side wall top surface according to some embodiments. FIG. 22 illustrates a top down view of the well side wall of FIG. 21. In contrast to the fluid channel configuration shown in FIGS. 14-19, the fluid channels 130, 132, 134, and 136 are directed to the top surface 128 of the wall side wall 15. The fluid channel configuration of FIGS. 20-21 is similar to that of FIGS. 14-19 in that there are four fluid channels each having an access port, such as access ports 112, 114, 116, and 118, to the well 18. The fluid channels 130, 132, 134, 136 can be connected to external tubes or other microfluidic circuitry, such as valves and pumps, for media delivery and extraction.

Figure 23:
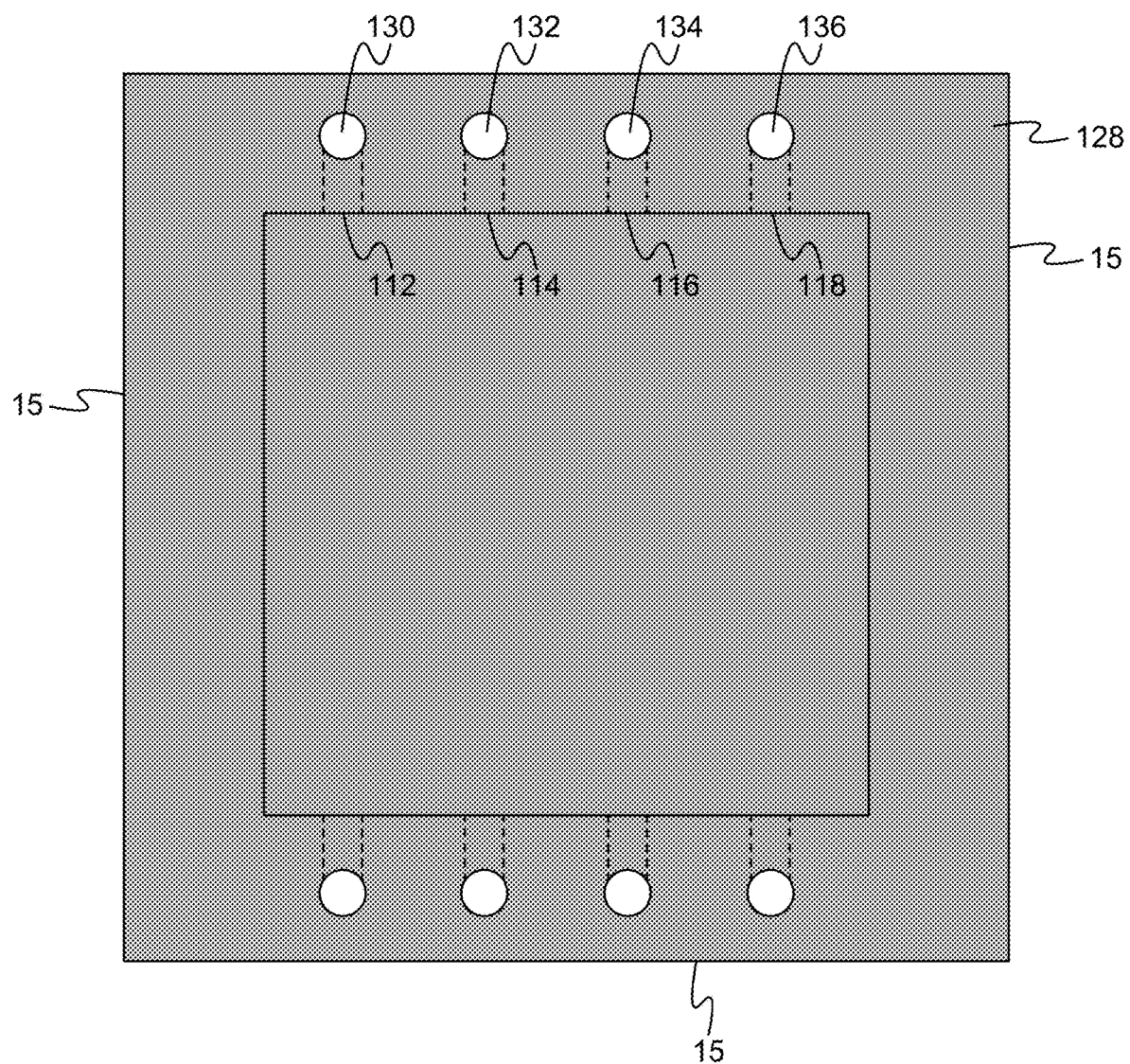
FIG. 23 illustrates a top down view of a well having two of four well side walls configured with top down access fluid channels.
Figure 24:
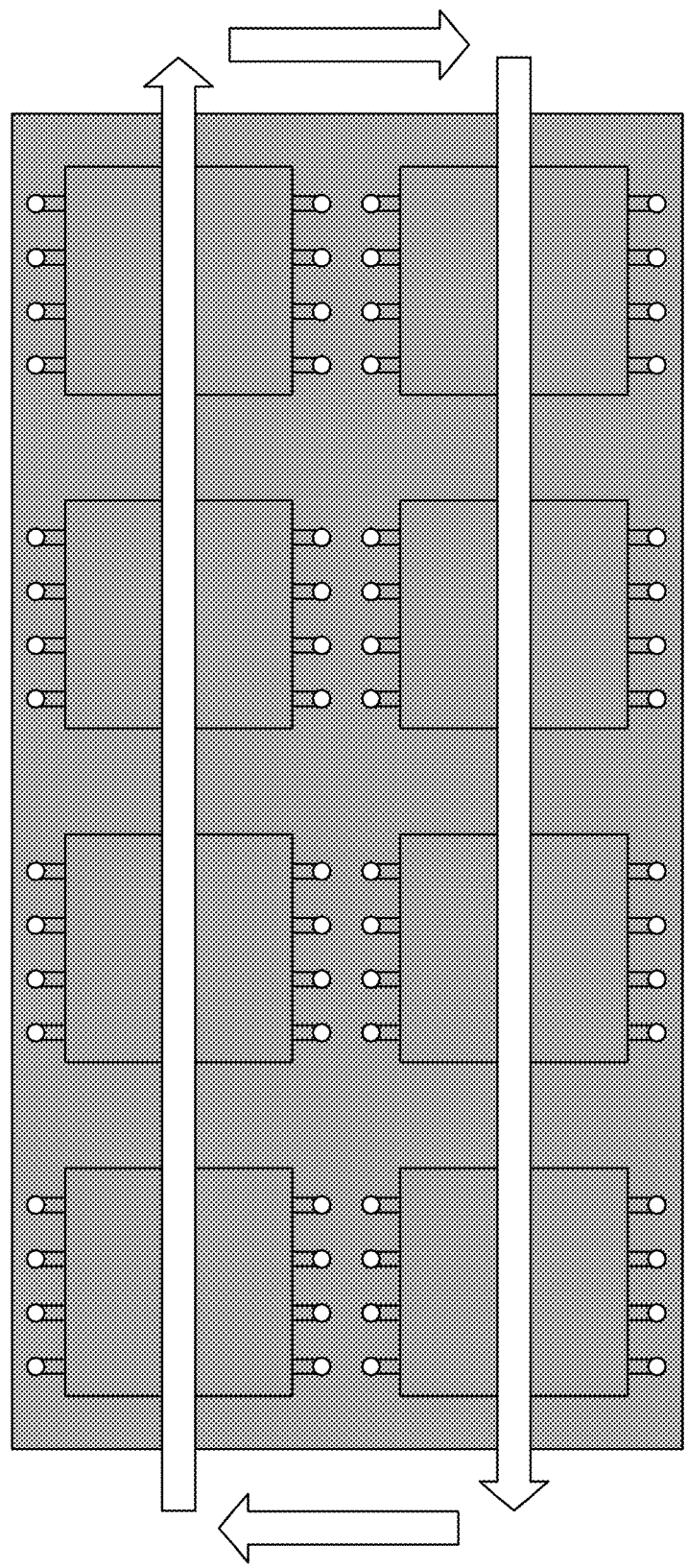
FIG. 24 illustrates a top down view of an exemplary slide having eight wells and fluid channels similar to that of FIG. 23.

One or more of the well side walls can be configured with the top surface accessed fluid channels. FIG. 23 illustrates a top down view of a well having two of four well side walls configured with top down access fluid channels. The top and bottom (relative to the view shown in FIG. 23) side walls 15 of well 18 are each configured with fluid channels similar to those shown in FIGS. 20-21. It is understood that one well side wall can have differently configured fluid channels than that of another well side wall. FIG. 24 illustrates a top down view of an exemplary slide having eight wells and fluid channels similar to that of FIG. 23. Similar techniques for delivery and extracting media from the structure of FIG. 23 can be used as those described above in regard to the structure of FIG. 20.

Figure 25:
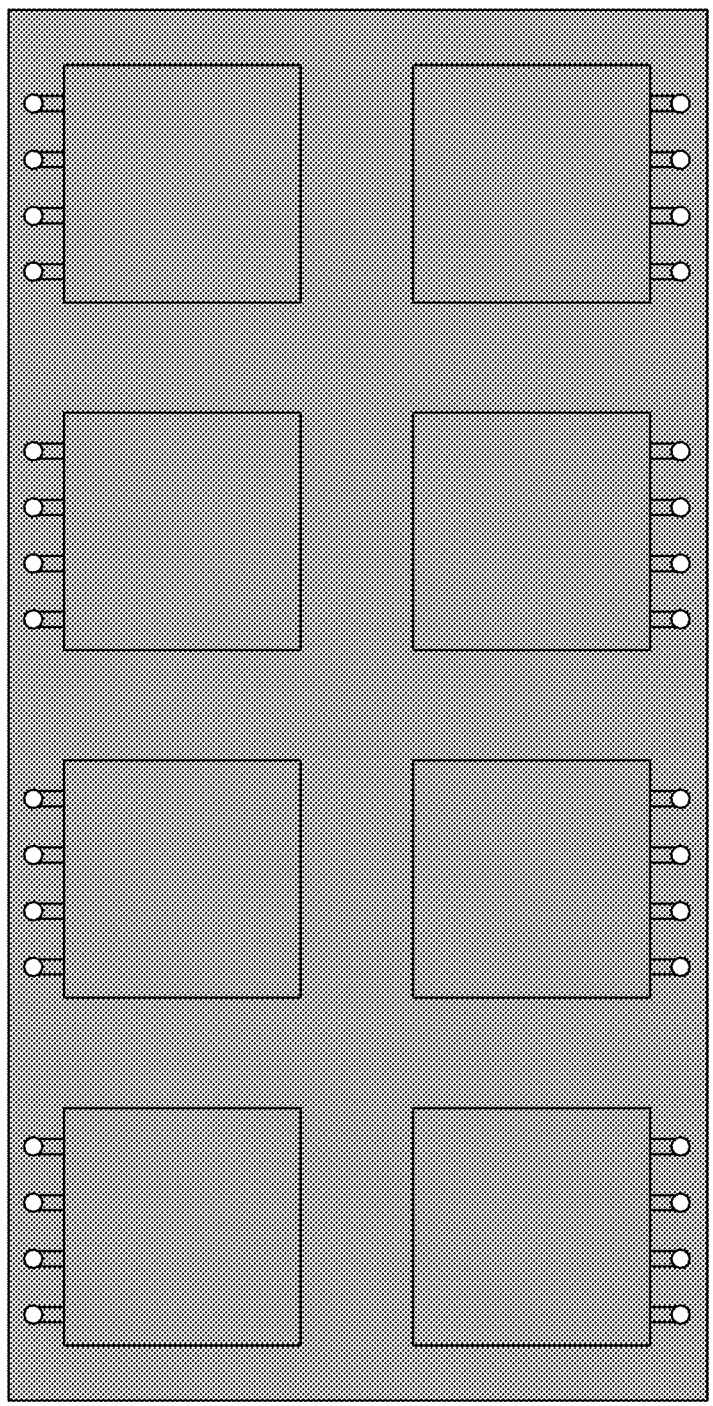
FIG. 25 illustrates a top down view of an exemplary slide similar to that of FIG. 24, but with only one well side wall per well having fluid channels.

Feeding the fluid channels from the top imposes constraints on the motion of a light source if the light source is positioned above the wells. The arrows shown in FIG. 24 include an exemplary direction of motion of the light source and related optics, via X-Y movement mechanisms of the imaging unit previously described, to avoid hitting the feeding tubes connected to the fluid channels. Alternatively, the number well side walls having fluid channels can be reduced to ease mechanical constraints for movement of the light source and related optics, such an alternative configuration is shown in FIG. 25.

In some embodiments, one or more fluid level sensors can be attached to the well side walls, or onto flaps of inserts, which are described below. Different fluid level sensors can be positioned at different heights on the well side wall. In an exemplary configuration, a fluid level sensor can be constructed as a series of parallel metal lines (or pads that are arranged in a vertical direction). Using a multiplexer, two adjacent pads or lines are excited (an AC voltage is imposed between these pads). If the signal coupling is large, then both adjacent pads or lines are covered by fluid. If the signal coupling is weak, then one or both of these pads or lines are in an air medium. By placing these pads or metal lines at small distances relative to one another, a fairly good resolution can be determined for how much fluid exists in the well.

Software and hardware are configured for cell maintenance by enabling automated delivery and extraction of media to and from the wells. Software stored and executed locally within the biosensing-imaging system and/or stored and executed remotely, such as the external control and processing system, can be designed for cell maintenance based on the cell type and based on either sensor inputs from the well or a predetermined schedule. The software can also provide recommendations for cell maintenance that are to be implemented by a lab technician, instead of automatically performed by the system. The biosensing-imaging system is capable of delivering the above mentioned media (nutrient addition, drug, and toxins) and is capable of extracting the necessary volume from the well for changing the media. In a general sense, the well ensemble (well side walls and connected microfluidic circuitry) is equipped with fluid channels for the flow of specific types and amounts of media. In addition, the delivery and extraction of the media can also be based on the inputs/commands of the lab technician. The recommendation and/or delivery and extraction of the media can be algorithmic or based on machine learning. The algorithms can have input parameters such as the values of the sensor elements in the specific well under control (present values as well as historical values), plus the cell type, plus sensed ambient conditions. These algorithms can also have input parameters from other wells that are in the incubator (locally or in some other site). In addition to recommendation and/or delivery and extraction of media, the biosensing-imaging system is under user control to add or subtract sensor modalities. The addition or subtraction of sensor modalities can also be done algorithmically or through machine learning. In general, media delivery can be based on user inputs, based on algorithms, based on a look-up table, based on machine learning, based on measured parameters (present and historical) in the well to which the media is being delivered, and/or based on measured parameters (present and historical) in adjacent wells or wells in the same incubator or wells in other instruments.

Similarly, media extraction can be based on user inputs, based on algorithms, based on a look-up table, based on machine learning, based on measured parameters (present and historical) in the well to which the fluid is being delivered, and/or based on measured parameters (present and historical) in adjacent wells or wells in the same incubator or wells in other instruments. Such automated software and hardware control can also be applied to the sensor modalities enabled (turned on) or disabled (turned off) within each well. Such feeding and sampling system also can be used for real time sensing for sampling from culture media and performing chemical sensing as an alternative to localized sensor dots. In general, the sensor modalities in each well can be turn on or off based on user inputs, turned on or off based on algorithms, turned on or off based on a look-up table, turned on or off based on machine learning, turned on or off based on sensor values in the well under test, and/or turned on or off based on sensor values in adjacent wells or wells in the same incubator, or wells in other instruments.

The biosensing-imaging system can also include a heating system to bring the temperature of the media up to a defined temperature, such as 37-degree C., before delivery to each well. In some embodiments, the media is to be stored at a lower temperature, such as 4-degree C., prior to delivery to the wells. It is therefore necessary to be able to store the added media at the temperature that is optimal for each and to be able to bring up the temperature of the respective media to the defined temperature before being added to the wells. This temperature control can be done through a variety of means that enables the system to select the volume of media to be added to the well, to monitor the temperature of the selected volume, to change the temperature of the selected volume through heaters or TECs (thermoelectric coolers), to stabilize the temperature of the selected volume to the defined temperature, and then to inject the media into the appropriate well. Such temperature control can also be automated by software and hardware control.

The system makes it possible to follow a plurality of biological processes such as cellular progression from normal to aberrant states, course of a drug therapy, differentiation of stem cells, detection of foodborne pathogens or ligands in plants, and multiple phenotypic assays in manual and automated manners. The impedance of the electrolyte environment surrounding the cell clusters (i.e. growth matrix gel and liquid media) is very low compared to the cell clusters. It therefore becomes difficult to steer the electric fields with any kind of directionality to probe impedance from different angles. The system enables orthogonal sensing that provides combinatorial information that would otherwise be missed by single point static measurements or measurements done at different time points or using different equipment.

The system enables various ways to measure electrical properties of biological samples. Selective electrical measurement of cells can be done through placing electrodes in close proximity of biological samples. 3D signal measurement is achieved by directing electrical signals through the cells by adding conductive nanoparticles, nano-rods in close proximity of cells, steering signal through cells by reducing conductivity of media, creating polarity of electrode in the environment in different shape and size. Examples include, but are not limited to, micro/nano-needles on surface of inserts, use of manually connecting electrodes to cell environment, and inserting tunable electrodes in the test wells.

The system also enables various ways to measure acoustic properties of biological samples. Biological samples can be cultured in an adherent and flat monolayer (2D) or cultured in a non-adherent form such as suspension, droplet, or 3D culture in hydrogel. Selective acoustic measurement of cells can be done through placing acoustic transmitters and receivers in close proximity to biological samples. 3D signal measurement is achieved by directing acoustic signals through cells and measuring the received acoustic signal.

The system also enables various ways to measure physicochemical properties of biological samples. Selective signals from chemical analytes are sensed through placing sensors for measuring chemical analyte in close proximity to biological samples.

The following outline various examples of implementing such measurements:

Example 1

Mix nano-rods into the gel, where the nano-rods are directionally conductive and can be oriented under an electric field. The electrical fields can be steered with some type of external control, when the electrolyte conductivity is substantially higher than the conductivity of the nano-rods. The density of nano-rods is high enough to meet the relative conductivity requirements noted above.

Example 2

Lower the conductivity of the electrolyte so that it becomes comparable to the impedance presented by the cell colony for steering the electric fields through the cell cluster. One example for this method is changing electrolyte conductivity, which may interfere with the cell growth.

Example 3

A method comprising one or plurality of millimeter to micron sized needles that are conductive in their core and have insulation on the outside. Each micro-needle (individually or as a small cluster) is separately addressable. Such needles are positioned in close proximity of cells when the cell cluster grows.

Example 4

A user manually inserts or attaches a needle(s) electrode into the cell cluster. The impedance of this cell cluster is then measured.

Example 5

A method comprising placing an insert in the sample containers for 3D electrical, physicochemical, and impedance measurements. The insert can have certain properties such as one or more of the following: made of transparent material; coated with printed electronics (one example is TFTs); is mounted on top of the well near the lid or the light source; has protruding side walls that point downward; the side walls are coated with gold; each side wall is individually addressable with an electronic circuit, such as the TFT circuit; each electrode has a force and sense node that gets routed to the periphery of the insert through the electronic circuit; the insert has conductive interconnects routing to the periphery of the well side walls; the insert comprises a single or a plurality of mini-wells in a grid with various sizes. One example is 1 mm by 1 mm mini-wells across the well area;

the mini-wells can have holes; the mini-wells enable measuring of the impedance of cell clusters in a highly granular method (spatially).

Example 6

A method comprising attached isolated individual bars mounted to the bottom of wells that can hold electrical, physicochemical, and acoustics sensors. These can be made in different shapes and form factors such as bar, wall, mesh and other customized shapes and sizes.

Example 7

A method where the inserts and the well contents are delivered with robotics or bioprinters. For example, thermo-responsive gel can be delivered in a liquid state and converted to a gel state.

Example 8

A method where multiple cell types, gel matrices, and biohybrid functional materials can be delivered locally to wells or vicinity of the inserts for dynamic detection.

Example 9

A method where the insert is pre-assembled with tunable matrices of nanometer to micrometer thickness via wet chemistry or plasma deposition.

Example 10

A method where wells and the inserts can be micro/nano-patterned with bio-inks using soft-lithography or laser patterning. The bio-inks can be both cell-attracting and cell-repelling including peptides, peptide mimetics, analyte-sensitive gels, and thermo-responsive or pH-sensitive gels. The gels can range from brush structures of 10-1000 nm thickness or as 3D containers of 1-100 micron thickness. The gels can be engineered and/or arrayed to form template 3D matrices for promoting various cell states and fates. The gel matrix arrays can incorporate oligonucleotides, antibodies, and short peptides. The 3D nature and the high surface area allows for increased test sample density and thus improves device sensing sensitivity. A temperature regulator element can bring the gel to a near solution state to facilitate removal of the cells and/or cell clusters for analysis.

Example 11

A method where cells or other biological components can be seeded and cultured on each insert separately and can be introduced to culture well for measuring physichochemcial properties of cells in 3D.

For sensing and measuring electrical, acoustic, and chemical properties of 3D cell clusters, the accuracy of measurement depends on many factors including physical location and closeness 3D biological samples to electrodes and sensors.

Figure 31:
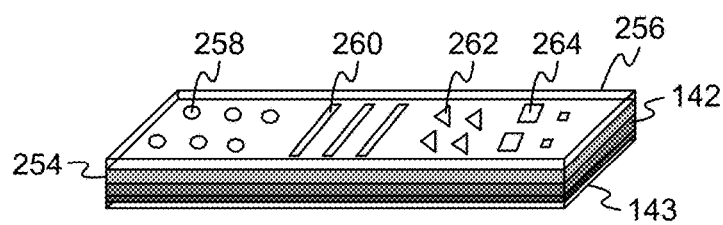
FIG. 31 illustrates a perspective view of a well with an insert configured for guiding delivery of molecules and biological sample according to some embodiments.
Figure 32:
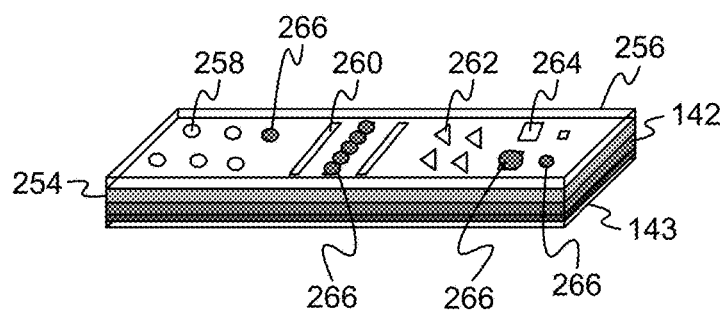
FIG. 32 illustrates the insert of FIG. 31 with cells passing through select openings.

It may be desirable to use an insert in order to guide delivery of natural and synthetic molecules and biological samples into the gel. Such an insert can be fitted into a well that has sensors, such as those previously described, or a well that does not have sensors. FIG. 31 illustrates a perspective view of a well with an insert configured for guiding delivery of molecules and biological sample according to some embodiments. The side walls of the well shown in FIG. 31 are not shown to better illustrate the layers present within the well. One or more thermal elements 143 of the type previously described are coupled to a bottom wall 142 of the well. A gel 254 is positioned on the bottom surface of the well. An insert 256 is positioned on the gel 254. The insert 256 can include a variety of pores, or openings, having different shapes and sizes to enable cells and other types of molecules of various shapes and sizes to fit through the openings. In the exemplary configuration shown in FIG. 31, the insert includes circular openings 258, slot openings 260, triangular openings 262, and square openings 264. It is understood that other sizes, shapes, arrangements, and numbers of openings can be included in the insert. The insert can be solid or elastomer. The insert can be surface engineered chemically or physically, for example carrying 3D nano-structures for better sealing. The insert can be deposited with non-fouling and non-adherent molecules to increase selectivity of patterning. The insert can be thermally or optically ablated at specific locations to modulate shape or composition of the hydrogel patterns. Some cases might involve guided delivery of the cell solutions through the insert to form addressable locations within the well. In the case where the well has electrodes, the insert can also be used to guide delivery of the cells onto or toward the electrodes. Once the insert 256 is in place within the well and on the gel 254, a biological sample including cells 266 are added into the well. The cells 266 fit through the openings. FIG. 32 shows exemplary cells aligning with corresponding openings. The cells pass through the openings in the insert and settle into the corresponding location within the gel. In some embodiments, the insert can also function as a sensor that can sense specific chemical analyte through physical or chemical interaction with the analyte and create a resulting optical (for example, color change) or electrical signal.

Some application may involve delivery of different cell types. The insert can have optimized pore sizes for specific cell types such as prokaryotic cells or for co-cultures of multiple cell types. The insert pores can be selectively modified to allow passage of different cell types through select pores. The well surfaces under the insert can be heterogeneously surface modified (via wet chemistry or plasma enhanced chemical vapor deposition) to create tunable affinity profiles for different cell types.

As previously described, a variety of different sensor types can be coupled to well side walls and bottom wall for 3D continuous sensing of multiple different modalities including, but not limited to, impedance, acoustic, and chemical. The sensors can be of a variety of different types including, but not limited to, electrical sensors such as electrodes, ISFETs, ChemFETS, acoustic sensors, environment sensors (temperature sensors, humidity sensors) and chemical sensors, including chemical sensor arrays, such as sensor dots that change color that can be optically interrogated. An objective for such multi-modal sensing is that an end-user may want different sensor types for different experiments. Therefore, a modular and removable sensor form factor is desirable. Modular because one does not want to change the mechanical assemblies and interfaces for different types of sensors. Removable because it is desirable to have freedom to use different types of sensors. Also, in a multi-modal sensing system that also performs imaging, the placement of these sensors should not occlude the imaging sensor. For a biosensing-imaging system with an image sensor mounted underneath the well and with sensors positioned on or in the bottom wall of the well, some degree of optical occlusion is present.

An insert fits within the well so as to position active sensing components in physical contact with the gel including biological samples. The insert can have various sizes depending on the well size, and can include various types of sensors such as impedance, acoustics, chemical, optical, and environmental sensors. The insert can be made from various materials and structures such as metamaterials, micro/nano-fibers in the forms of woven, non-woven, or scaffolds, freeze dried scaffolds. The inserts can be made of homogenous or heterogeneous biohybrid functional materials. The insert and any connection wires can be modified with conformal coatings to enhance reliability and performance. Use of inserts still enables simultaneous and orthogonal polysensing and imaging.

Figure 33:
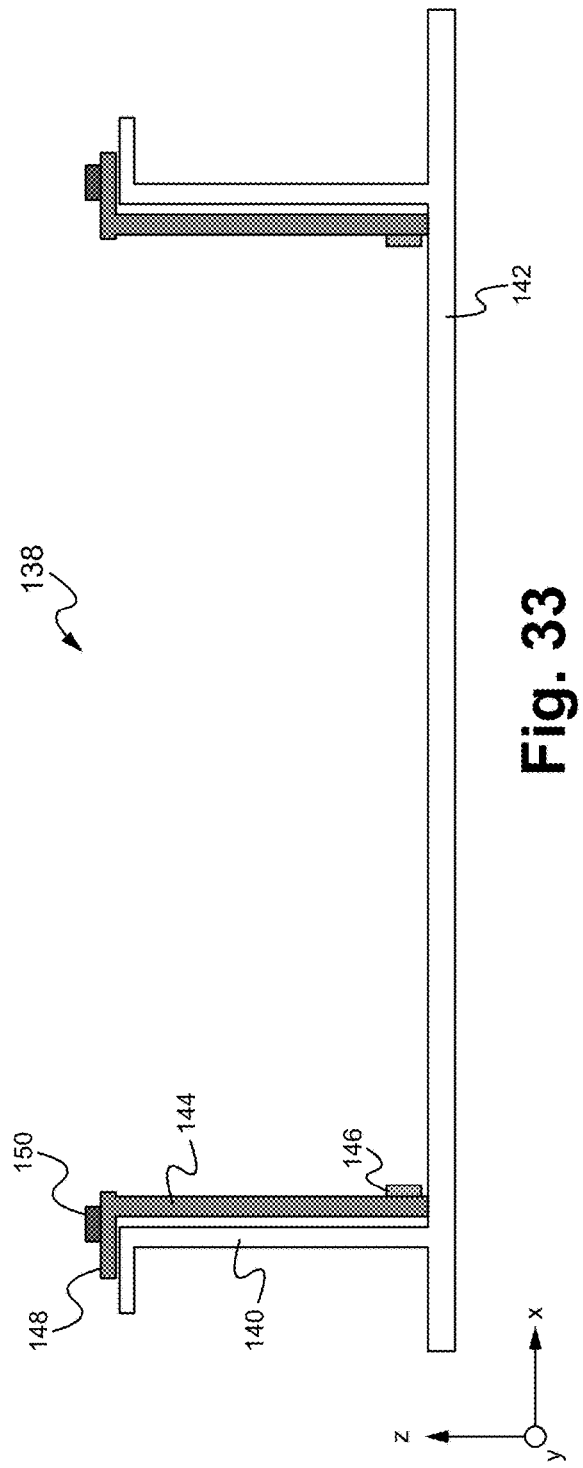
FIG. 33 illustrates a cut out side view of an insert positioned within a well according to some embodiments.
Figure 34:
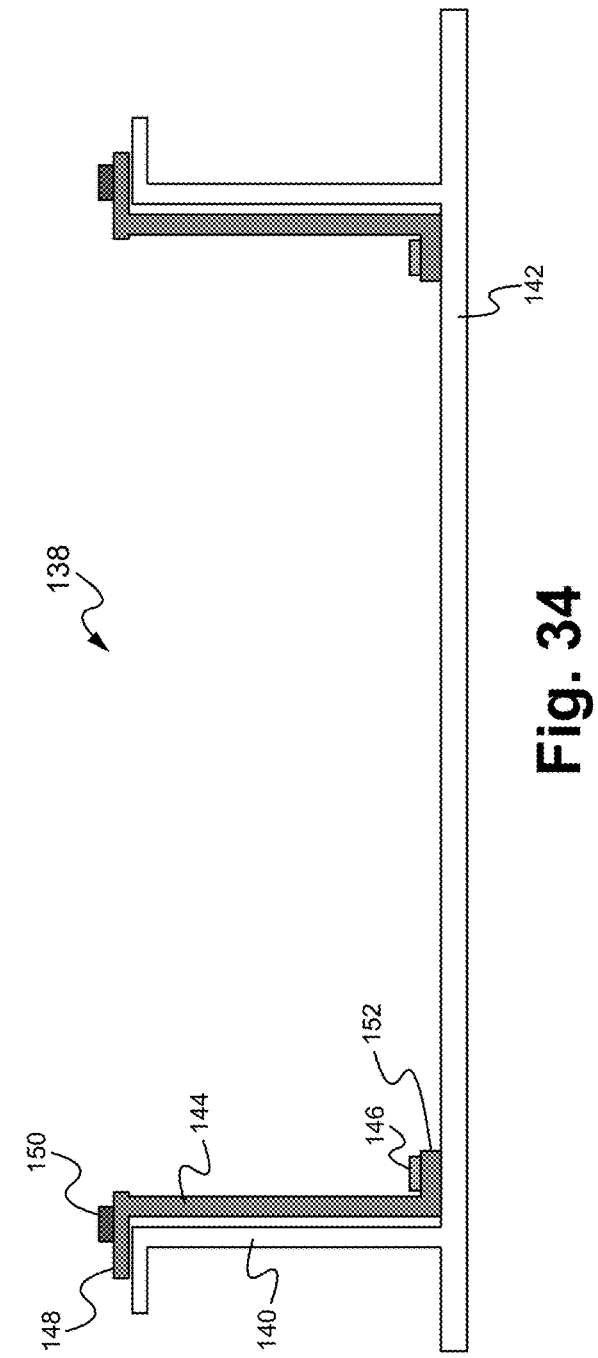
FIG. 34 illustrates a cut out side view of an insert positioned within a well according to other embodiments.

In some embodiments, the insert is configured to be positioned along the well side walls, leaving the bottom wall of the well completely uncovered by the insert. FIG. 33 illustrates a cut out side view of an insert positioned within a well according to some embodiments. An insert side wall section 144 extends along or adjacent to a well side wall 140. In the exemplary configuration shown in FIG. 33, the insert side wall section 144 extends to the bottom of the well 138, and a sensor 146 is positioned proximate the bottom of insert side wall section 144. It is understood that the sensor can be alternatively positioned on the insert side wall section, at any position in the Y and Z directions. The insert side wall section 144 includes a wire (not shown), or other form of electrically conductive interconnect, connected to the sensor 146, the wire is routed along the insert side wall section 144 to an insert top wall section 148 at the top of the well. The insert top wall section 148 includes an electrical connection point 150 for providing off-insert electrical connection. Although only a single sensor is shown coupled to each insert side wall section, more than one sensor, of the same or different type, can be coupled to each insert side wall section. It is also understood that a length of the insert side wall section can be shorter than the depth of the well such that a bottom of the insert side wall section does not reach the bottom of the well. In some embodiments, the length of the insert side wall section is longer than the depth of the well, resulting in a portion of the insert side wall section extending over an outer portion of the well bottom wall, such as proximate the interface with the well side walls to minimize optical occlusion. FIG. 34 illustrates a cut out side view of an insert positioned within a well according to other embodiments. The insert in FIG. 34 is similar to that of FIG. 33, except that a portion 152 of the insert side wall section extends onto the bottom wall 142 of the well 138. The sensor 146 can be positioned on this portion of the insert side wall section.

Figure 35:
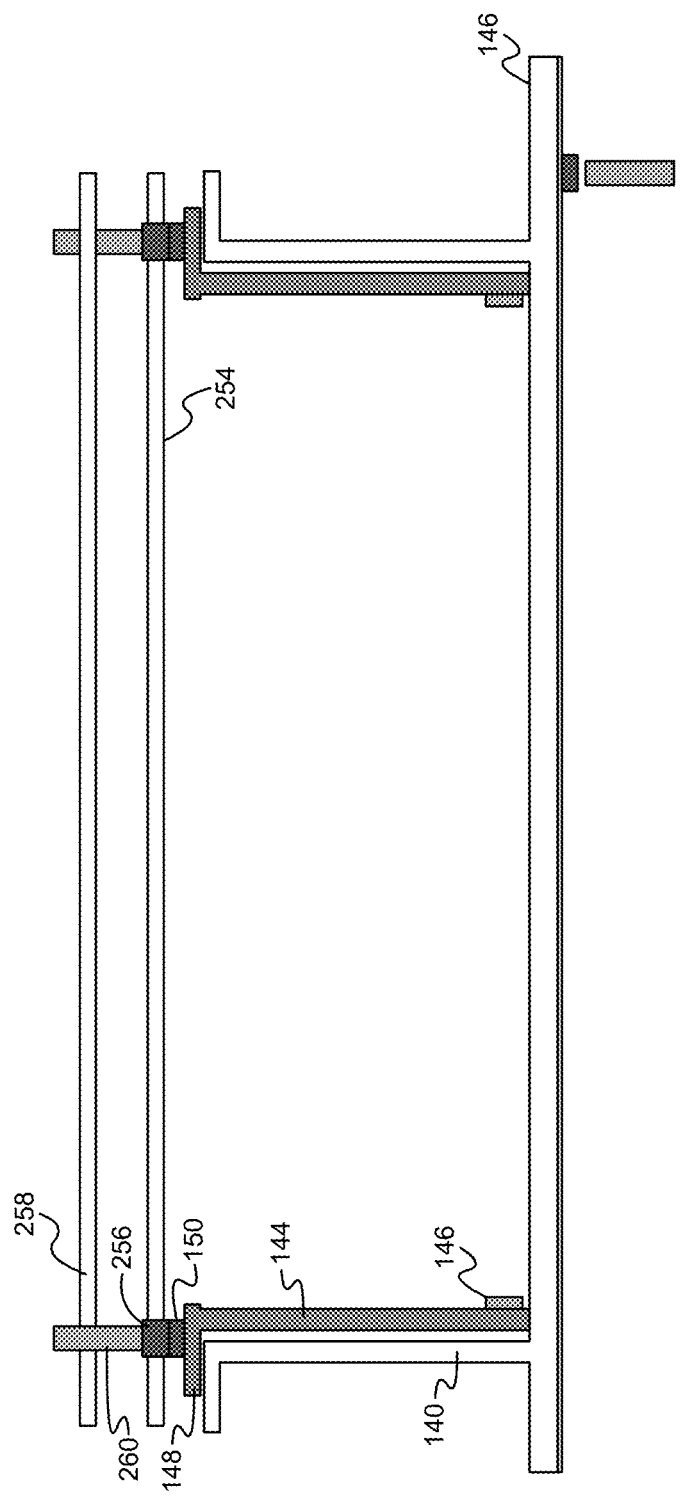
FIG. 35 illustrates a cut out side view of a lid structure coupled to an insert according to some embodiments.

In some embodiments, a lid structure enables a connection to the insert electrical connection points. FIG. 35 illustrates a cut out side view of a lid structure coupled to an insert according to some embodiments. The insert shown in FIG. 35 is the same as the insert shown in FIG. 33. The insert includes side wall portions 144 having one or more sensors 146 coupled thereto. Each sensor is connected to a conductive interconnect, such as a wire, that runs along the side wall portion of the insert. In some embodiments, the end of each wire terminates at an insert contact pad. A lid structure includes conductive interconnects each terminating at a corresponding lid contact pad. When a lid 254 is mounted to the insert, each insert contact pad 150 is electrically and mechanically coupled to a corresponding one lid contact pad 256 for providing a signal pathway from the sensor off the insert. In some embodiments, the conductive interconnects on the lid structure are coupled to electronic circuitry in the reader. In other embodiments, the signal pathway off-insert to the reader is not provided via a lid structure. Instead, an alternative electric connection can be made between the insert and the reader. For example, the wires on the insert can be routed to an outer edge of the entire insert structure, providing an electrical connection point for the reader or other interconnection wiring. In some embodiments, a light source 258 can be mounted onto the lid 254 via pogo pins 260.

Figure 30:
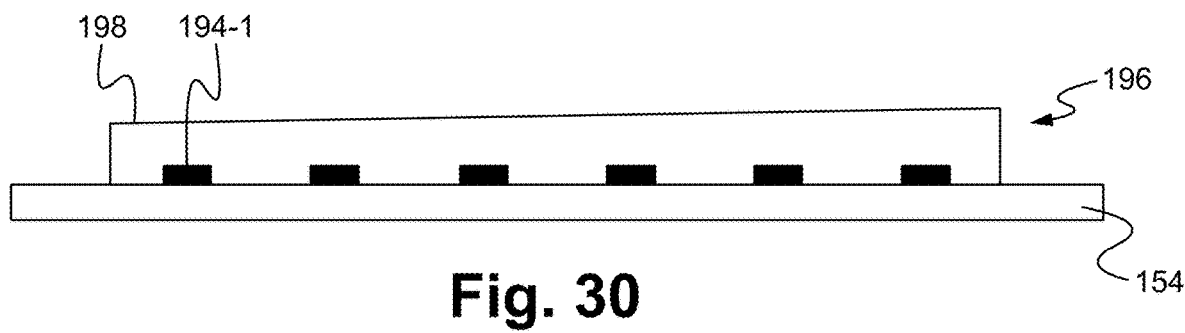
FIG. 30 illustrates a cut out side view of a chemical sensor array having a protective container formed with a tapered thickness according to some embodiments.

In some embodiments, such as that shown in FIGS. 30 and 31, each insert is configured to substantially match the dimensions of the well, except for the depth as previously described. In other embodiments, the insert is structures so as to divide the well into many small regions (mini-wells) within each of which the cell colony can grow. For example, into a well having dimension of 1 cm×1 cm can have an insert with mini-wells each having a dimension of 1 mm×1 mm. By using an insert, it is not needed for the cells to grow on top of the electrodes that are placed on the bottom of the well. Instead, some of the cells grow in the mini-wells and can attach to an electrode on one of the four sides of the mini-well. The insert is intended to better sense 3D cell clusters that are suspended, for example cell clusters not in contact with the bottom surface of the well. The addition of the mini-wells allows much more granularity to measure the characteristics of smaller regions or volumes of a cell colony. The insert includes the capability of accessing various sensors that are positioned on it and multiplex the corresponding sensor signals to a minimal number of external connections. The insert can be made from flexible or non-flexible materials (substrate) and electronics, and the insert form factors and sizes are modular. The insert can be designed according to many different dimensions, and multiple sensor modalities can be implemented. The surface of the insert can be chemically modified to improve sensitivity of detection.

In some embodiments, each mini well has four sides and each side the mini-well has electrodes that can be used to monitor the impedance of the cell cluster within its confines as well as other sensing modalities including, but not limited to, acoustics and chemical sensing. In some embodiments, the insert is made of transparent material, specifically the substrate upon which the electronics is created can be transparent. This minimizes, if not eliminates, shadowing effects from the inserts, which introduces less variability into the quality of the image being acquired. Further, in the case of a collimated light source of +/−X degrees relative to the surface, when X is not zero the light intensity is modulated near the flaps (portions of insert in the well) if the flaps are not transparent. The insert is mounted on top of the well near the lid or the light source. In some embodiments, the insert has protruding side-walls that point downward into the well. Each side wall, as well as each sensor mounted on each side wall, is individually addressable with the circuits on the substrate electronics that make up the insert. In the case of min-wells, each mini-well insert is bottom-less. Where wells are intended to perform impedance measurements, an insert includes a force electrode and a sense electrode that are each electrically routed to the periphery of the insert through the substrate electronic circuitry. The output of the sensors attached to the insert can be routed to a common bus to minimize external connections. Similarly, the input to of the sensors attached to the insert can be routed via another common bus.

Figure 36:
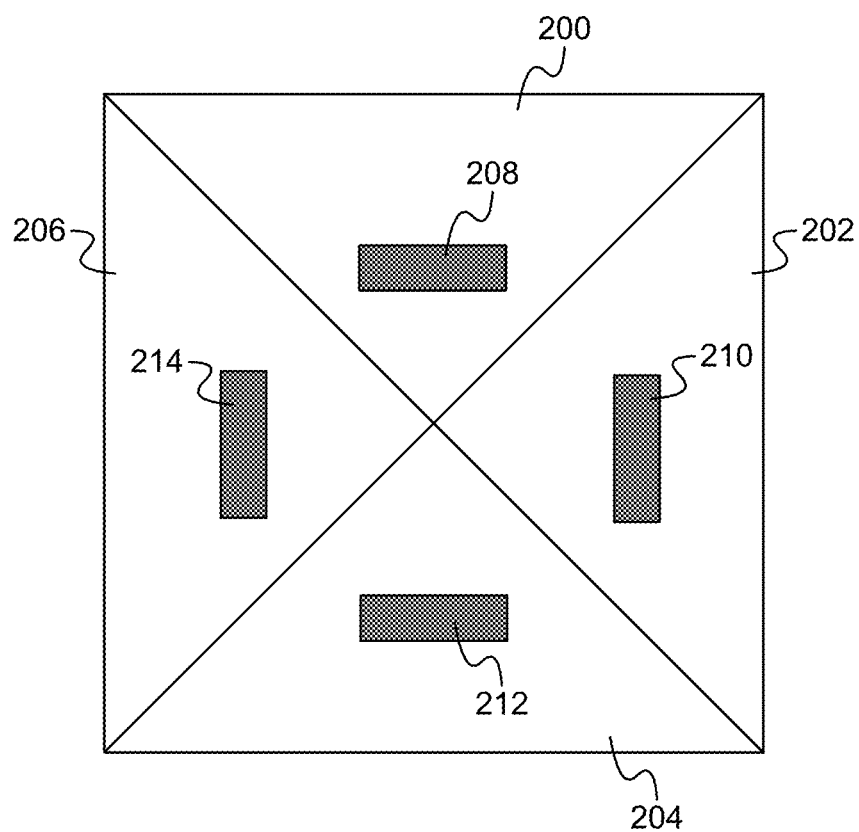
FIG. 36 illustrates a top down view of an insert according to some embodiments.
Figure 37:
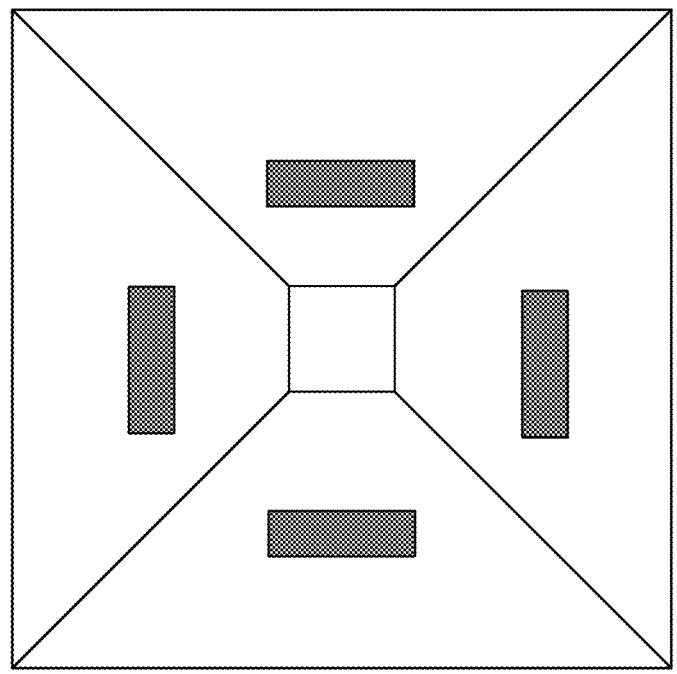
FIG. 37 illustrates an insert with alternatively shaped section.
Figure 38:
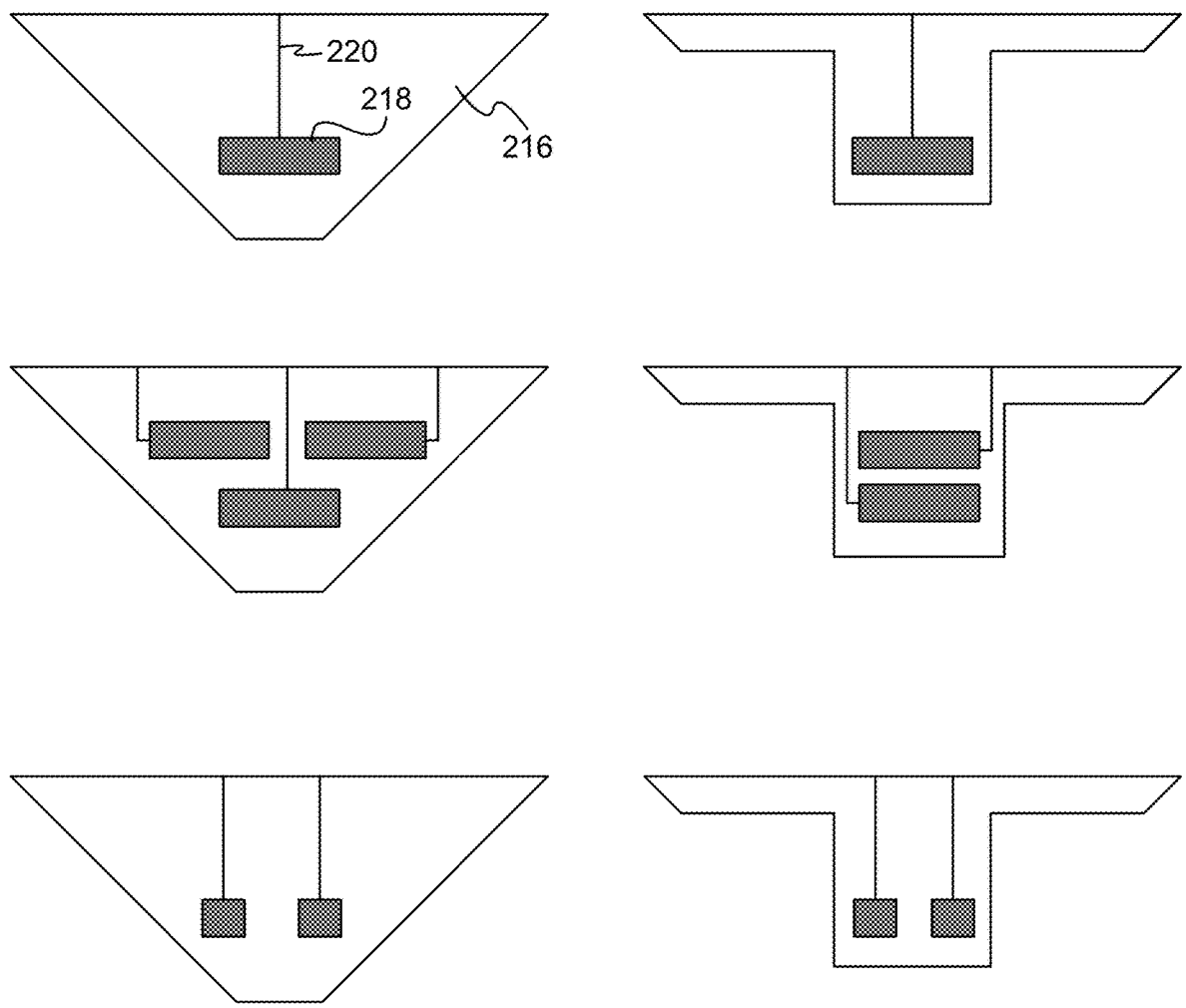
FIG. 38 illustrates a front view of a single flap having various different configurations.
Figure 40:
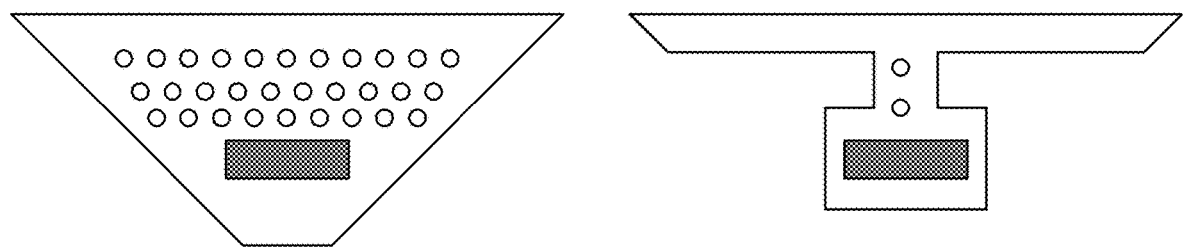
FIG. 40 illustrates a variety of flaps having holes.
Figure 40:
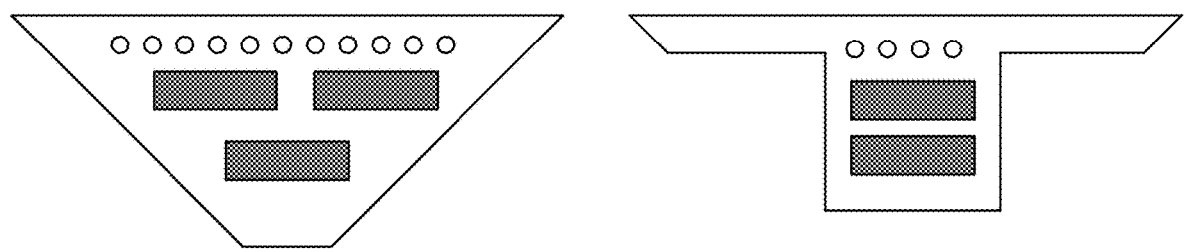

The inserts can be made and formed for insertion in a variety of manners. FIG. 36 illustrates a top down view of an insert according to some embodiments. This exemplary insert is shown as a planar sheet prior to be formed for insertion into a well. In this implementation, the planar sheet represents a flexible circuit substrate, such as a flexible circuit board, having a flexible substrate and sensors mounted on the flexible substrate. In the exemplary configuration shown in FIG. 36, the flexible substrate is cut into four triangular sections 200, 202, 204, 206. It is understood that the flexible substrate can be cut into alternatively shaped sections. For example, if the square-shaped insert is instead hexagon-shaped, six sections are formed that are trapezoidal or triangular. Each section 200, 202, 204, 206 includes a sensor 208, 210, 212, 214, respectively. Conductive interconnects to each sensor are not shown. In the exemplary configuration shown in FIG. 36, only a single sensor is shown attached to each section. It is understood that more than one sensor can be attached to each section. Each section can have the same, or different, number, type, spacing, etc. of sensors. The sections can be alternatively shaped. FIG. 37 illustrates an insert with alternatively shaped section. Portions of each section may be removed that do not perform any specific function, such as the removed center portion in FIG. 37. Another reason to have non-functioning portions of each section removed is to minimize the area of the side-wall sections of the inserts. The smaller the area of these side-wall sections, the less they interfere with the growth of the cell colony. FIG. 38 illustrates a front view of a single flap having various different configurations. For example, the top, left section 216 is shaped the same as one of the sections of the insert in FIG. 37, where the section 216 includes a single sensor 218 and conductive interconnect 220. Cell colonies prefer to grow in an un-impeded space. Holes can be formed in the flaps to minimizing blocking of cells when they are trying to grow. FIG. 40 illustrates a variety of flaps having holes.

Figure 39:
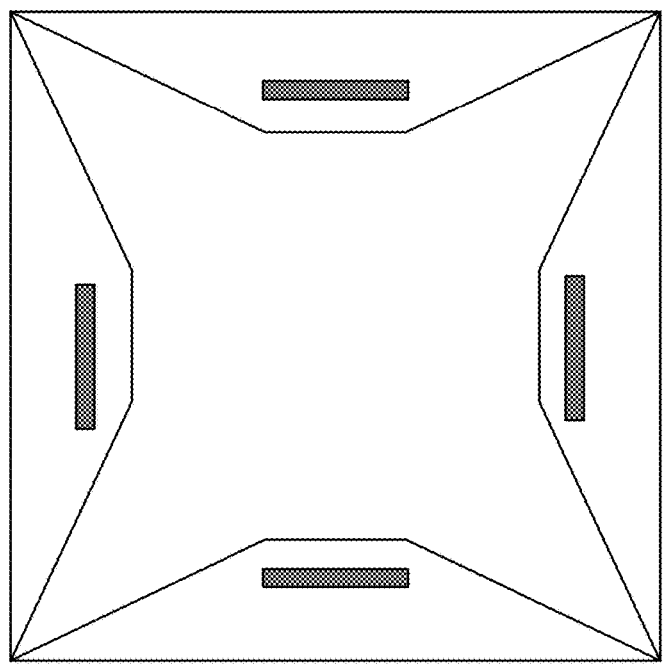
FIG. 39 illustrates a top down view of the insert of FIG. 37 with the flaps pushed down for insertion into a well.

To properly form the insert for insertion into a well, the sections, also referred to as flaps, are pushed down, such as shown in FIG. 39. The final configuration of the insert is to have the flaps pointing straight down, perpendicular to the bottom wall of the well, or parallel to the well side walls, so as to minimize the optical occlusion from the flaps.

The inserts with flaps are described above as being formed using a flexible substrate. Alternatively, a rigid but transparent structure can be formed that has a grid of openings for example square openings). This structure can have the wiring (conductive interconnects) printed on it. Side wall flaps can then be attached perpendicular to this rigid structure. The side wall flaps can be made of rigid or flexible material. The side wall flaps are functionally equivalent to the flaps previously described. Sensors can be mounted on these side wall flaps and they can be electrically and mechanically connected to the rigid grid through gold bumps, adhesive solder paste, pressure sensitive solder paste, etc. Subsequent description to flexible substrates of the insert can also be applied to rigid substrates.

Figure 41:
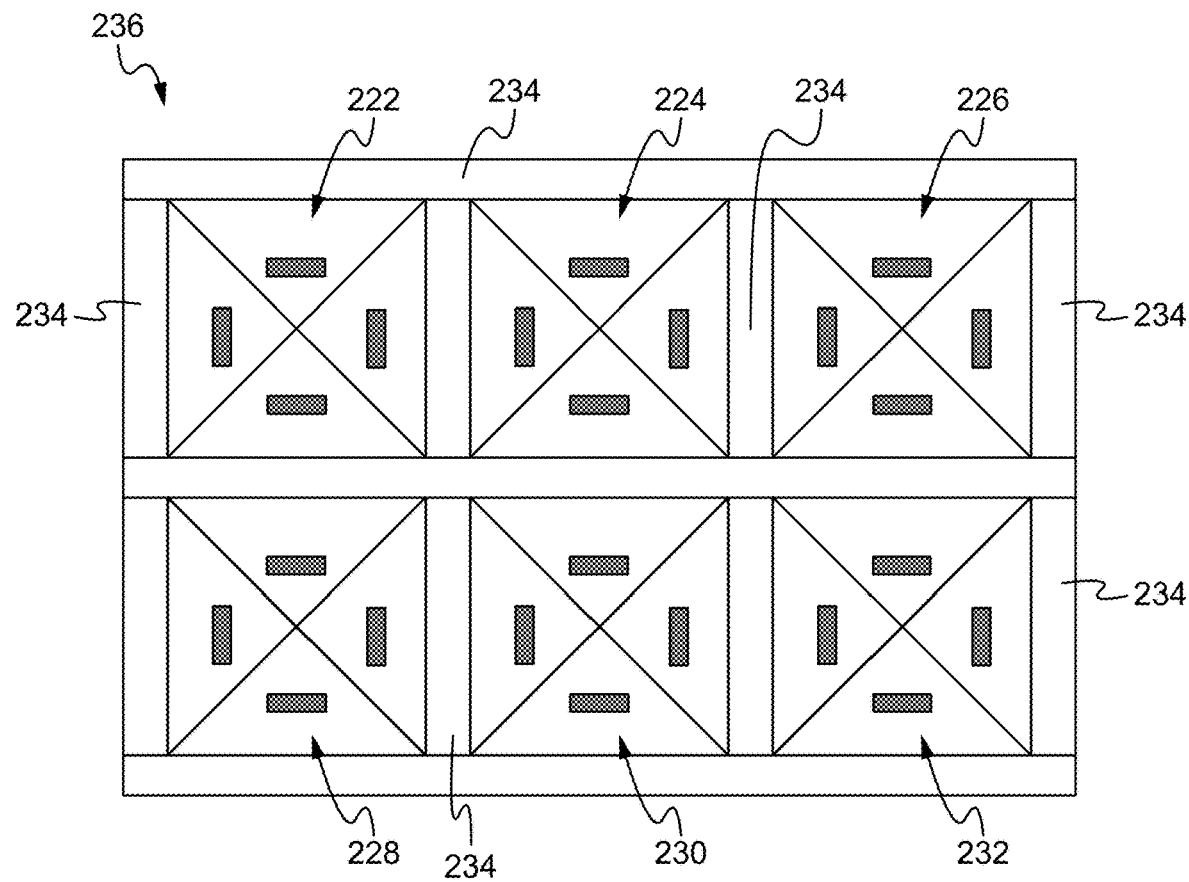
FIG. 41 illustrates a top down view of an insert configured to form multiple partitions according to some embodiments.
Figure 42:
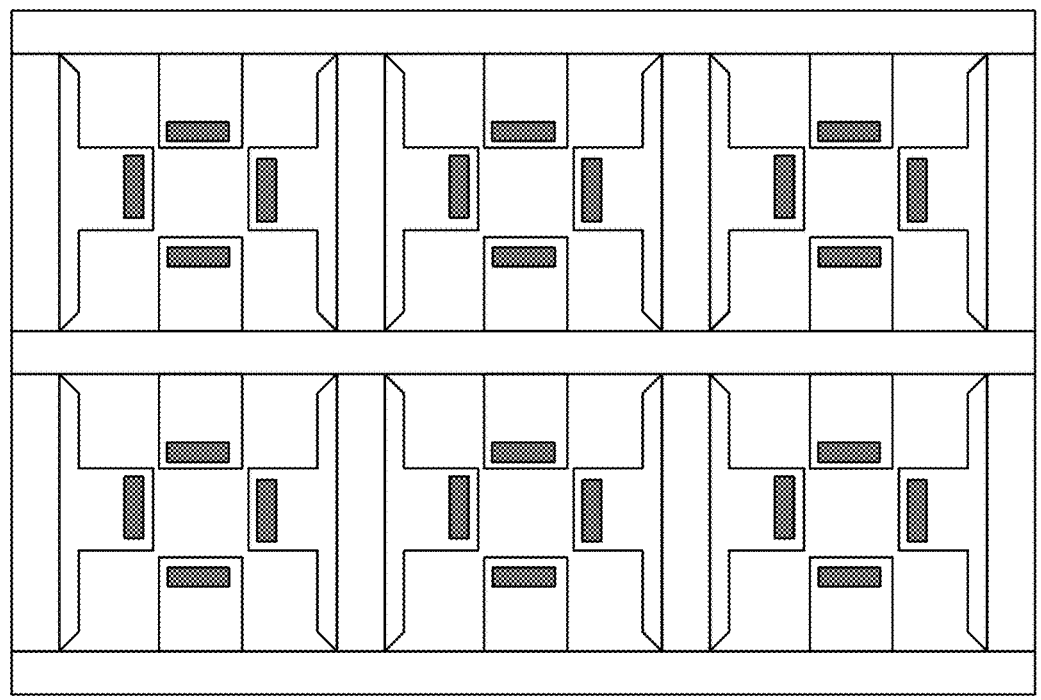
FIG. 42 illustrates a top down view of an insert configured to form multiple partitions according to other embodiments.

Each flap is connected to a portion of the flexible circuit substrate that includes active electronics. The active electronics can be used for selectively addressing each sensor on the flap. The flaps for multiple wells/mini-wells can be commonly formed as part of a larger flexible circuit substrate super-structure. FIG. 41 illustrates a top down view of an insert 236 configured to form multiple partitions according to some embodiments. In the exemplary configuration shown in FIG. 41, the insert 236 forms six partitions 222, 224, 226, 228, 230, 232. Each partition can be configured to fit within a corresponding one well of a slide. Alternatively, the partitions can be configured to form mini-wells within one or more wells of the slide, for example the insert shown in FIG. 41 can be configured for fitting into a single well so as to partition the well into six mini-wells. Each partition 222, 224, 226, 228, 230, 232 includes four flaps, similar to the flaps 200, 202, 204, 206 shown in FIG. 36. It is understood that the flaps can be alternatively configured, such as the flap shape shown in FIG. 42. The inserts shown in FIGS. 38 and 39 are still in their planar forms, prior to bending of the flaps for insertion into a well. Referring again to FIG. 41, each flap is connected to a portion 234 of the flexible circuit substrate that includes active electronics, including, but not limited to, the circuit architectures described below, such as the multiplexing circuitry, or other integrated circuits In addition to providing electrical interconnection to the flaps, these portions 234 provide mechanical stability for the flaps and in some cases provide mounting means for resting the insert onto a slide.

Figure 43:
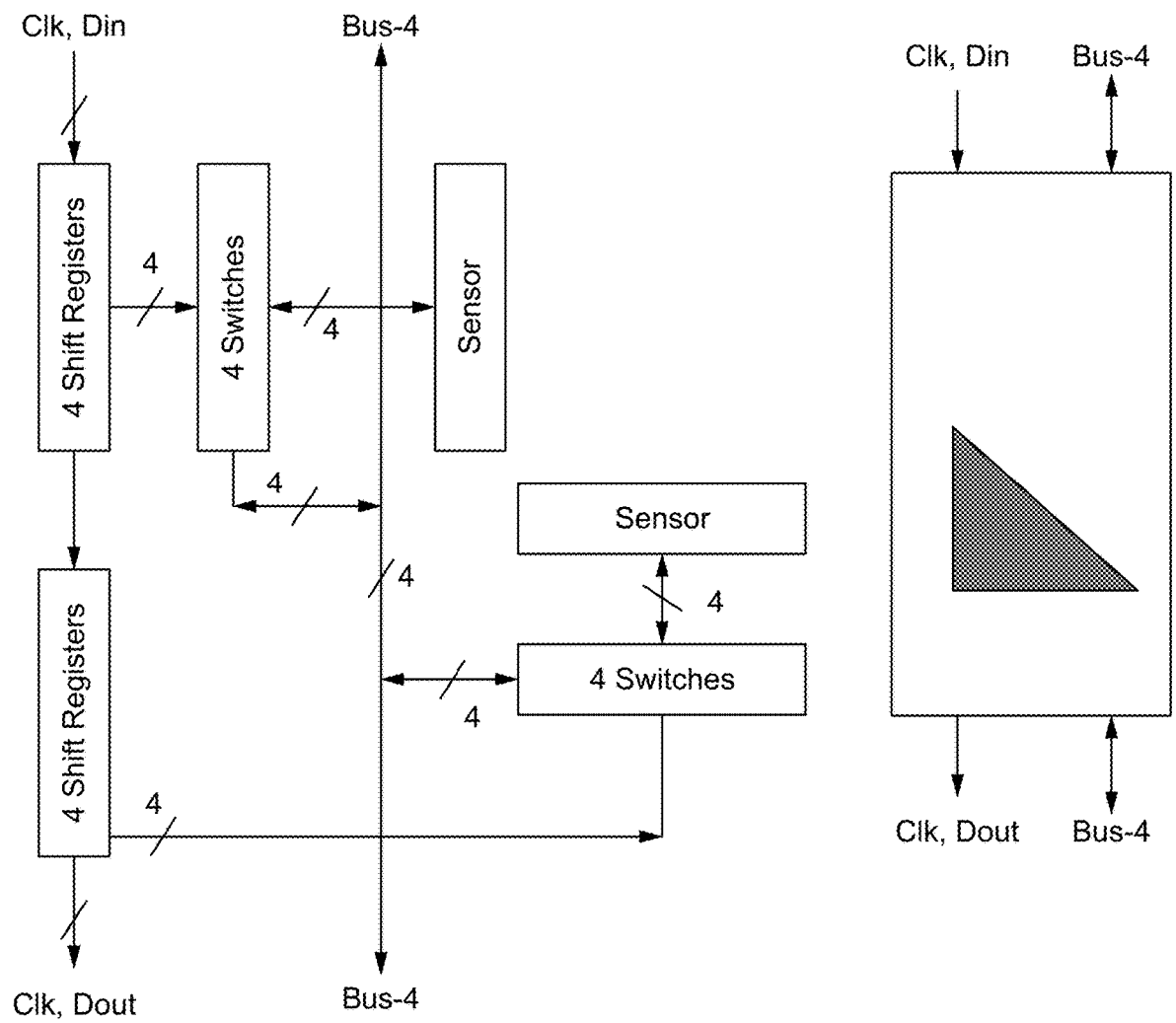
FIG. 43 illustrates exemplary multiplexer circuitry configured to selectively access eight different sensors.
Figure 44:
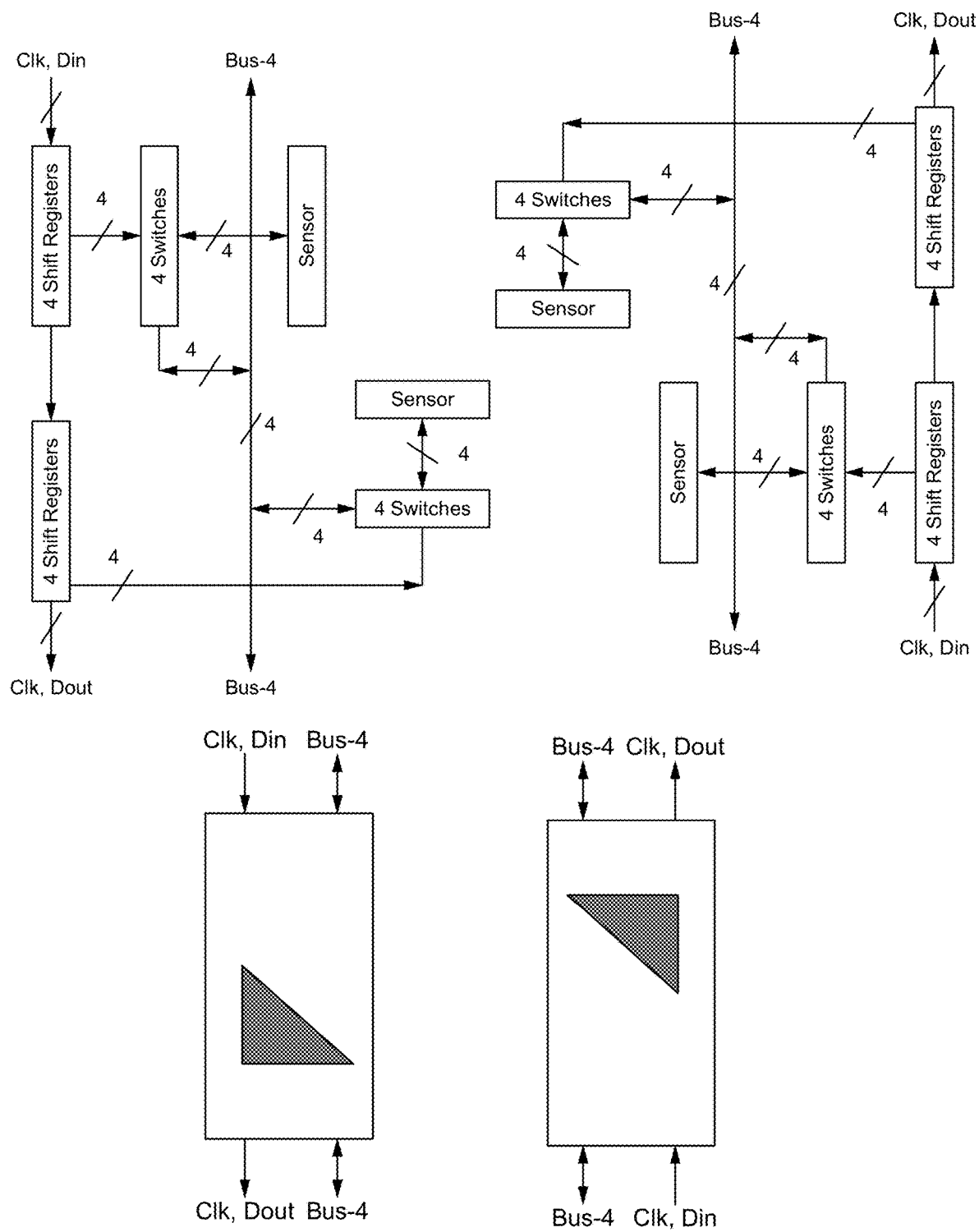
FIG. 44 illustrates the implementation of two of the multiplexer circuits from FIG. 43.
Figure 45:
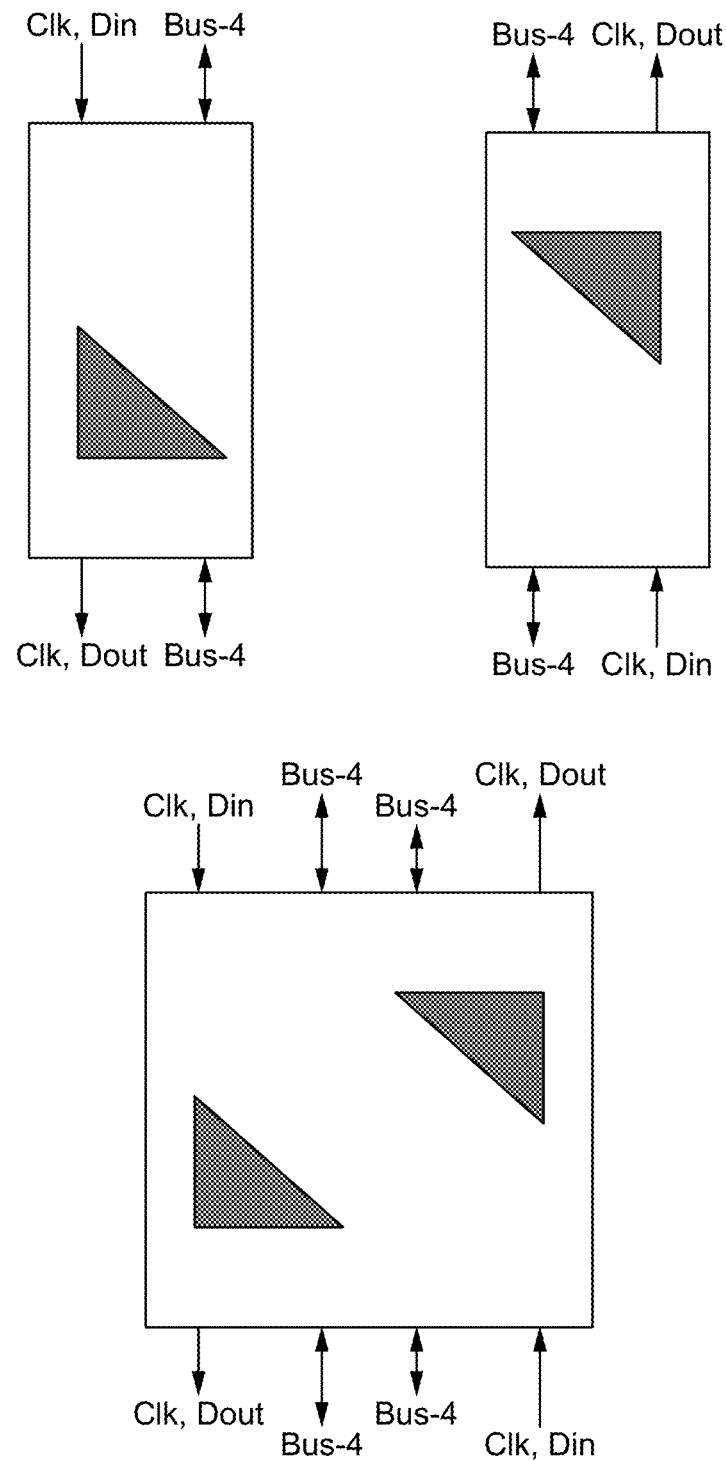
FIG. 45 illustrates a simplified block symbol for the two block symbols shown in FIG. 44.
Figure 46:
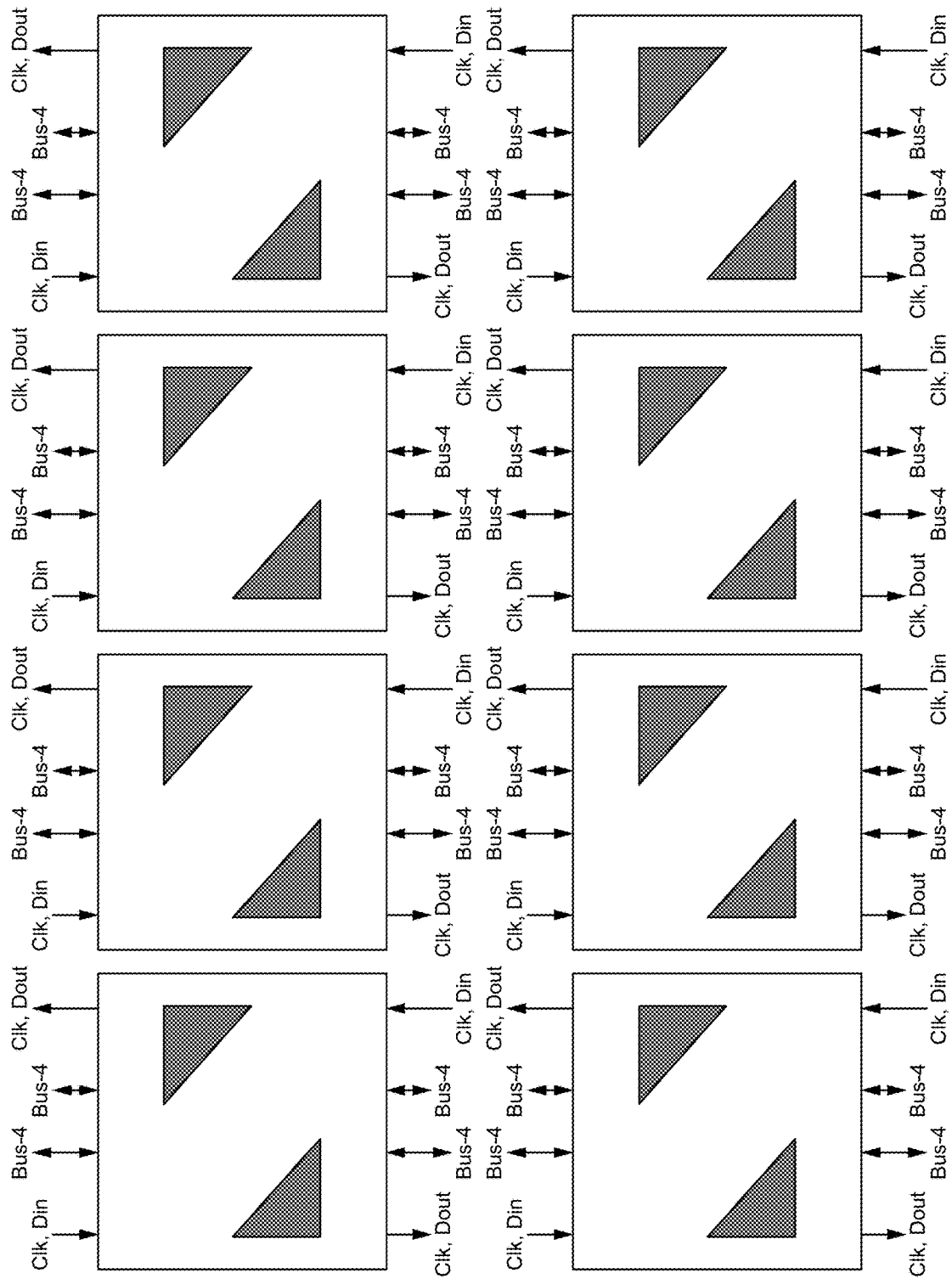
FIG. 46 illustrates an exemplary block diagram for a multiplexer circuit configured to be attached to the sensors in eight wells or mini-wells.
Figure 47:
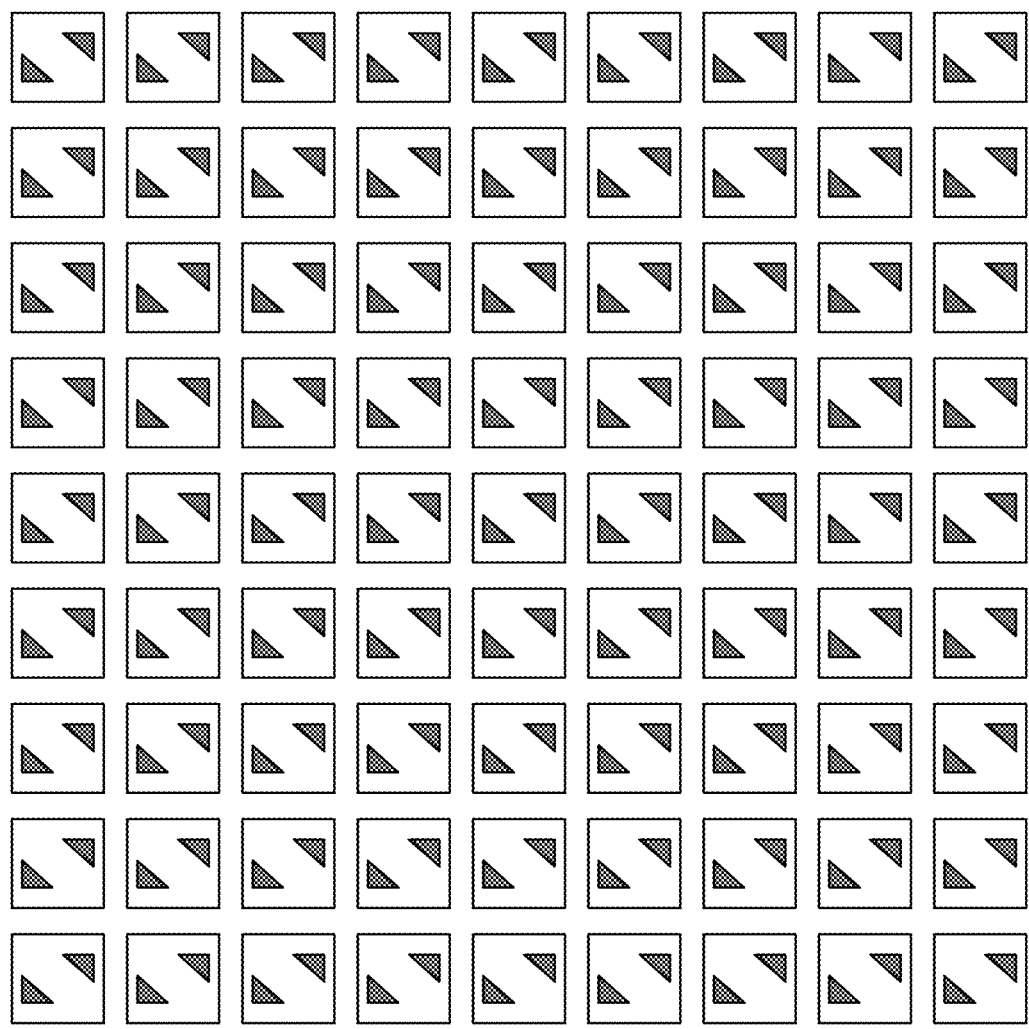
FIG. 47 illustrates an exemplary block diagram for a multiplexer circuit configured to be attached to the sensors in a 9×9 well or mini-well configuration.

Various circuit architectures can be utilized to implement the electronics circuitry, and in particular, the multiplexer circuitry. The multiplexer circuitry is intended to address multiple wells. For example, if there are 2 wires (connected to two sensors) per flap, and two flaps per well are addressed by one multiplexer circuit, and that multiplexer circuit addresses 10 wells, then the inputs to the multiplexer circuit are 2×2×10=40 inputs. The wires from many sensors are routed to the multiplexer circuitry, then the multiplexer circuitry selects which of the wires are to be addressed at any given time. By doing so, the number of wires output from the insert can be reduced to as low as four wires or two wires in some cases. This method allows one to minimize the number of connectors from the insert while addressing 100's of sensors. FIG. 43 illustrates exemplary multiplexer circuitry configured to selectively access eight different sensors. The figure on the left shows an exemplary schematic circuit diagram, and the figure on the right shows a corresponding block symbol representative of the schematic circuit diagram on the left. It is understood that alternative circuit configurations can be used to individually address and route signals to and from each of eight sensors. The multiplexer circuitry shown in FIG. 43 can be connected to the sensors of a single well or a single mini-well. It is also understood that the multiplexer circuitry can be configured to multiplex more, or less, than the eight sensors shown in FIG. 43. Multiple iterations of the multiplexer circuitry can be used to multiplex more and more sensors. FIG. 44 illustrates the implementation of two of the multiplexer circuits from FIG. 43. The two multiplexer circuits can be connected to the sensors of a single well or a single mini-well. The block symbol for two such multiplexer circuits can be simplified, such as the bottom figure in FIG. 45. A multiplexer circuit of the type shown in FIGS. 44 and 45 can be attached to each well, or mini-well, such as the configuration shown in FIG. 46 that can be attached to the sensors in eight wells or mini-wells. This can be expanded to any number of wells or mini-wells, such as the 9×9 well/mini-well configuration shown in FIG. 47.

Figure 48:
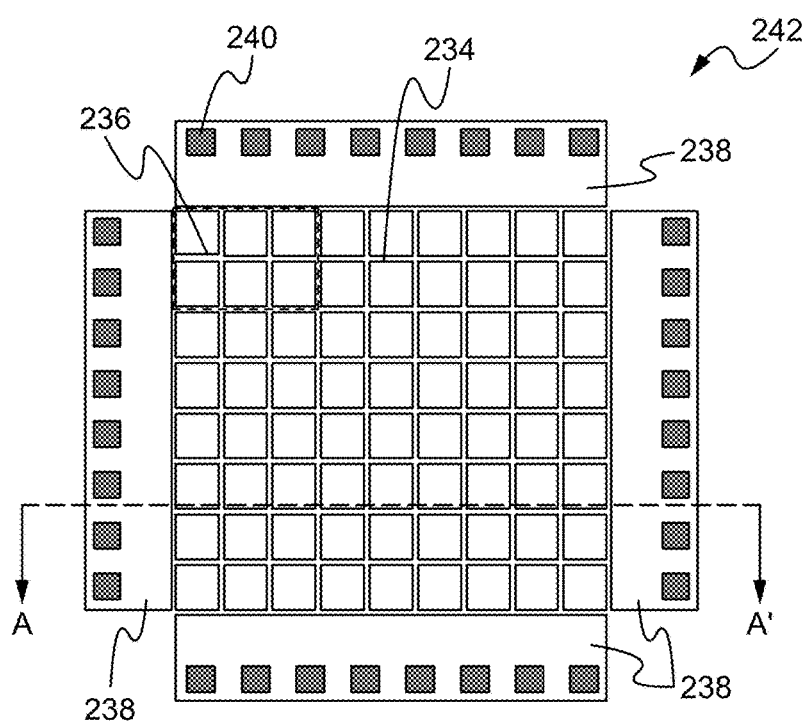
FIG. 48 illustrates a top down view of another insert configured to form multiple partitions according to some embodiments.
Figure 49:
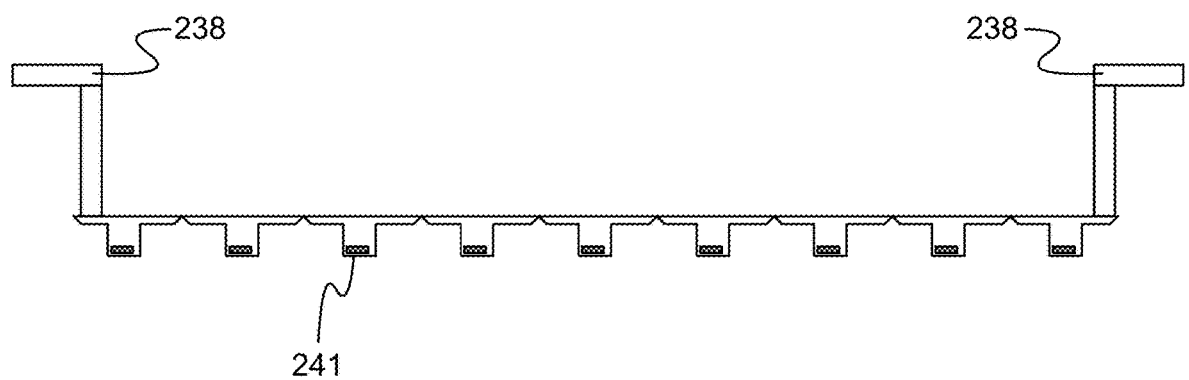
FIG. 49 illustrates an enlarged cross-sectional view of the insert 242 along the line A-A' in FIG. 48.

Flexible circuit substrates can be further expanded to increase the number of partitions per insert. FIG. 48 illustrates a top down view of another insert configured to form multiple partitions according to some embodiments. The insert 242 shown in FIG. 48 includes 72 partitions, essentially twelve of the inserts 236 shown in FIG. 41, having similar flaps (not visible and being perpendicular to the page of the figure) and portions 234. The insert 242 includes perimeter segments 238 having a plurality of connection pads 240. The perimeter segments 238 are extensions of the flexible circuit substrate that forms the flaps and portions 234. The perimeter segments 238 include active electronics used in conjunction with the active electronics on the portions 234 to selectively address the various sensors on the flaps. The perimeter segments 238 provide mounting means for resting the insert onto a slide or onto the well walls that are on the slide, and to serve as electrical connection points outside the insert. FIG. 49 illustrates an enlarged cross-sectional view of the insert 242 along the line A-A' in FIG. 48. As shown in cross-section, each flap 241 corresponds to one of the mini-well side walls. The mini-wells and surrounding portions shown in FIGS. 48 and 49 are similar to those shown in FIGS. 41 and 42, with the flaps 241 having the same shape as those in FIG. 42.

As shown in FIG. 48, each perimeter segment has 8 electrical connection pads 24. It is understood that each perimeter segment can have more or less than 8 electrical connection pads. It is also understood that not each side of the insert need have a perimeter segment, for example the insert 242 can be configured with only one, two, or three perimeter segments 238.

An advantage of the insert is that sensors can be placed in close proximity to the various cell clusters. This enables very close monitoring of the conditions within the mini-wells. Another advantage of the insert having multiple mini-wells per slide well is that the spacing between the sensor(s) and the cell colony is minimized compared to spacing of sensors positioned on the actual well walls. This is especially important for applications like acoustic sensing of the cell clusters. In the absence of the mini-wells, an acoustic signal is transmitted from either the bottom wall of the well or from the side-walls of the well. Positioning the acoustic transmitters on the bottom of the well can occlude the optical image. Positioning the acoustic transmitters on the well side-walls creates a very long acoustic path and the received signal is substantially weakened or lacks resolution. By placing a transmitter on one wall (flap) of the mini-well and a receiver on an opposing wall (flap) of a mini-well, a much higher resolution interrogation of the cell cluster between the transmitter and receiver is achieved. Similar acoustic measurements can be determined by sensing reflected acoustic signals using acoustic sensors on the same flap. In general, acoustic sensors can detect transmission through the cells or reflection from the cells. Transmission is detected when the transmitter is facing the receiver and reflection is obtained when the transmitter and receiver are on the same plane.

The flexible circuit substrates used in the fabrication of the inserts described above use flexible electronics that only consist of wiring layers and no active devices, transistors for example. In this simplified arrangement, the flexible electronics route wires from the sensors to a central sensor hub made from a conventional semiconductor technology. The sensor hub can interface to the large number of wires, such as to select the appropriate signals and route them to the appropriate bus, which for example can be include in the segments 238. Such a sensor hub can do more than the simplest form of switching. The sensor hub can have additional functionality that is compatible with what standard process technologies allow. The partitioning described above enables a simple flexible circuit substrate that only has wiring on it and provides for interconnection to a standard silicon based sensor hub having active devices.

Figure 50A:
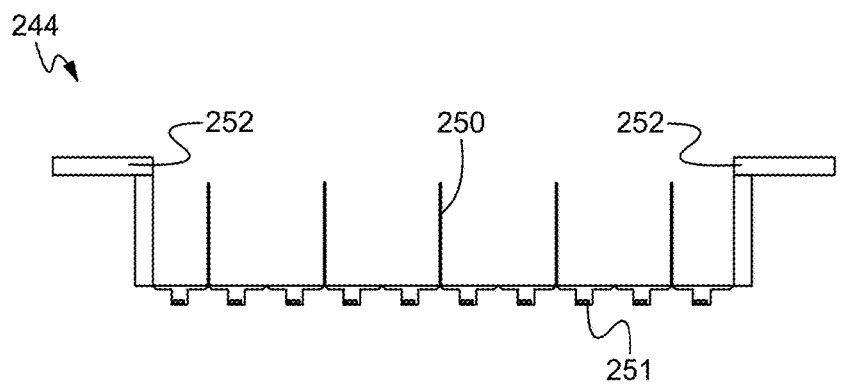
FIGS. 50A and 50B illustrate an insert configured according to the hybrid approach according to some embodiments.
Figure 50B:
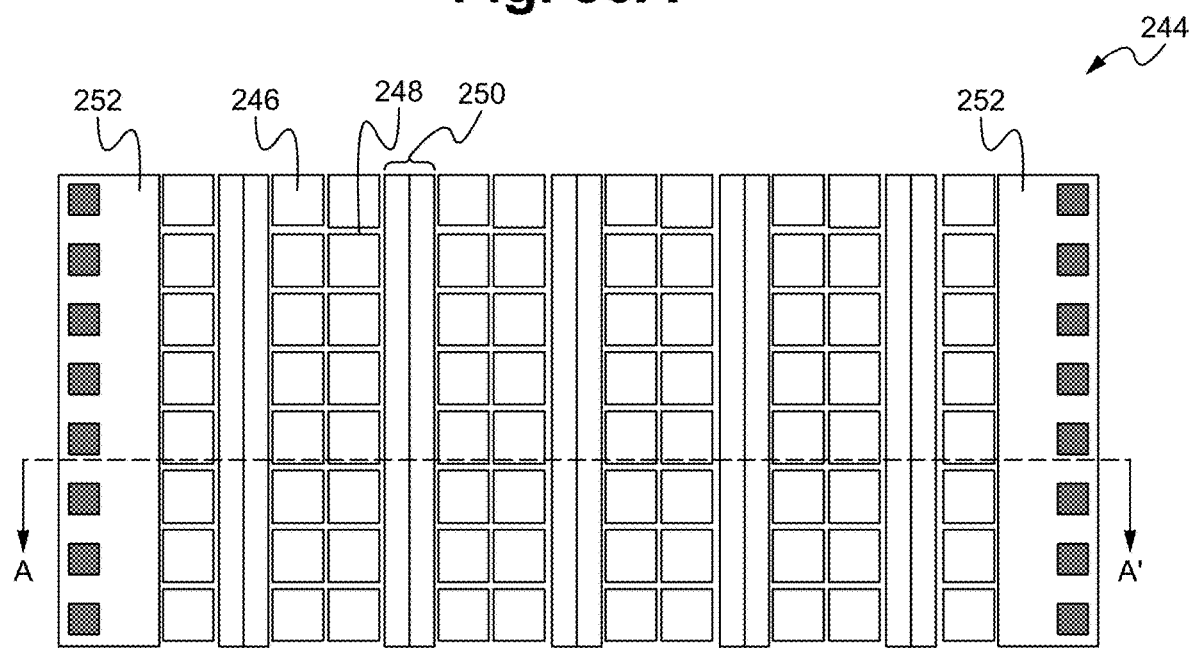

In some embodiments, a hybrid approach is used for combining flexible electronic as well as a semiconductor approach. Using the hybrid approach, the flexible circuit substrate includes increased areas that can be folded to from a vertical section that extends upward in the opposite direction as the downward folded flaps. FIGS. 50A and 50B illustrate an insert configured according to the hybrid approach according to some embodiments. FIG. 50B shows a top down view of the insert 244 in a non-folded state. FIG. 50A shows a cross-sectional view of the insert 244 along the line A-A' of the FIG. 50B in a folded state. The insert 244 includes 10 columns and 8 rows of partitions 246, each partition 246 having flaps 251 connected to portions 248. The portions 248 are connected to perimeter segments 252. The flexible circuit substrate of the insert 244 also includes additional portions that can be folded to form folded section 250. In FIG. 50B, the additional portion 250 is in a non-folded state where the additional portion is laid flat, and the perimeter segments 252 are also in a non-folded state where the segments are laid flat. In FIG. 50A, the additional portion 250 is in a folded state where the additional portion is folded upon itself, and the perimeter segments 252 are in a folded state to form a 90-degree angle. One or more active electronic devices can be attached to each folded section 250.

In some embodiments, a lid structure enables a connection to the insert's electrical connection points. FIG. 35 illustrates a cut out side view of a lid structure coupled to an insert according to some embodiments. The insert includes side wall portions having one or more sensors coupled thereto. Each sensor is connected to a conductive interconnect, such as a wire, that runs along the side wall portion of the insert. In some embodiments, the end of each wire terminates at an insert contact pad. A lid structure includes conductive interconnects each terminating at a corresponding lid contact pad. When the lid is mounted to the insert, each insert contact pad is electrically and mechanically coupled to a corresponding one lid contact pad for providing a signal pathway from the sensor off the insert. In some embodiments, the conductive interconnects on the lid structure are coupled to electronic circuitry in the reader. In other embodiments, the signal pathway off-insert to the reader is not provided via a lid structure. Instead, an alternative electric connection can be made between the insert and the reader. For example, the wires on the insert can be routed to an outer edge of the entire insert structure, providing an electrical connection point for the reader or other interconnection wiring.

Figure 51:
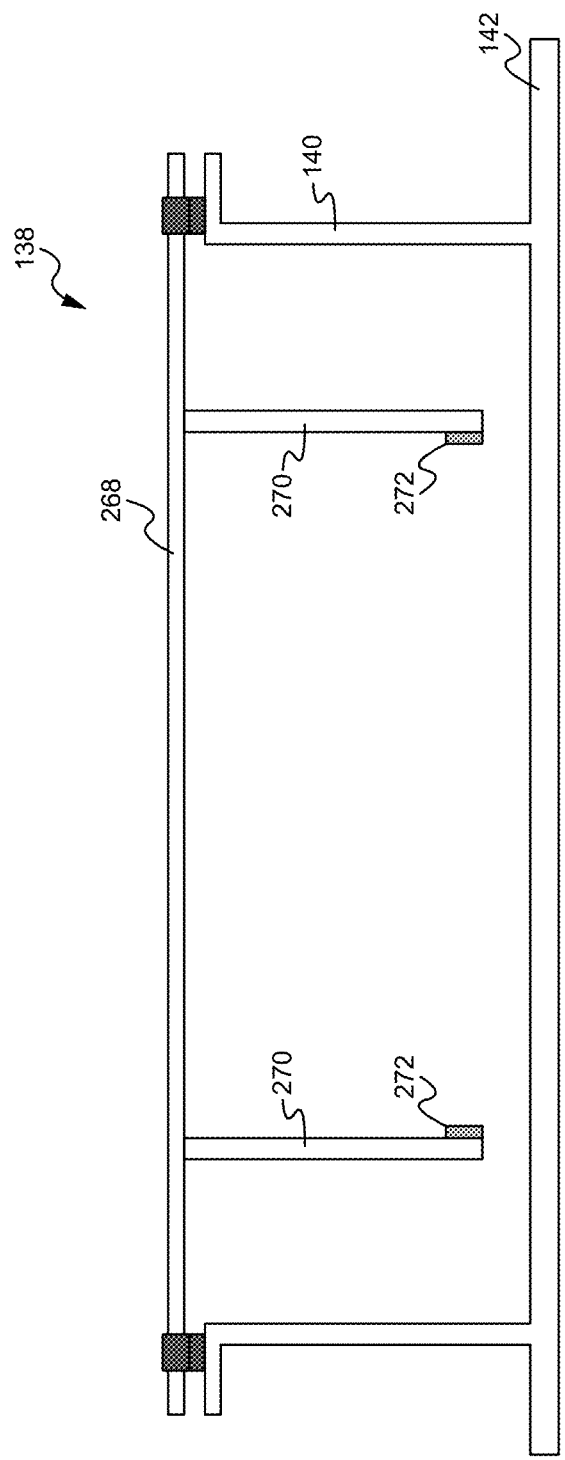
FIG. 51 illustrates an insert concept that is brought into the well through the lid.

In some embodiments, the lid structure is adapted to enable one or more sensors to be extended into the well from the lid. FIG. 51 illustrates a cut out side view a lid structure adapted to lower one or more sensors into a well according to some embodiments. In the exemplary configuration shown in FIG. 51, a well 138 is shown, with a lid 268 having one or more support structures 270 extending from a surface of the lid 268 facing the well into the well. One or more sensors 272 are attached to each support structure 270. Each sensor can be of any of the types previously described, in any combination and number. Each support structure includes one or more conductive interconnects coupled to each sensor 272. The lid 268 can include additional conductive interconnects, connected to the conductive interconnects on each support structure, to route signaling off-lid. The support structures can be configured as rods or strips. It is understood that other configurations are also contemplated. The lid with extending support structures and attached sensors can be used in conjunction with, or separate from, inserts of the type previously described.

In some embodiments, an insert is adapted to extend over at least a portion of the bottom wall of a well. A portion of the insert that extends over the bottom wall can include one or more support structures that extend up into the well. One or more sensors can be attached to each support structure. Each support structure includes one or more conductive interconnects coupled to each sensor. The support structures can be configured as rods or strips. It is understood that other configurations are also contemplated. In other embodiments, one or more support structures with conductive interconnects and sensors of the type described above can be attached directly to the bottom wall of the well, without the use of an insert, such that the support structures extend upward into the well.

Sensors, whether implemented on the well bottom wall (polysensing backplane), side walls, or inserts, generate signals from biological samples and analyte(s) continuously. These signals are subject to noise from a variety of sources including biological noise, electrode noise, electronic noise, interference from external sources, changed threshold due to continuous monitoring, optical noise caused by vibration due to mechanical movements, and biological contamination. Biological noise is an intrinsic noise. For instance, a cell that is being monitored can have spectral energy in the same frequency bands as the desired signal, making it difficult to filter out. Cells in the vicinity of the electrode can contribute to this noise significantly.

Biological noise can be minimized by selective surface modification of the well cavity or the insert in a way that inhibits non-specific adhesion of biological samples (such as neuron cells, cardiomyocyte cells, or muscle cells) in the micro/nanoenvironments surrounding the electrodes. Our method consists of a means to inhibit the non-specific adhesion of certain species to the electrode because these species produce electrical noise, where species refers to peptides, proteins, glycoproteins or other types of biological samples (such as neuron cells, cardiomyocyte cells or muscle cells). Another method consists of a means to promote the adhesion of certain species to the electrode because the electrical measurement of these species is of primary interest. An example of this means includes, but is not limited to, increasing affinity of absorption of the surface of the electrode through surface modification, this can consist of physical or chemical modifications. Another method consists of a means to exert an external force on the cells to move them closer to the electrode. These external forces can consist of applying electric or magnetic fields to the cells. The external force can be enhanced by adding nano-rods or needles into the gel. Nano-rods are directionally conductive and can be oriented in a magnetic field. The electrical fields through the wells can be steered using external control. Needles are millimeter to micron sized, and are conductive in their core and have insulation on the outside. Each needle, individually or as a small cluster, is a form of electrode with certain geometry. As with other electrodes, the needle van be selectively accessed, and therefore be considered separately addressable. The needles are to be positioned in close proximity of cells. Another means of creating an external force is through the use of optical tweezers.

Biological noise can also be a result of biological contamination. To minimize noise due to biological contamination the slides/wells can be sterilized prior to adding biological samples. Some examples of sterilization include, but are not limited to, using 70% ethanol flow, radiation (such as UV, Gamma), de-ionized water, heat sterilization, plasma sterilization, and gas sterilization.

Biological noise can also be due to optical damage of the biological sample during optical interrogation. When imaging the cells, the light source is configured so as not to induce damage to the cells. The damage mechanism consists of heating as well as other unknown mechanisms. To minimize such optical damage, the light source can be configured in a manner such that the field of view of the image sensor is illuminated while the rest of the well area is not illuminated. This minimizes the exposure of the cells to light by only shining light on the area of the cell that is being imaged. One way to accomplish this is to have a light source that moves in tandem with the image sensor. This can be achieved by a rigid mechanical coupling of the light source to the imaging hardware. Such a configuration is implemented in the optical system of FIG. 13. Alternatively, the light source can be moved by a motorized mechanism that allows the light source to be moved in tandem with the image sensor. Another technique is to utilize a diffused lighting mechanism for indirect illumination of samples.

Electrode noise is generally thermal in nature and can be minimized by reducing the electrode impedance. Platinum black deposition and electrode roughening methods for reducing electrode impedance can be used.

Optical noise can be caused by vibrations of the image sensor and/or the well during image capture. Examples of optical noise are the noises caused by mechanical vibration of mechanical component and the environment. Techniques for reducing the impact of vibration on image acquisition by the optical system include controlling the light source to illuminate in very short pulses and using accelerometers, as previously described.

In many applications it is desirable to identify and track individual slides, inserts, chemical detectors, and/or indicators, collectively referred to as consumables. A unique identifier (ID) can be applied to a consumable and read in various ways including optically and electrically. A unique ID can be in various forms and shapes. Some examples include, but are not limited to, numbers (serial or parallel), shapes, letters, dots, color, bits, or some combination. A unique ID can contain various information including manufacturing information, any calibration data associated with the consumable, customer information associated with the sale of the consumable, transaction date of sale of the consumable. More particularly, a slide or an insert can have a unique ID in the form of an optical signature (for example an array of color dots that are similar to a QR code). Alternatively, the unique ID can a series of bits that are formed on the slide (these bits can be formed by an ITO layer or another conductive layer). ITO is amenable to laser cutting such that these bits can be customized on the glass using a laser trimming process.

An insert can have electrical connectors on its periphery that are intended to interface to the reader. Again, the unique ID can be stored on the semiconductor content of the insert, for example the unique ID can be stored an IC (integrated circuit) or other electronic circuitry included on the insert. This unique ID can be read either upon startup or via a read command to the insert. Any number of interfaces (e.g. serial or parallel) can be used for this readout.

An insert for chemical detectors is different from the insert described above. This type of insert is referred to as a Chemical Detector Color Insert (CDCI). The CDCI can be placed at the bottom of the well. The CDCI has sensors whose color changes when exposed to different chemicals. These color changes are detected by the optical system and interpreted by the reader. The unique ID for the CDCI can be read optically as a unique set of optical features on the CDCI. The CDCI does not have any electrical connections to the reader.

The information associated with each unique ID is stored remotely, such as in the cloud, and accessible via a network connection. The information associated with each unique ID can include, but is not limited to, manufacturing details of the specific consumable, any calibration data associated with the consumable, customer information associated with the sale of the consumable, and transaction date of sale of the consumable. This data set (unique ID plus other items shown above) is referred to as CONS-ID. For example, each slide can have a CONS-ID and each insert can have a CONS-ID. Each reader within the biosensing-imaging system can also have a unique ID. The reader unique ID can also be stored remotely and accessed via network connection. The information associated with the reader unique ID can include, but is not limited to, manufacturing details of the specific reader, any calibration data associated with the reader, customer information associated with the sale of the reader, and transaction date of sale of the reader. This data set (reader unique ID plus other items shown above) is referred to as RDR-ID.

Figure 52:
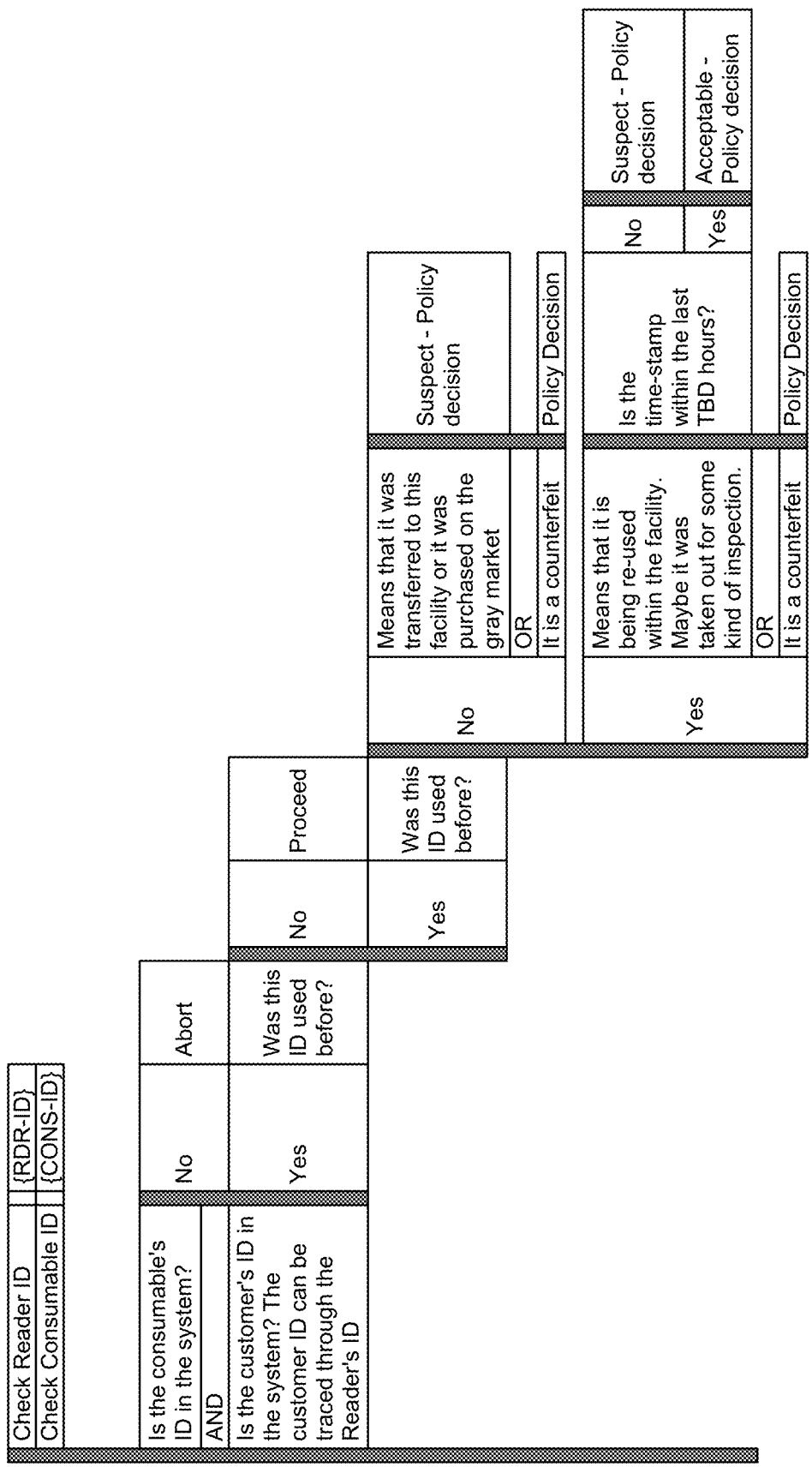
FIG. 52 illustrates a conceptual diagram of an exemplary algorithm/policy.

The unique ID of the consumables and the reader unique ID can be combined for a variety of different applications. For example, on power up or the start of use of the biosensing-imaging system, the RDR-ID and CONS-ID information is available, via network connection. This information can be used for calibration purposes, such as look-up table to provide correction factors to the measurements that are done with the combination of the reader and the consumable. This data can also be used to check for anti-cloning of the consumable. This information, in combination with a set of questions and policies can be used to take certain types of actions including, but not limited to, enabling the reader and consumable to function, disabling the combination of reader and consumable, and raising flags about conditions that are abnormal. Such actions can be defined by algorithms and policies that are to be defined by the end user. The reader can be configured such that it reads the unique ID on the slide and/or the insert. The reader can then provide this data to a centralized server to verify this slide or insert. If there is an acknowledgment from the centralized server that the unique ID is valid and that it has not been used before, then the reader is enabled to work with the slide or insert. If on the other hand there is a counterfeit slide/insert that either has a unique ID that is not recognized by the central server, or if the unique ID is associated with a slide/insert that has been read before, then the reader is enabled. An example of a similar algorithm/policy is shown in FIG. 52. It is understood that other algorithms and policies can be implemented using the information included in the read unique IDs.

The biosensing-imaging system is configured to capture polymodal quantitative, predictive, and integrated readouts over time from living samples that interact with polysensors in a dynamic environment. Example modes include, but are not limited to, optic, impedance, acoustic, pH, oxygen, and $CO_2$. When applying this concept to a multi-well implementation, the different wells can either have identical sensor capabilities, or different wells can be equipped with different sensor types. In other words, there is the capability to mix and match different sensor types for different wells based on the needs of the user. As an example, if there are 15 different sensor modalities in the universe of interest for a given cell type, then the user can select to have 1 sensor modality active in well-1, 5 sensor modalities active in well-2, and 12 sensor modalities active in well-3. The sensor modality in well-1 may have no commonality with the sensor modalities in well-2 or well-3. The sensor modality in well-1 may be the same as one of the modalities in well-2. The sensor modality in well-1 may be the same as one of the modalities in well-3. In a similar fashion, there may be minimal overlap between the sensor modalities in well-2 and well-3 or there may be maximal overlap between the modalities in well-2 and well-3. 4. In general, there is complete freedom in choosing the relevant modalities for each well.

Coupling multiple transduction methods can provide additional and/or complementary orthogonal (i.e. independent, causing no interference) data from the samples and may increase confidence in the outcomes. The biosensing-imaging system can be applied to various cases including community of interacting cells and bacteria. In some cases, continuous orthogonal sensing facilitates predictions of outcomes, understanding of biological mechanisms and functions, capture of subtle and/or transient biomarkers during cellular progressions, or their responses to perturbations. In the same way that a single test does not usually provide diagnostic or prognostic values for identifying patient risk or disease outcome and a panel of tests do that sufficiently, the polymodal approach of the biosensing-imaging system can provide more power of analysis during interrogations of biological samples including cells and their environments. In one data analysis approach, "n" parameters (P) inside each well (some example parameters (P) include pH, oxygen, glucose, cellular secretome, temperature, cell size, cell viability, cell proliferation, cell polarity, cell morphology, cell number, cell membrane granularity, and cell motion/micromotion, cell motility, cell migration and invasion, cell cycle, and cell apoptosis, cell barrier function, transmigration, cellular responses to external stimuli such as drugs or toxins, metabolism) are measured. These parameters (P) are mapped into "m" outcomes (O) of cells (some example outcomes (O) include abnormality of shape, invasiveness behavior, aggressiveness, and metabolic dysfunction). Both measured parameters (P) and outcomes (O) vary over time (t). For example, Parameters: $P1(t), P2(t), P3(t), \ldots, Pn(t) \Rightarrow [P1-n(t)]$, and Outcomes: $O1(t), O2(t), O3(t), \ldots, Om(t) \Rightarrow [O1-m(t)]$. The $[P1-n(t)]$ is mapping into $[O1-m(t)]$. The function (f) that transforms the $[P1-n(t)]$ to $[O1-m(t)]$ is given by $[O1-m(t)]=f[P1-n(t)]$, and has both function of time and a polynomial function (some examples are linear coefficient, non-linear coefficient, and orthogonal coefficient). In the more general formulation, there can be a recursive element to these equations. What is meant by recursive is that $[O1-m(t)]$ may also have a dependency on $[O1-m(t)]$, meaning that a closed form expression of function (f) may be difficult.

Figure 53:
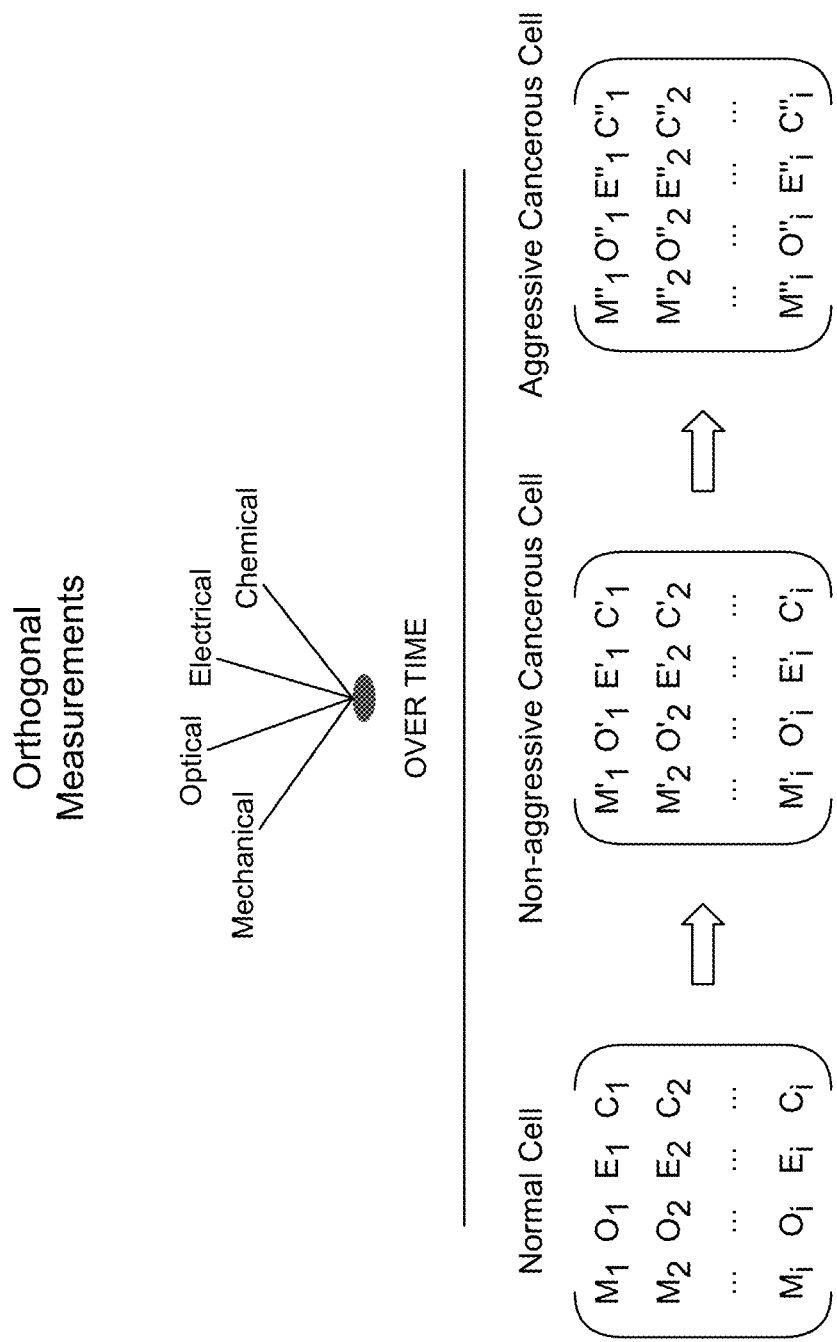
FIG. 53 illustrates one example of measured orthogonal parameters from different cell types.

In one approach, the multidimensional parameters (P) are presented as matrices. Every column of each matrix demonstrates a parameter measured by a sensor and every row demonstrate timepoints of measurements for every cell type. Such data sets paired with corresponding images and graphs are used for gaining direct insights into mechanisms or functions. In other cases, these parameters (P) are captured from genetically-characterized cells of a progression series (e.g. progression from normal to metastatic cancer) which may also define sensor (s)' sensitivity, specificity, crosstalk as a guide to form factor design and performance evaluation. In some cases, one form factor provides more precise data from orthogonal sensing and imaging. For instance, 3D impedance sensing of cells is achieved by positioning of electrode-coated porous membrane in close proximity of a cell colony that is being imaged continuously in an incubator. In some cases, continuous orthogonal data provides new types of information as inputs for analytics such as computer vision that identifies patterns for medicinal biology discoveries. In some cases, these parameters (P) are correlated to genotypes of known functions to create new data banks that relate biophysical phenotypes and functions to genotypes. In some cases, high-resolution orthogonal data can rule out cellular behaviors/functions or phenotypes based on the intersections of the different measurements or improve sensitivity of Venn diagrams. In some cases, continuous orthogonal data obtained directly from an evolving biological sample, improves power of corroborations and correlations. In some cases, continuous orthogonal system eliminates operator errors, where serial sampling from growing community of bacteria or secrotomes of cells are needed. In some cases, simultaneous orthogonal sensing and imaging provides new information for disease diagnosis, prognosis and therapy that would otherwise be missed by multiple non-orthogonal sensing, imaging or just summing of the cellular signatures and responses captured by such systems. Examples include, but are not limited to, higher power of prediction by pathology which mainly uses scored imaged of cells and tissues, more accurate identification of spatiotemporally heterogeneous subpopulations within tumors, or identification of new drug targets for modulating functions. FIG. 53 illustrates one example of measured orthogonal parameters from different cell types (M: mechanical, O: optical, E: Electrical, C: chemical) over time (1, 2, ..., i). The orthogonal data can change monotonically or non-monotonically over time.

In one approach, the multidimensional parameters (P) are presented as matrices. Every column of each matrix demonstrates a parameter measured by a sensor and every row demonstrate timepoints of measurements for every cell type. Such data sets paired with corresponding images and graphs are used for gaining direct insights into mechanisms or functions. In other cases, these parameters (P) are captured from genetically-characterized cells of a progression series (e.g. progression from normal to metastatic cancer) which may also define sensor (s)' sensitivity, specificity, crosstalk as a guide to form factor design and performance evaluation. In some cases, one form factor provides more precise data from orthogonal sensing and imaging. For instance, 3D impedance sensing of cells is achieved by positioning of electrode-coated porous membrane in close proximity of a cell colony that is being imaged continuously in an incubator. In some cases, continuous orthogonal data provides new types of information as inputs for analytics such as computer vision that identifies patterns for medicinal biology discoveries. In some cases, these parameters (P) are correlated to genotypes of known functions to create new data banks that relate biophysical phenotypes and functions to genotypes. In some cases, high-resolution orthogonal data can rule out cellular behaviors/functions or phenotypes based on the intersections of the different measurements or improve sensitivity of Venn diagrams. In some cases, continuous orthogonal data obtained directly from an evolving biological sample, improves power of corroborations and correlations. In some cases, continuous orthogonal system eliminates operator errors, where serial sampling from growing community of bacteria or secrotomes of cells are needed. In some cases, simultaneous orthogonal sensing and imaging provides new information for disease diagnosis, prognosis and therapy that would otherwise be missed by multiple non-orthogonal sensing, imaging or just summing of the cellular signatures and responses captured by such systems. Examples include, but are not limited to, higher power of prediction by pathology which mainly uses scored imaged of cells and tissues, more accurate identification of spatiotemporally heterogeneous subpopulations within tumors, or identification of new drug targets for modulating functions. FIG. 53 illustrates one example of measured orthogonal parameters from different cell types (M: mechanical, O: optical, E: Electrical, C: chemical) over time (1, 2, ..., i). The orthogonal data can change monotonically or non-monotonically over time.

The biosensing-imaging system can analyze any living biological sample such as living cells, including primary cells, cell lines, suspension cells, as well as islets, *C. elegans*, yeast, and isolated mitochondria, in-vitro preclinical 3D models including spheroids, organoids, Induced pluripotent stem cell (iPS) models, and novel ex vivo biopsy samples, human umbilical cord cells, in vitro fertilization samples, immune cells like T cells, bodily fluids or bodily fluid cells, secreted components, extracellular milieu, bacteria, viruses, fungus, microbes, cell compartments, exosomes, molecules, macromolecules, enzymes or tissue components grown in a three dimensional environment. Tissue components can be composed of different cell types such as tumor tissue including tumor cells, endothelial cells, fibroblasts, and stellate cells, as well as a complex extracellular matrix (ECM), including proteins, sugars, fat, carbohydrates, etc. It is understood that the biosensing-imaging system can be used to host, analyze, and manipulate other types of substances.

In some cases, the biosensing-imaging system can map detection and prediction to intrinsic and/or extrinsic heterogeneity caused by the different genetics, epigenetics, proteomics, metabolomics, and environments of the samples over time and space. For example, intratumor heterogeneity, which is a constantly evolving and adapting process, can be quantified in new ways by massive parallelization of the wells that host samples, capturing transient events over time, or identifying new physical signatures.

Some applications might involve characterization of the life cycle of the cell, cell-cell interaction, cell activation, cell clustering, cellular membrane trafficking, and signal transduction.

Some applications may involve distinguishing, monitoring, and quantifying a panel of biomarkers or functions from living biopsy samples to accelerate patient-risk or therapy identifications and thus enable more predictive outcomes. Some cases may involve development of effective predictive assays and model systems to tackle complexities of multiparameter biological processes such as metastatic cancer progression, stem cell differentiation and reprogramming, immune cell activation, immune cell killing, phagocytosis, neuronal co-culture, bacterial community growth, bacterial-resistance or susceptibility assessment, and microbiome interaction with ex vivo host samples. Some cases may aid the elucidation of basic mechanisms underlying disease initiation and progression. Some cases may facilitate and/or enhance molecular analyses for precision medicine or epidemiology; for example, by allowing for rigorous collection of diverse but relevant types of data. Some cases may involve identification of differentially expressed markers among subset of biological samples in response to external stimuli such as radiation in environment, imaging probe, or drug. Some cases may involve phenotypic assessments in agriculture, geology, or energy-producing organisms. Some cases may involve acceleration of drug target discovery and screening. Some cases may involve optimizing the efficiency of editing genes and modulating functions.

Some cases may involve pairing the smart test plate described herein with cellular and acellular analysis technology such as mass spectrometry, biomicroelectromechanical chips, flow cytometry, cellular microarrays, polymerase chain reaction, high content screening, Omics and machine learning. Some characterizations and applications may involve label-free detection and mapping. Some characterizations and applications may involve label-specific detection and mapping. Some cases may involve 3D phenotyping of biological samples such as cellular or tissue models, disease models, food and toxicology models for research and clinical uses. Some cases may involve use of the above to replace animal models. Some cases may involve assessing conservation of drugs across organisms including gut microbiome. Some cases may involve characterization of food evolution. The present application has been described in terms of specific embodiments incorporating details to facilitate the understanding of the principles of construction and operation of the biosensing-imaging system. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A device comprising:
   a. a test plate comprising at least one well, each well configured to contain a substance to be analyzed, where each well comprises a side wall structure and a bottom wall;
   b. a plurality of sensors configured to sense a plurality of different modalities, wherein each sensor is configured to sense a characteristic of the substance according to one of the modalities and to generate a corresponding sensed signal, further wherein multiple sensors are attached to the bottom wall of each well and multiple sensors are attached to the side wall structure of each well, further wherein the plurality of sensors comprises a plurality of electrodes each to sense an electrical characteristic and to generate a corresponding sensed signal, wherein multiple electrodes are attached to the bottom wall of each well and multiple electrodes are attached to the side wall structure of each well; and
   c. electronic circuitry coupled to the plurality of sensors, wherein the electronic circuitry is configured to selectively access one or more sensors and output the sensed signals from the selectively accessed one or more sensors according to the plurality of different modalities, further wherein the electronic circuitry is configured to selectively access an electrode pair of the plurality of electrodes in each well and output the sensed signals from the selectively accessed two electrodes to obtain impedance measurements.

2. The device of claim 1 wherein the plurality of different modalities comprises a combination of two or more of optical measuring, impedance measuring, chemical measuring, and acoustic measuring.

3. The device of claim 1 wherein the substance to be analyzed comprises a biological sample comprising live cells.

4. The device of claim 1 further comprising an optical system configured to direct light into each well and to capture corresponding image data, wherein the electronic circuitry is coupled to the plurality of sensors and to the optical system, and the electronic circuitry is further configured to receive and output sensed signals corresponding to the captured image data.

5. The device of claim 4 wherein the optical system further comprises a movement mechanism configured to move the optical system or the test plate relative to each other.

6. The device of claim 5 further comprising an incubator, wherein the test plate with plurality of sensors, the optical system, and the electronic circuitry are configured to fit within the incubator and operate within the incubator while the incubator is functioning.

7. The device of claim 5 further comprising an incubator, wherein the test plate with plurality of sensors and the incubator are configured to fit within the incubator and operate within the incubator while the incubator is functioning, and the optical system and the electronic circuitry are positioned external to the incubator.

8. The device of claim 1 wherein the electrode pair comprises one electrode from the multiple electrodes attached to the bottom well and one electrode from the multiple electrodes attached to the side wall structure.

9. The device of claim 8 wherein the electronic circuitry further comprises signal processing circuitry configured to determine a 2D or 3D impedance measurement according to the output sensed signals from the selectively accessed electrode pair.

10. The device of claim 9 wherein the electronic circuitry is further configured to selectively access a plurality of different electrode pairs and to determine a 2D or 3D impedance measurement for each different electrode pair, and to determine a substance impedance based on all the 2D or 3D impedance measurements determined for the plurality of different electrode pairs.

11. The device of claim 1 further comprising:
    a. a light source;
    b. optical components coupled to the light source and configured to direct light from the light source into each well;
    c. an imaging unit aligned with the test plate, the light source, and the optical components, wherein the imaging unit captures image data from within a field of view, further wherein the field of view is smaller than an entire cross-sectional area of each well;
    d. a movement mechanism coupled to the imaging unit, the movement mechanism configured to move the imaging unit relative to the test plate; and
    e. control circuitry coupled to the movement mechanism and the imaging unit, wherein the control circuitry is configured to control movement of the movement mechanism in incremental steps, and at each step the imaging unit captures an image corresponding to a portion of the well, further wherein the control circuitry is further configured to generate an image of the entire cross-sectional area of the well by combining the captured images from each incremental step.

12. The device of claim 11 wherein the field of view of each captured image overlap the field of view of at least one other captured image.

13. The device of claim 12 wherein captured images of overlapping field of view are properly aligned relative to each other to form the image of the entire cross-sectional area of the well.

14. The device of claim 11 wherein the cross-sectional area of the well corresponds to a specific depth within the well and a focal depth of the optical components.

15. The device of claim 14 wherein the control circuitry is further configured to adjust a focal depth of the optical components to a different focal depth, to control the imaging unit and movement mechanism to capture images at the different focal depth, and to generate another image of the entire cross-sectional area of the well corresponding to the different focal depth.

16. The device of claim 15 wherein the control circuitry is configured to generated images of the entire cross-sectional area of the well at a plurality of different focal depths, and to generate a 3D image of the entire well by combining the images of the entire cross-sectional of the well captured at the different focal depths.

17. The device of claim 11 wherein the optical components comprise a reflective surface positioned adjacent to the side wall structure of the well being scanned, the light from the light source is reflected off the reflective surface, through the side wall structure, and into the well.

18. The device of claim 11 wherein the optical components comprise a reflective surface positioned within the side wall structure of the well being scanned, the light from the light source is directed into the side wall structure, reflected off the reflective surface, and into the well.

19. The device of claim 1 further comprising:
 a. one or more chemical sensor dots coupled to the bottom wall or the side wall structure of the at least one well, wherein each chemical sensor dots changes a property when exposed to a specific type of chemical;
 b. a light source;
 c. optical components coupled to the light source and configured to direct light from the light source onto the one or more chemical sensor dots;
 d. an imaging unit aligned with the at least one well, wherein the imaging unit captures image data from light exiting the at least one well; and
 e. signal processing circuitry coupled to the imaging unit, wherein the signal processing circuitry is configured to determine the property of each of the one or more chemical sensor dots, and to determine a change in the property in each of the one or more chemical sensor dots, the property change indicating presence of the specific type of chemical in the well.

20. The device of claim 19 wherein the one or more chemical sensor dots comprise a plurality of chemical sensor dots, each chemical sensor dot having a different sensitivity to the specific type of chemical such that each of the chemical sensor dots changes property at a different level of the specific type of chemical within the well.

21. The device of claim 1 further comprising an optical system configured to direct light into each well and to capture corresponding optical data, wherein the electronic circuitry is coupled to the plurality of sensors and to the optical system, and the electronic circuitry is further configured to receive and output sensed signals corresponding to the captured optical data.

* * * * *